United States Patent
Williams et al.

(10) Patent No.: US 11,934,744 B2
(45) Date of Patent: Mar. 19, 2024

(54) METHOD, SYSTEM AND GRAPHICAL USER INTERFACE FOR BUILDING DESIGN

(71) Applicant: UTECTURE GLOBAL LIMITED, Whangerei (NZ)

(72) Inventors: Timothy Ronan Williams, Whangarei (NZ); Kyle Francis Donovan, Whangarei (NZ); Brett Norman Donovan, Whangarei (NZ)

(73) Assignee: UTECTURE GLOBAL LIMITED, Whangerei (NZ)

( * ) Notice: Subject to any disclaimer, the term of this patent is extended or adjusted under 35 U.S.C. 154(b) by 736 days.

(21) Appl. No.: 16/978,319

(22) PCT Filed: Mar. 6, 2019

(86) PCT No.: PCT/NZ2019/050023
§ 371 (c)(1),
(2) Date: Sep. 4, 2020

(87) PCT Pub. No.: WO2019/172782
PCT Pub. Date: Sep. 12, 2019

(65) Prior Publication Data
US 2021/0004508 A1    Jan. 7, 2021

(30) Foreign Application Priority Data

Mar. 6, 2018   (AU) ................................ 2018900729
Feb. 5, 2019   (AU) ................................ 2019900355

(51) Int. Cl.
*G06F 30/13*   (2020.01)
(52) U.S. Cl.
CPC .................... *G06F 30/13* (2020.01)
(58) Field of Classification Search
CPC ...... G06F 30/00; G06F 30/13; G06F 2111/02; G06F 30/12; G06T 11/20; G06T 2210/04
(Continued)

(56) References Cited

U.S. PATENT DOCUMENTS 4,964,060 A   10/1990   Hartsog
9,213,785 B2  12/2015   Plewe
(Continued)

FOREIGN PATENT DOCUMENTS

WO   WO 2009/100542   8/2009

OTHER PUBLICATIONS

Nguyenm Tang-Hung et al., ("Building Code Compliance Checking Using BIM Technology", 2011, Proceedings of he 2011 Winter Simulation Conference, IEEE. (Year: 2011).*

*Primary Examiner* — Cedric Johnson
(74) *Attorney, Agent, or Firm* — Mintz Levin Cohn Ferris Glovsky and Popeo, P.C.; Frank L. Gerratana, Esq.

(57) ABSTRACT

Systems and methods for customizing a building floor plan are provided. In one embodiment, a method for customizing a building floor plan comprises: at an electronic device with a display: receiving a request to modify one or more building components of a base plan associated with a building; in response to receiving the request to modify the one or more building components, determining whether the request to modify the one or more building components satisfy one or more compliance requirements; in accordance with a determination that the request to modify the one or more building components satisfy one or more compliance requirements: displaying, on the display, an updated base plan incorporating the request to modify the one or more building components; and in accordance with a determination that the request to modify the one or more building components is non-compliant, not updating of the base plan in accordance with the requested modification.

11 Claims, 50 Drawing Sheets

(58) Field of Classification Search
USPC .............................................................. 703/1
See application file for complete search history.

(56) References Cited

U.S. PATENT DOCUMENTS

| | | |
|---|---|---|
| 2008/0059220 A1 | 3/2008 | Roth |
| 2010/0198563 A1* | 8/2010 | Plewe .................. G06F 30/392 |
| | | 703/1 |
| 2011/0218772 A1 | 9/2011 | Bumbalough |
| 2014/0095122 A1 | 4/2014 | Appleman |
| 2015/0310136 A1 | 10/2015 | Maletz |

* cited by examiner

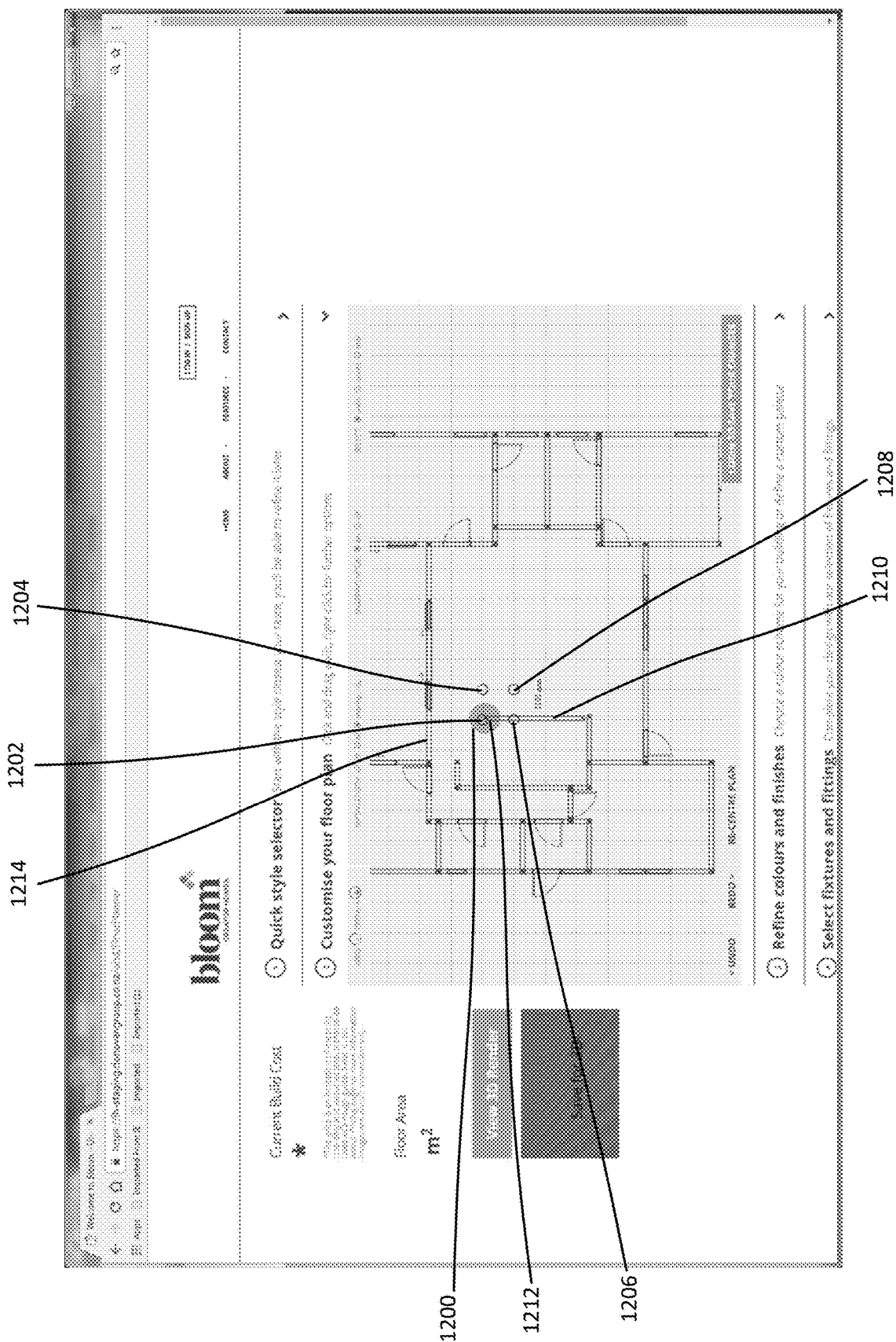

# METHOD, SYSTEM AND GRAPHICAL USER INTERFACE FOR BUILDING DESIGN

CROSS REFERENCE TO RELATED APPLICATIONS

The present application is the national stage entry of International Patent Application No. PCT/NZ2019/050023, filed on Mar. 6, 2019, and claims priority to Australian Provisional Application No. 2018900729 filed on Mar. 6, 2018, and Australian Provisional Application No. 2019900355, filed on Feb. 5, 2019, the disclosures of which are incorporated herein in its entirety by reference.

FIELD

The present disclosure generally relates to computer aided design technology. Particular embodiments relate to a method, system and graphical user interface for building design.

BACKGROUND OF THE INVENTION

Various building professionals are typically involved in the design of a building. These may include architects, engineers and surveyors, who may consider various compliance standards and requirements. The separate consideration of these standards and requirements by the respective professional often results in lengthy time periods in progressing the building to the construction stage.

United States patent publication US 20110218772 A1 (Bumbalough, et al.) describes a method for providing an options configurator, for use in connection with computer aided design and building information modelling. Bumbalough, et al. describes that computer assisted building information modelling to generate a representation of a building is usable by production builders, for example to build a relatively large number of houses from basic plans, with various options for buyers. However, it is noted that options configurators for assisting builders in providing options to potential buyers have limited flexibility and adaptability. Bumbalough, et al. describes an options configurator for generating building information models based on selected options within an option set.

At least some existing methods for computer assisted building design remain cumbersome and inefficient and/or require expertise (e.g. an architect) to effectively operate. Further, at least some existing methods remain limited in their flexibility and adaptability.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

In some embodiments of the present disclosure, a method includes, at an electronic device with a display: receiving an input comprising one or more parameters of a building; displaying, on the display, information for one or more base plans selected from a plurality of base plans, wherein the one or more base plans are selected from the plurality of base plans based on the received one or more parameters of the building; receiving a selection of a base plan from the one or more base plans; and in response to receiving the selection of the base plan: receiving a second selection to modify the base plan; and displaying, on the display, a graphical user interface for modifying the base plan.

In some embodiments of the present disclosure, a method includes, at an electronic device with a display: receiving a request to modify one or more building components of a base plan associated with a building; in response to receiving the request to modify the one or more building components, determining whether the request to modify the one or more building components satisfy one or more compliance requirements; in accordance with a determination that the request to modify the one or more building components satisfy one or more compliance requirements: displaying, on the display, an updated base plan incorporating the request to modify the one or more building components; and in accordance with a determination that the request to modify the one or more building components is non-compliant, not updating of the base plan in accordance with the requested modification.

In some embodiments of the present disclosure, a method for adding a penetration to a wall of a building includes: receiving a request to add a penetration to a wall of the building; determining at least two grid nodes of the base plan, wherein the requested penetration is located between the at least two grid nodes; determining at least one position located between the at least two grid nodes that satisfies one or more compliance requirements; in accordance with a determination that the at least one position located between the at least two grid nodes of the base plan satisfies one or more compliance requirements: displaying, on the display, an updated base plan incorporating the request to add the penetration; in accordance with a determination that the at least one position located between the at least two grid nodes is non-compliant, forgoing updating of the base plan in accordance with the request to add a penetration.

In some embodiments, a method for modifying a length of a wall of a building includes: receiving a request to modify the length of the wall of the building; displaying, on the display, at least one visual indicator at one end of the length of the wall, wherein the visual indicator indicates a minimum threshold distance to a building component different to the wall; determining cessation of the request to modify the length of the wall of the building; in response to determining cessation of the request to modify the length of the wall of the building, determining whether movement of the end of the wall to a location within the minimum threshold distance to the building component, indicated by the visual indicator, satisfies one or more compliance requirements; in accordance with a determination that the movement of the end of the wall to a location within the minimum threshold distance to the building component satisfies one or more compliance requirements: connecting the end of the wall to the building component; and displaying, on the display, an updated base plan incorporating the connection of the end of the wall to the building component; in accordance with a determination that the movement of the end of the wall to a location within the minimum threshold distance to the building component is non-compliant, forgoing updating of the base plan in accordance with modifying the length of the wall.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIGS. 12A-12D illustrates exemplary user interfaces for automatically connecting a first building component to a second building component shown in floor plan of FIG. 3 in accordance with an embodiment.

DETAILED DESCRIPTION OF THE EMBODIMENTS

Figure 1:
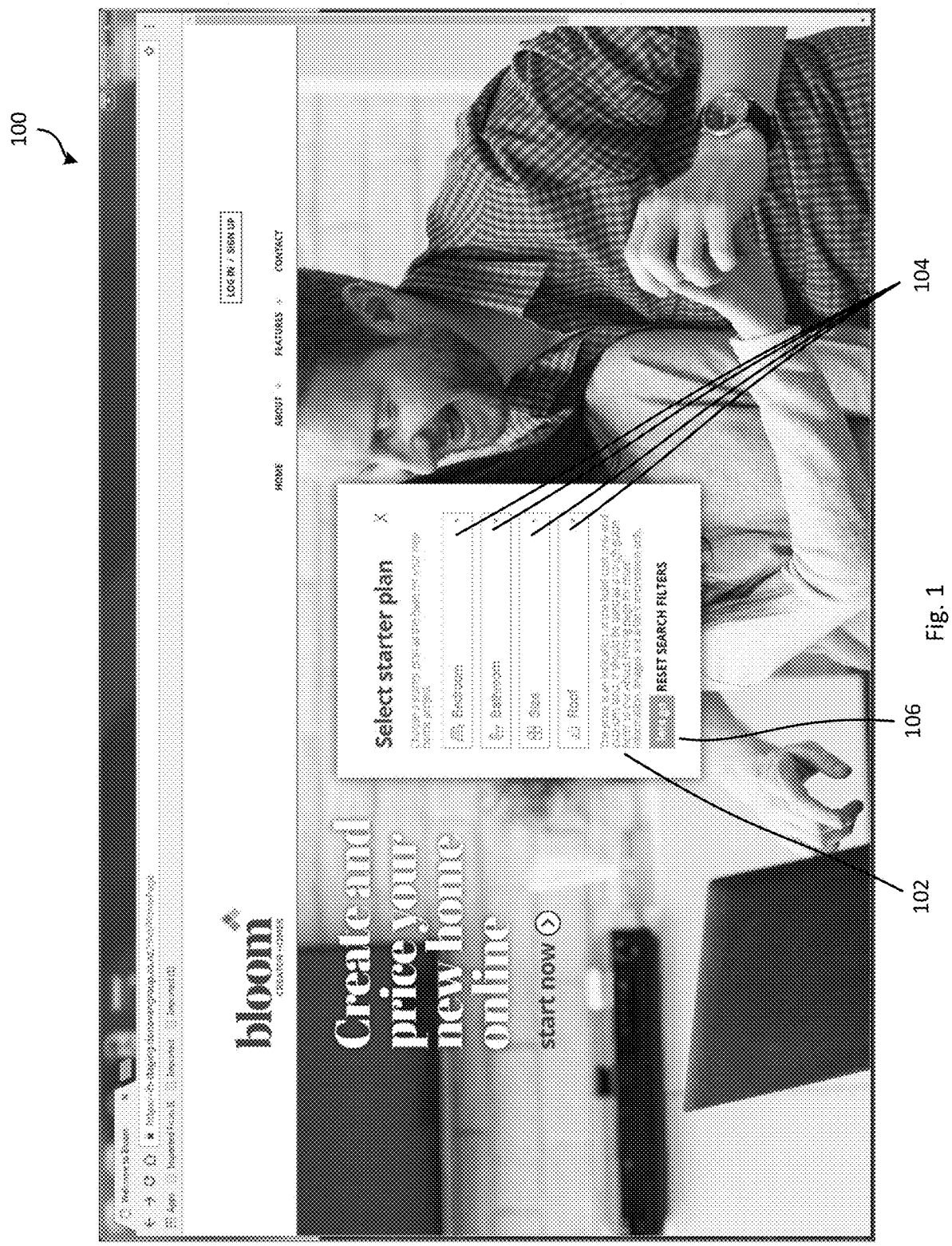
FIG. 1 illustrates an exemplary user interface for performing a building plan search in accordance with a first embodiment.

A first embodiment of a user interface 100, in particular a graphical user interface, appearing on a display of a user device is shown in FIG. 1. The user interface 100 displays a building plan search menu 102 including one or more option fields 104 for receiving one or more search parameters from a user.

In the example shown, the search parameters include but are not necessarily limited to the number of bedrooms, the number of bathrooms, the size of the building (e.g. footprint size in square metres or square feet) and the roof style (e.g. gabled, hip, flat, lean to). A value for each search parameter is selected, in one embodiment, from preconfigured options. These may be entered by a selection from a drop down menu, and/or entered directly into the relevant option field 104. The entered search parameters may be submitted to a search engine, for example, by the selection of the "lets go" button 106 on the user interface.

Results returned from the search, if any, are displayed on the user interface 100. In some embodiments the search parameters have preconfigured options and there is at least one result for each combination of preconfigured options. In some embodiments, once a selection of one preconfigured option has been made, the preconfigured options for one or more others are limited to those that have at least one result. For example, the available sizes may be different if one bedroom is selected in comparison to if four bedrooms are selected. In some embodiments the results include only those that satisfy all of the entered search parameters. In other embodiments one or more results that satisfy some, but not all of the entered search parameters are displayed. For example, the results may include those that satisfy all but one of the entered search parameters. In some embodiments only results that satisfy a specified one or more of the search parameters are displayed. For example, in one embodiment the displayed results must match the number of bedrooms and bathrooms, but not necessarily match entered parameters for the size and/or roof style.

The search result or results are displayed on the user interface 100. In some embodiments one or more search results are displayed with one or more representations 202 of a building for the search result. As shown by example in FIG. 2, the display of a search result 200 on the user interface 100 includes displaying a plurality of representations 202 of an exterior of a building 316. Additionally, in some embodiments the search result is displayed with associated information 204, including values for one or more of the search parameters that apply to the result. Again referring to the example search result 200, the associated information 204 indicates that displayed result has four bedrooms, three bathrooms and a size of 136 m². In an embodiment in which the search results include results that do not match all of the input search parameters, then the associated information 204 provides a mechanism for informing the user what parameters the search result has. The associated information 204 may include other information, for example a cost estimate (e.g. $217,600.00 in the example of FIG. 2). The cost estimate is a predetermined amount associated with the search result.

In some embodiments the search results are grouped. For example, in embodiments in which the search results include buildings with one of the search parameters missing, the results that have all input parameters are displayed in a first group, those with one of the search parameters missing (e.g. having a different roof style) are displayed in a second group and those with another of the search parameters missing (e.g. having a different size) are displayed in a third group. The groups may be displayed in a scrollable list, with a scrolling input moving through the first group, then the second group and then the third group.

In some embodiments, the one or more search results 200 are displayed concurrently with another or the same building plan search menu 102. New or modified search parameters received via the search menu 102 cause the displayed results to be updated. In combination with the display of representations of the search results, the user can readily browse different structures and how they appear.

Figure 2:
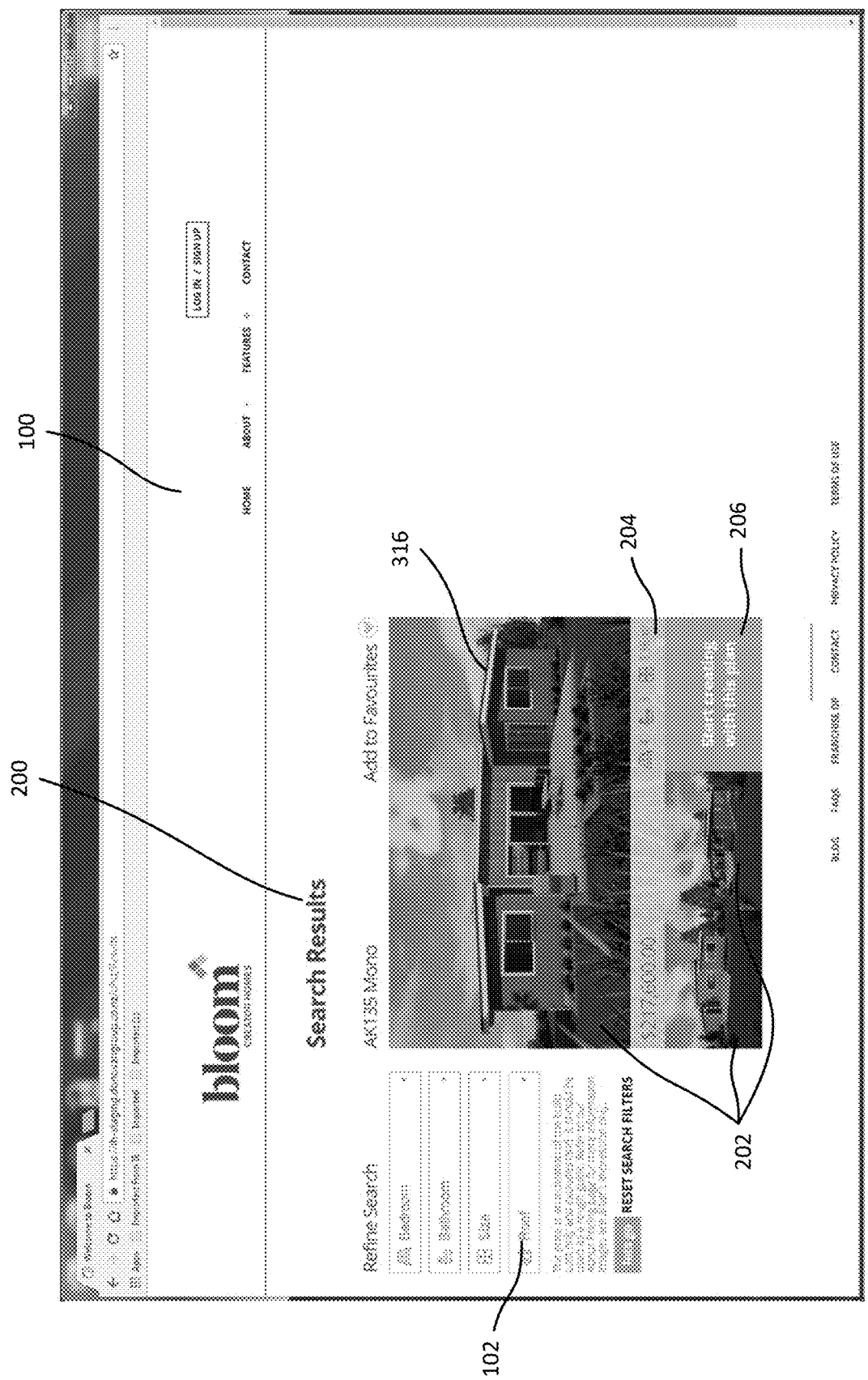
FIG. 2 illustrates an exemplary user interface for displaying search results in accordance with the building plan search performed in FIG. 1.

The user interface 100 includes a mechanism to receive a user selection of a search result. In some embodiments the mechanism is a selectable icon 206. The selectable icon 206 may include descriptive material indicating an action associated with the selection, which in the example of FIG. 2 is "Start creating with this plan".

Figure 24:
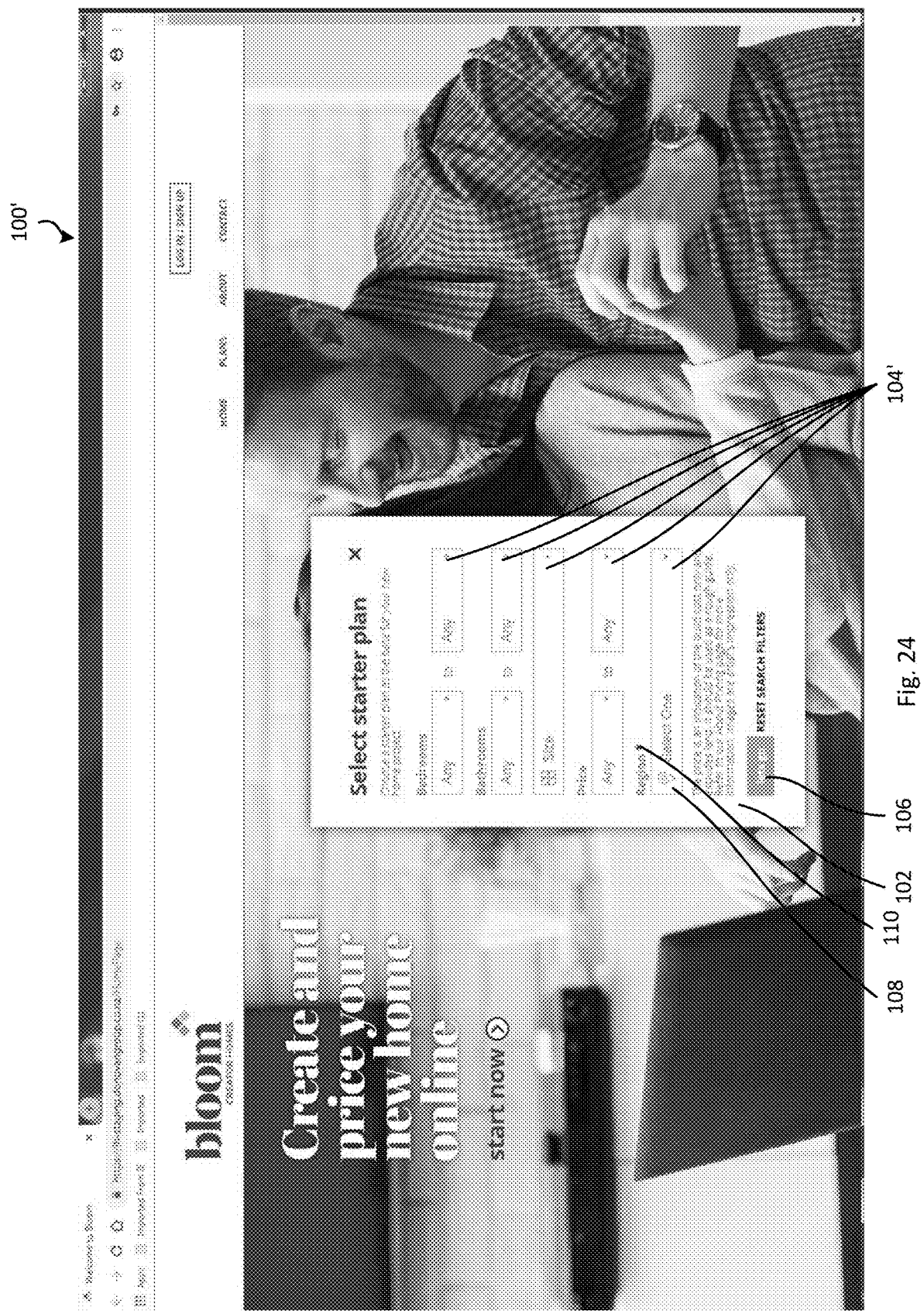
FIG. 24 illustrates an exemplary user interface for performing a building plan search in accordance with a second embodiment.

A second embodiment of a user interface 100', in particular a graphical user interface, appearing on a display of a user device is shown in FIG. 24. The user interface 100' displays a building plan search menu 102 including one or more option fields 104' for receiving one or more search parameters from a user.

In the example shown in FIG. 24, the search parameters include but are not necessarily limited to the number of bedrooms, the number of bathrooms, the size of the building (e.g. footprint size in square metres or square feet), price, and a region. The search parameters may be selected from a range of values, for example, a price range. One or more search parameters may be provided with a visual indicator to indicate that selection of a parameter is mandatory. In the example shown in FIG. 24, the region field 108 is associated with the visual indicator 110 to indicate that this field is a mandatory search parameter. The entered search parameters may be submitted to a search engine, for example, by the selection of the "lets go" button 106 on the user interface.

Figure 25:
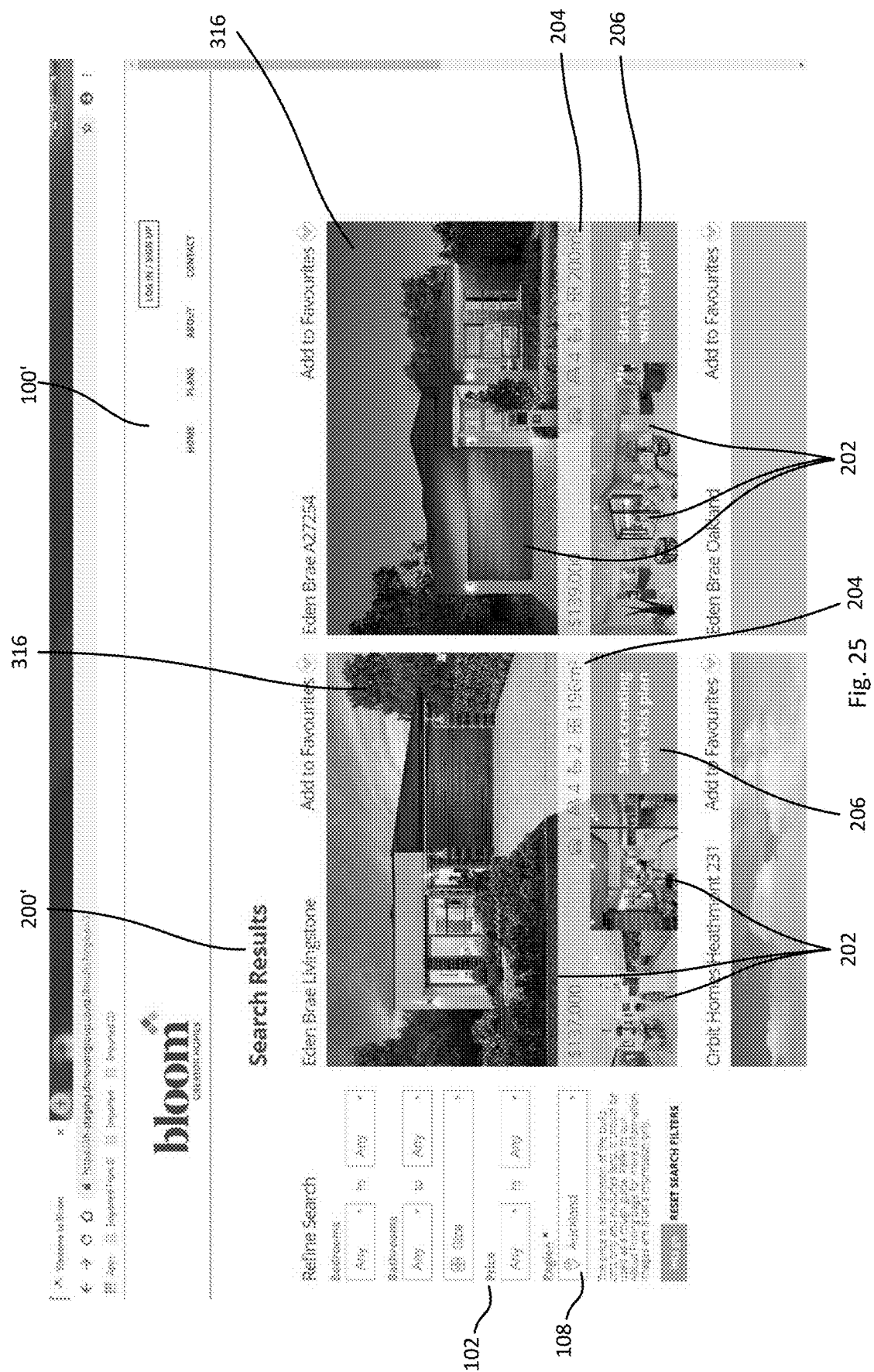
FIG. 25 illustrates an exemplary user interface for displaying search results in accordance with the building plan search performed in FIG. 24.

Results returned from the search, if any, are displayed on the user interface 100'. In some embodiments, the one or more results satisfy one or more mandatory search parameters. In the example shown in FIG. 25, selection of an available region from the mandatory region field 108 displays search results 200' that are available in the selected region. In other embodiments, search results 200' may be displayed that satisfy mandatory search parameters and one or more non-mandatory search parameters.

Each available search result is associated with plan of a building. This plan is referred to herein as a "base plan". As described in more detail below, each base plan has a floorplan, including for example a layout of the walls, doors and windows. In some embodiments each base plan is complete or substantially complete, in the sense that a building could be constructed based on the plan, without substantial additional design of the structure of the building. In other embodiments, the base plan may omit certain design features. For example in some embodiments one or more base plans omit the roofing and/or omit certain fixtures and fittings. In some embodiments, where features are omitted, they may be correspondingly omitted from the representation(s) of the building in the corresponding search result 200 and/or may be omitted from the search menu 102.

In some embodiments, following receipt of a selection of a search result, the user interface 100 displays menu options 330-360 for performing categories of actions with respect to modifying the base plan associated with the search result. Example categories of actions include selecting the style of the building (menu option 330), customising the floor plan of the building (menu option 340), refining the interior and exterior colour scheme of the building (menu option 350) and refining the fixtures and fittings of the building (menu option 360). In other embodiments, following receipt of a selection of a search result, the user interface transitions directly to one of the functions associated with the menu options 330-360, for example directly to an interface for customising the floor plan. Accordingly, the user interface facilitates real time development of a building design. Furthermore, the user interface is configurable to constrain or limit the development of the building design to engineering compliant designs. Once the floor plan has been finalised, for example as indicated by a user input such as selection of a "Next" button, the user interface transitions to functions associated with the other menu options, and so forth until all functions have been completed.

Customisation of the Floor Plan of a Building

Figure 3:
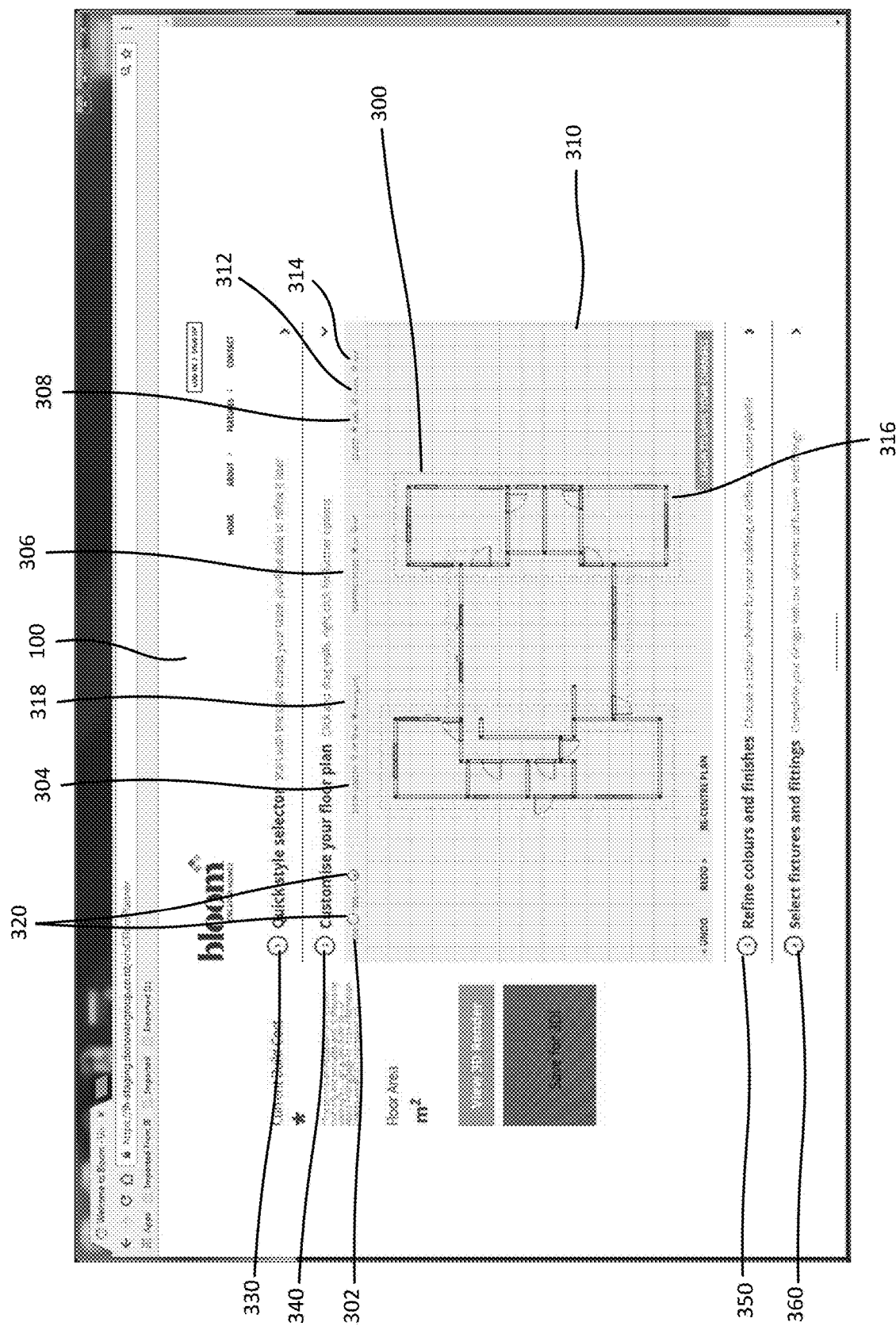
FIG. 3 illustrates an exemplary user interface for displaying a floor plan for a search result selected in FIG. 2.

Invoking of a floor plan function, for example by selecting the menu option "Customise your floor plan" 340, causes the user interface 100 to display a floor plan 300 of the building 316, for example as shown in FIG. 3. The floor plan 300 displays components of the building 316 that affect the floor plan, in particular for example exterior walls, interior walls, doors and windows.

In some embodiments the floor plan 300 is displayed on a grid 310. For example, selection of the "+" and "−" icons 320 of a grid-size menu 302 cause adjustment of the scale applied to a grid 310 displayed in the background to the floor plan. The user interface 100 displays a dimension to indicate the interval between grid lines. In some embodiments a snap to grid menu 306 enables switching between a mode in which adjusted items (e.g. walls) snap to grid points and a mode without this snap to grip point functionality.

The user interface 100 includes one or more selectable items associated with the floor plan 300, the selectable items invoking a function for configuring the floor plan 300.

The user interface 100 may further include a feature menu 308. The feature menu 308 includes selectable options to highlight categories of features in the floor plan. Example categories include the walls, the rooms or the roof. FIG. 3 shows an example representation of the floor plan with the walls category selected for highlighting. In FIG. 3 the walls are highlighted (e.g. shown in bold and/or in a particular colour) and other features, for example a roof outline are not highlighted. In some embodiments highlighting of the walls includes highlighting structures forming part of the walls, including doors and windows. In some embodiments highlighting of the walls includes highlighting connection points between walls, which in FIG. 3 are highlighted by highlighting solid square dots at the intersection of two walls.

Figure 4:
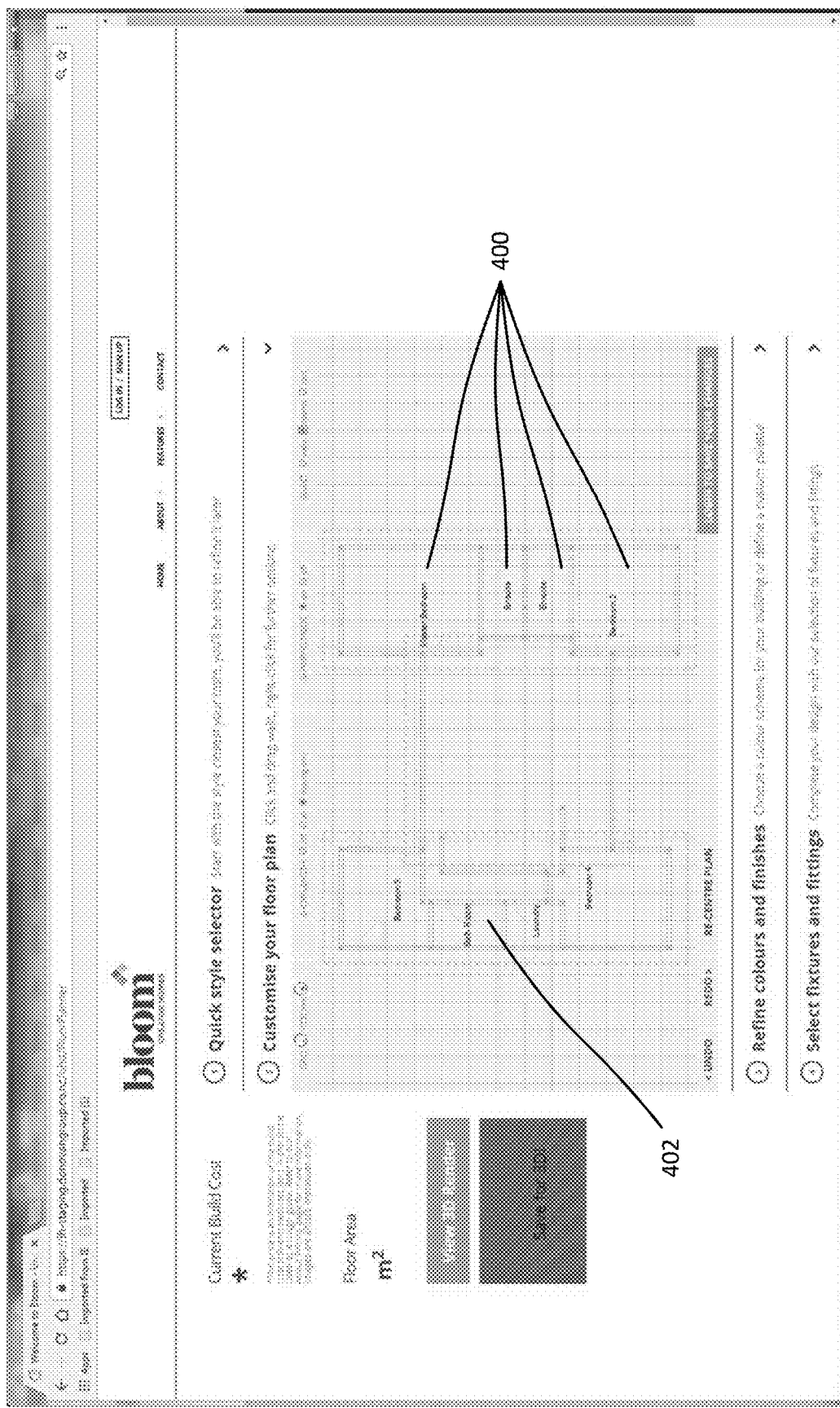
FIG. 4 illustrates an exemplary user interface of the floor plan of FIG. 3 in accordance with one embodiment.

For example, selection of the "room" option 312 will cause the display on the floor plan 300 a name label 400 associated with each room, as shown in FIG. 4. In some embodiments the name label 400 for each room is editable, for example by a user operating a click and point device or touchscreen to select a label for editing and a keyboard to enter the revised label. In some embodiments the rooms of a base plan have pre-set room labels, with one or more of the labels being editable (e.g. a bedroom could be renamed a living room and vice-versa). In some embodiments one or more of the room labels are not editable (e.g. a bathroom may not be able to be relabeled).

In some embodiments, designation of the rooms displayed in the floor plan 300 restricts the actions that may be performed with respect to the room. For example, designation of the room "Bathroom" 402 in the floor plan 300 may restrict the actions that may be performed with respect to the finishes room, for example, the room may be restricted to being a tiled area rather than a carpeted area.

Figure 5:
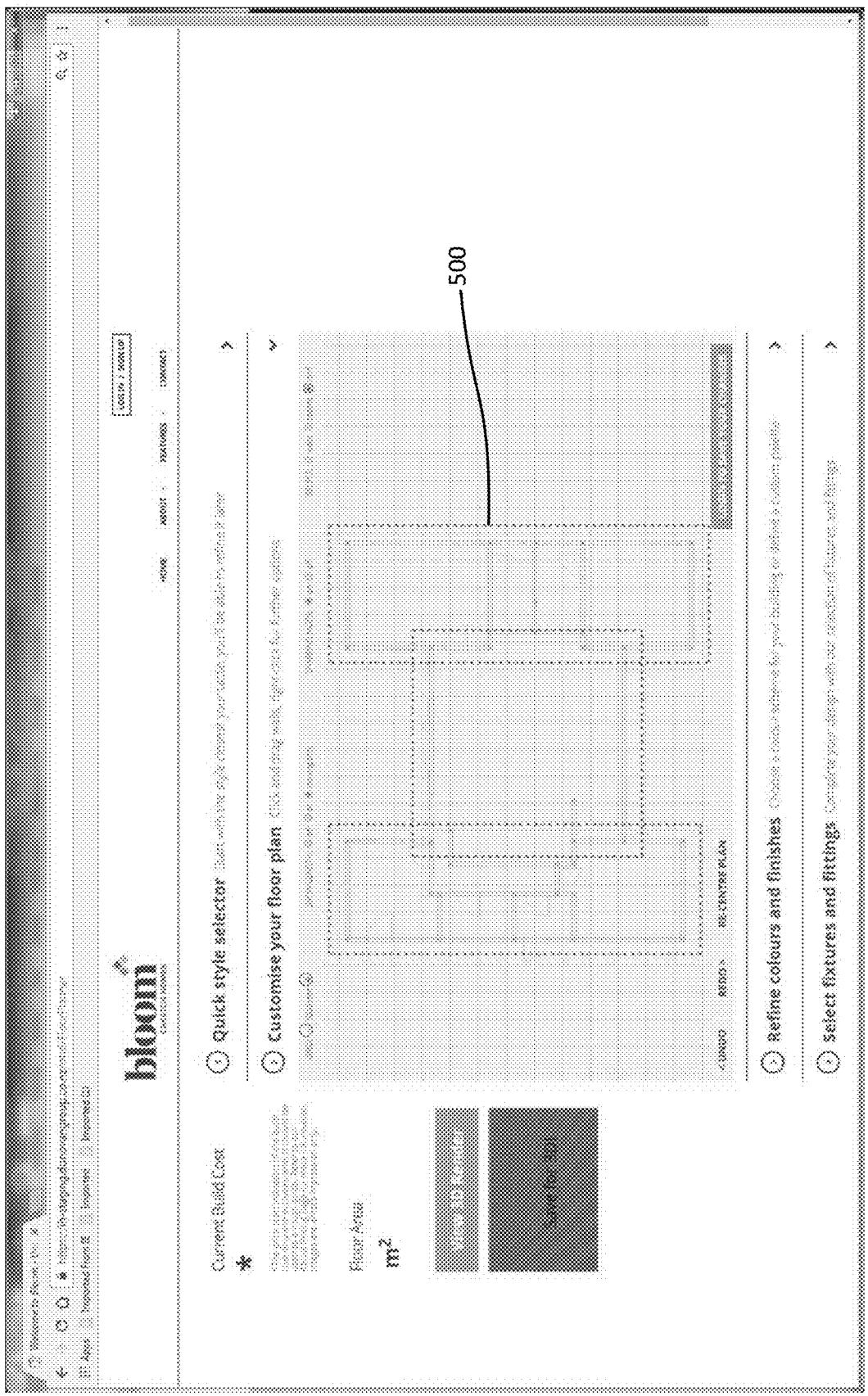
FIG. 5 illustrates an exemplary user interface of the roof plan of FIG. 3 in accordance with another embodiment.

In another example, selection of the "roof" option 314 results in the user interface highlighting the roof structure 500 of the building 316, for example as shown in FIG. 5. In the embodiments shown, the roof structure 500 is visible without selection of the roof option 314, for example as depicted in FIGS. 3 and 4.

By structuring the user interface 100 with selectable categorised features of the floor plan, a user can navigate between modes that highlight different features of the building 316, for viewing and/or editing. For features that can be edited the highlighting of those features and relative de-emphasis or removal from the display of other features, may result in the user interface having increased usability.

In some embodiments the user interface 100 includes a function to display dimensions of one or more features of the floor plan. An example dimension is the length of a wall. In some embodiments the dimensions displayed are configurable through user selection. For example, referring again to FIG. 3, the user interface 100 may include a "show length" menu 304, which includes three options "off", "on" and "moving only". When "off" is selected no dimensions are displayed on the floor plan 300. When "on" is selected dimensions for all walls are displayed on the floor plan 300, the dimension displayed adjacent to its associated wall. When "moving only" 318 is selected a dimension of a wall is displayed, for example adjacent to the wall, only while the wall is being adjusted (see for example herein below) and is not displayed at other times. Dimensions may also be displayed on other features, for example the roof, a door and a window and in some embodiments these are also configurable as described for walls, either collectively with the walls or as separate configurable items with corresponding show length menus.

In some embodiments one or more menus are displayed in response to selection of a feature in the floor plan 300. One or more of these menus may display actions that may be performed on the selected feature. The availability of one or more of these actions may also be dependent on the type of feature selected.

Figure 26:
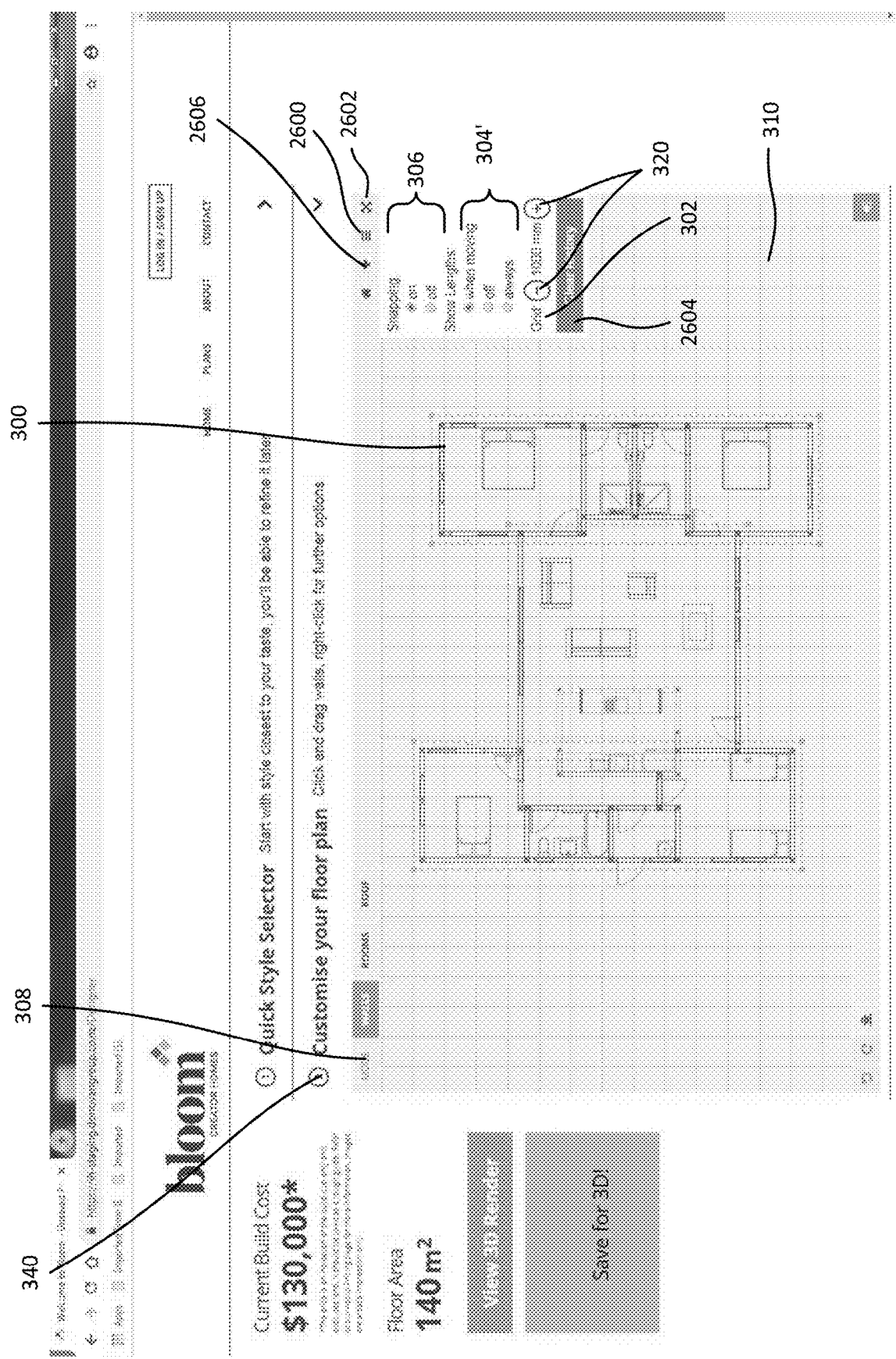
FIG. 26 illustrates an exemplary user interface for displaying a floor plan for a search result selected in FIG. 25 and a grid dock for adjusting grid settings of the floor plan in accordance with an embodiment.

In some embodiments, one or more menus are displayed in a grid dock in response to selection of an icon. In the example shown in FIG. 26, selection of a grid menu icon 2600 displays grid dock 2602 that includes the snap to grid menu 306, the show length menu 304' and the grid-size menu 302. In some embodiments, the snap to grid menu 306 enables switching between a mode in which adjusted items (e.g. walls) snap to grid points and a mode without this snap to grip point functionality. In some embodiments, the show length menu 304' includes three options "off", "always" and "when moving". When "off" is selected no dimensions are displayed on the floor plan 300. When "always" is selected dimensions for all walls are displayed on the floor plan 300, the dimension displayed adjacent to its associated wall. When "when moving" is selected a dimension of a wall is displayed, for example adjacent to the wall, only while the wall is being adjusted and is not displayed at other times. In some embodiments, selection of the "+" and "−" icons 320 of the grid-size menu 302 cause adjustment of the scale applied to the grid 310 displayed in the background to the floor plan. In some embodiments, the grid dock 2602 may include a "clear history" icon 2604 that, when selected, resets one or more of the selected menu options to predetermined settings. In some embodiments, an updated floor plan 300 is displayed in the user interface 100 in response to a determination that one or more compliant actions are requested. A compliant action is a modification or addition of a feature in the floor plan 300 that meets predetermined compliance requirements or standards. If a requested action is determined to be non-compliant, the floor plan 300 is not updated. Examples of compliant and non-compliant actions are described in further detail below.

Performing a Compliant Action

In some embodiments what actions are compliant actions and what actions are not compliant actions is configurable. For example, location information on the intended site of a building may be matched to compliance rules for the area in which the site is located. In some embodiments the location information is entered as an address. In some embodiments the location information is selected from a search parameter of the building plan search menu 102, for example, a region field 108. The region field 108 may include, for example, a country, a state, a province, a suburb or an address where the building is located. In some embodiments the location information is entered as GPS coordinates, which coordinates may be automatically determined from a GPS sensor connected to the computer system. The computer system stores different rules for two or more different areas and applies those rules as described herein.

In general a requested action in relation to a feature of the floor plan 300 is determined compliant if it does not contravene: 1) any compliance requirement for that feature (including any incorporated feature, such as doors or windows or other wall penetrations), 2) any compliance requirement for a combination of features including that feature. Item 2) includes determining compliance for any a) requirements for the adjusted feature in respect of other features and b) any requirements of other features of the floor plan. Taking for example a wall feature of the floor plan 300, the compliance requirements for the wall (compliance check 1 above) may include a minimum and a maximum length. The requirements for a combination of features may include the wall having a minimum clearance to any adjacent parallel feature (compliance check 2a above) and a minimum clearance between a door already on the floor plan and the adjusted wall (compliance check 2b above).

A door or window may also have its own compliance requirements, including for example being located at least at a predetermined minimum distance from an edge of a wall and/or an intersection of the wall and located with a minimum clearance between it and an adjacent door or window. The minimum clearances between different components may be the same, or they may be different. For example, the minimum clearance between two inward opening doors may be larger than the minimum clearance between a door a wall, which may be different to the minimum clearance between a window and a wall and so forth.

Simultaneous Adjustment of a Plurality of Building Features

Figure 6A:
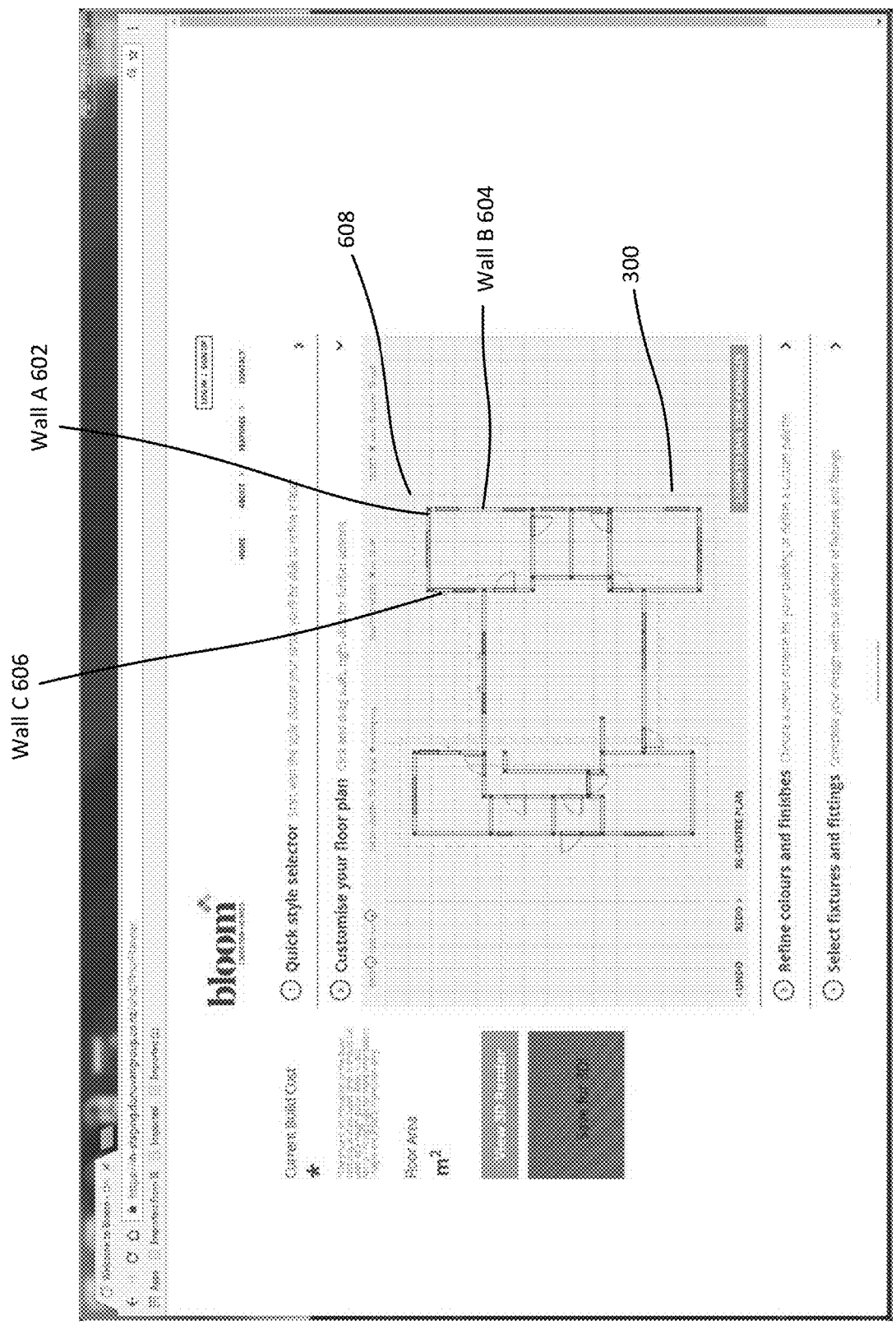
FIGS. 6A-6B illustrate exemplary user interfaces for adjusting a building component (interior and exterior walls) displayed in the floor plan of FIG. 3 in accordance with an embodiment.
Figure 6B:
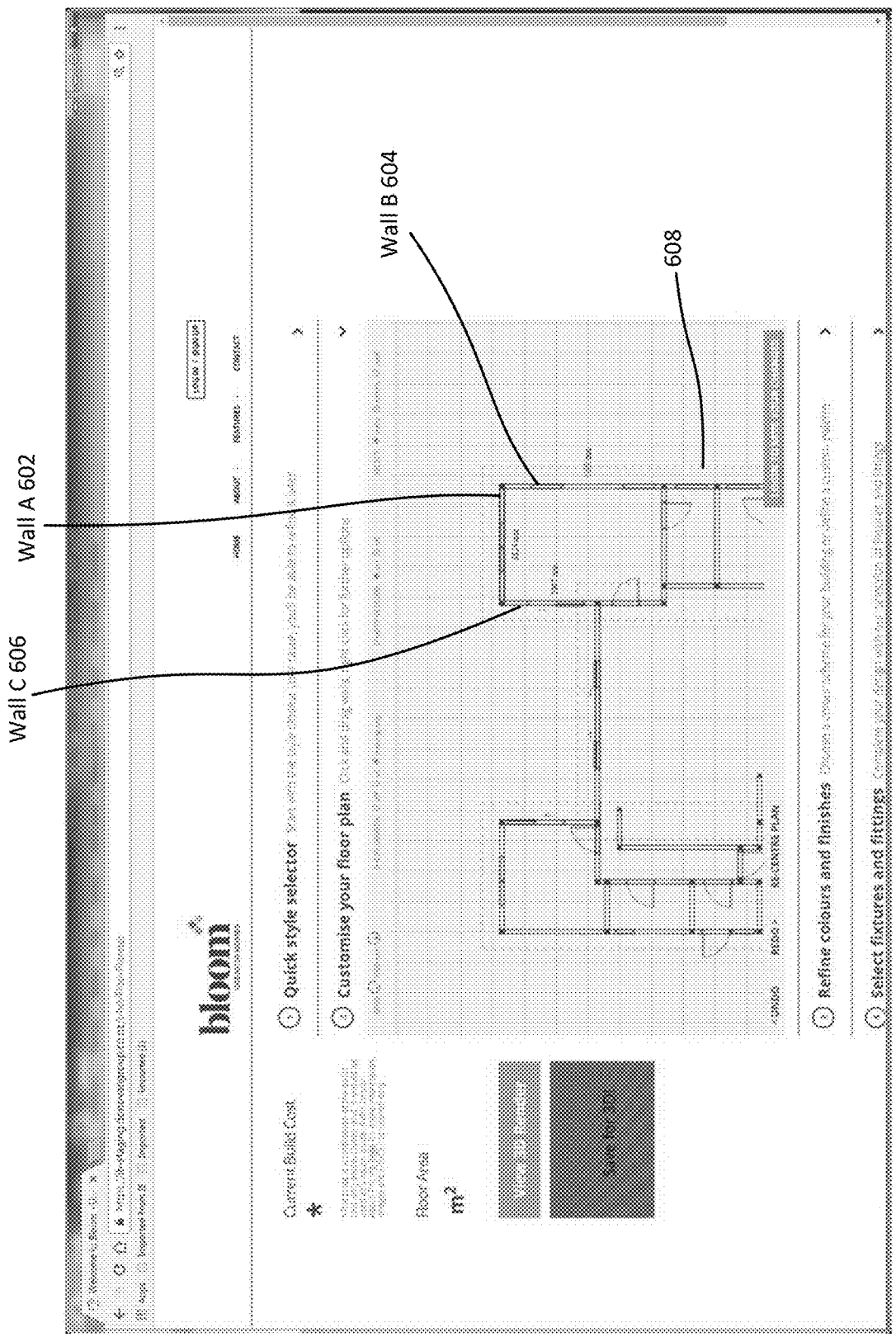

Referring in particular to FIGS. 6A and 6B a building feature, for example a wall, may be connected to one or more other building features. For example building component Wall A 602 is connected to adjacent building components Wall B 604 and Wall C 606.

In some embodiments a request for adjustment of one building feature causes an automatic request to adjust one or more other building features connected to that building feature. In the example shown in FIGS. 6A-6B, adjustment of Wall A 602 from a first position shown in FIG. 6A to a second position shown in FIG. 6B causes a corresponding adjustment of Wall B 604 and Wall C 606. It also causes a corresponding adjustment of the roof 608.

In particular, movement of Wall A causes Walls B and C to lengthen so as to maintain connection with Wall A and also causes the roof 608 to lengthen so as to continue to extend beyond the Wall A by a preconfigured amount. In some embodiments, as shown in FIGS. 6A-6B, the lengthening of Walls B and C is achieved by lengthening the section of those walls between the adjusted end of the wall and the first penetration of the wall, if any. In this way the penetrations on a wall that is being consequently adjusted due to adjustment of another feature stay in the same position. If the penetrations need to be moved, they are moved in a separate action. This may assist to reduce the occurrence of determinations of non-compliance in the compliance checks.

The floor plan 300 is updated from that shown in FIG. 6A to that shown in FIG. 6B in response to a determination that the adjustment of building components Wall A 602, Wall B 604, Wall C 606 and roof 608 are all compliant actions.

Selecting and Adjusting a Penetration

Figure 7A:
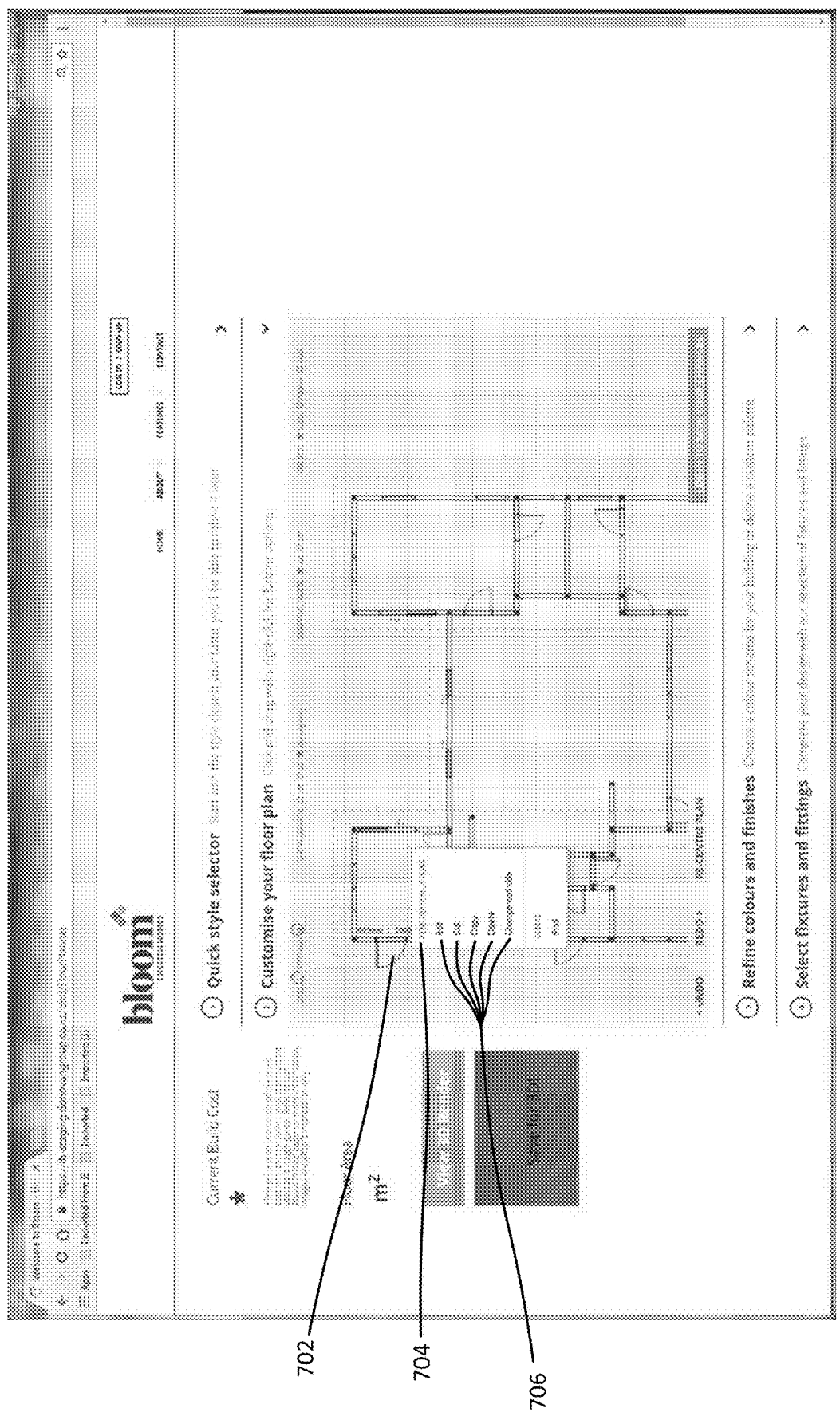
FIGS. 7A-7B illustrate exemplary user interfaces for adjusting a penetration added to the floor plan of FIG. 3 in accordance with an embodiment.

In some embodiments, in response to selection of a penetration of a wall, the user interface 100 displays a "Penetration Options" menu 704, including one or more actions that may be performed on the selected penetration, as shown in FIG. 7A.

Figure 7B:
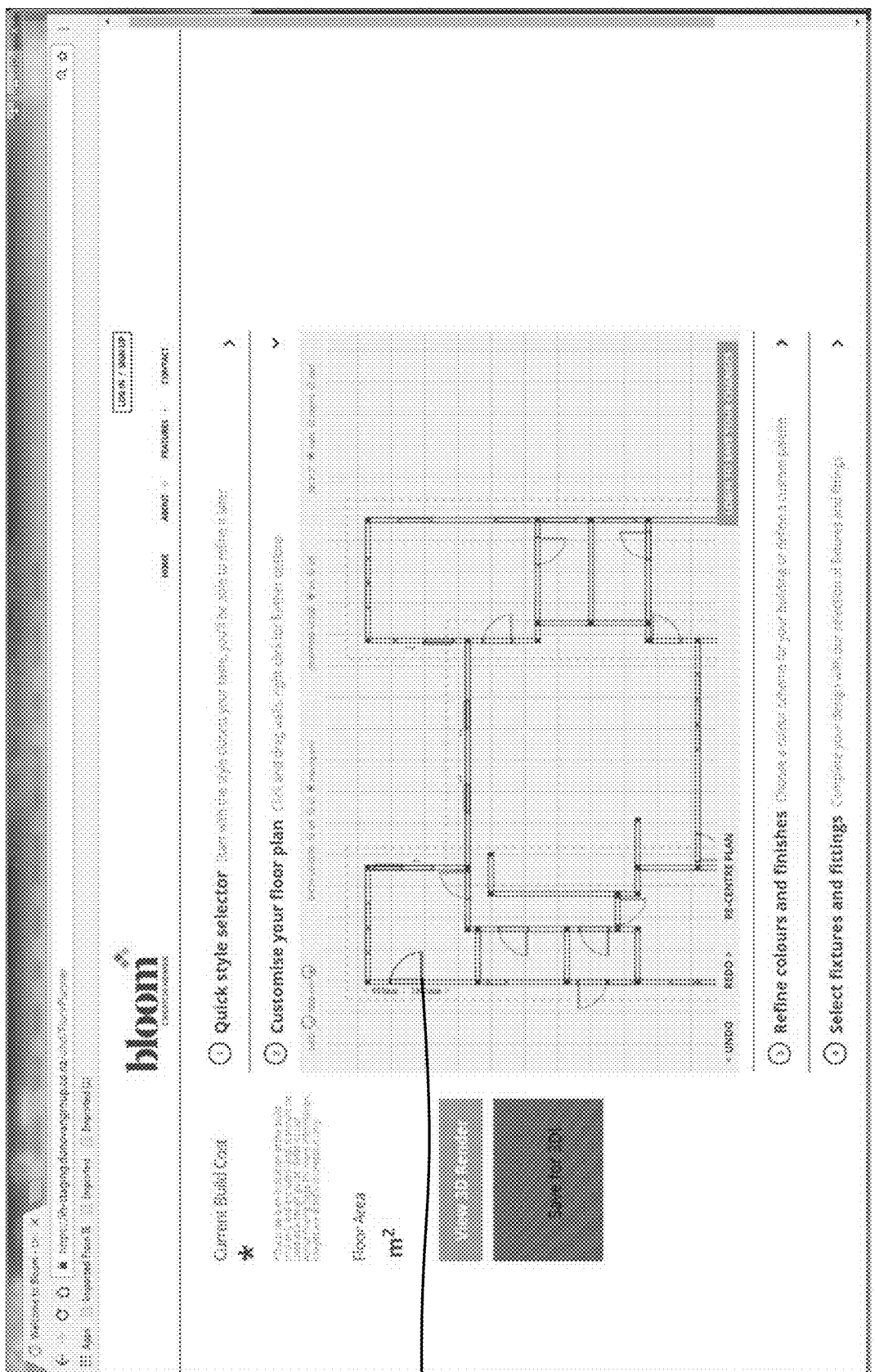

As shown in FIG. 7A, responsive to user selection of penetration 702 the user interface 100 displays a "Penetration Option" menu 704. In some embodiments the menu 704 includes an indication of the feature that was selected, in this case a penetration. In this way feedback is provided to the user to assist them in confirming the item that has been selected. The menu 704 has one or more actions 706 that may be performed on the penetration. One example action is "Delete", which removes the penetration from the wall, which will then extend over the area previously occupied by the penetration. Another example action is "Change wall side", which when selected by the user causes a determination as to whether a change in the side of the opening of the penetration (e.g. opening outwards) is a compliant action. In response to a determination that this change is a compliant action, the user interface displays the updated floor plan with the penetration 702 opening inwards, as shown in FIG. 7B.

In another embodiment, the floor plan 300 is updated based on the adjustment of penetration 702 being a compliant action.

In some embodiments a penetration can be copied for use in another part of the floor plan. For example, the user selects a penetration, selects a copy button, sign, or menu item, or enters a copy command, and then selects to "paste" the penetration at a location. In this way penetrations can readily be kept standard or alike throughout a floorplan, for example by using copied doors and windows across various locations in the floor plan.

Selecting and Adjusting a Wall

In some embodiments, in response to selecting a wall, the user interface displays a "Wall Options" menu 804 or 904. The menu 804, 904 includes an indication of the feature selected, in this case indicating a wall by the label "Wall Options". The menu 804, 904 includes one or more actions that may be performed on the selected wall (see FIGS. 8A and 9A respectively).

Figure 8A:
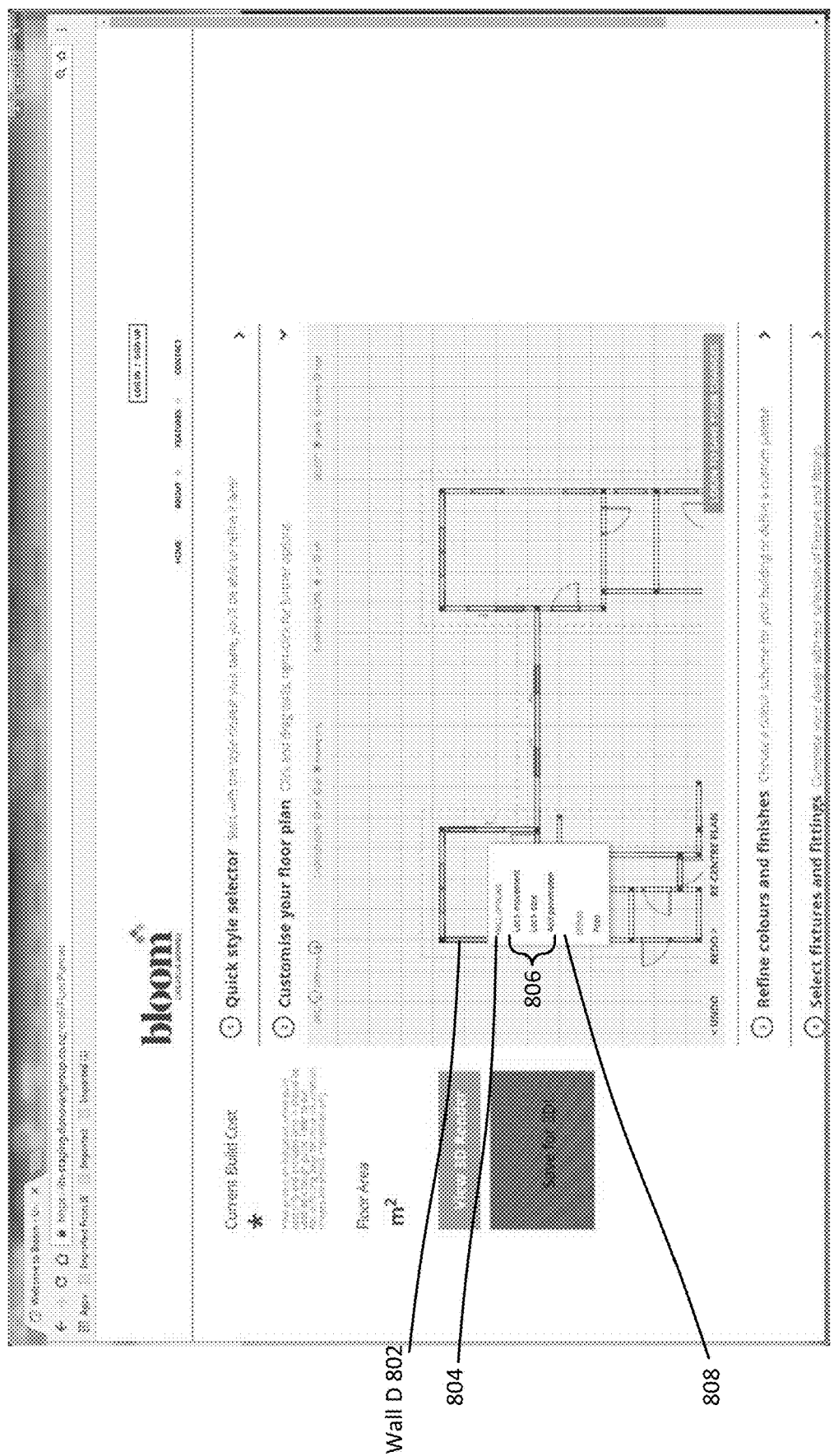
FIGS. 8A-8C illustrate exemplary user interfaces for adding a penetration to the floor plan of FIG. 3 in accordance with an embodiment.
Figure 9A:
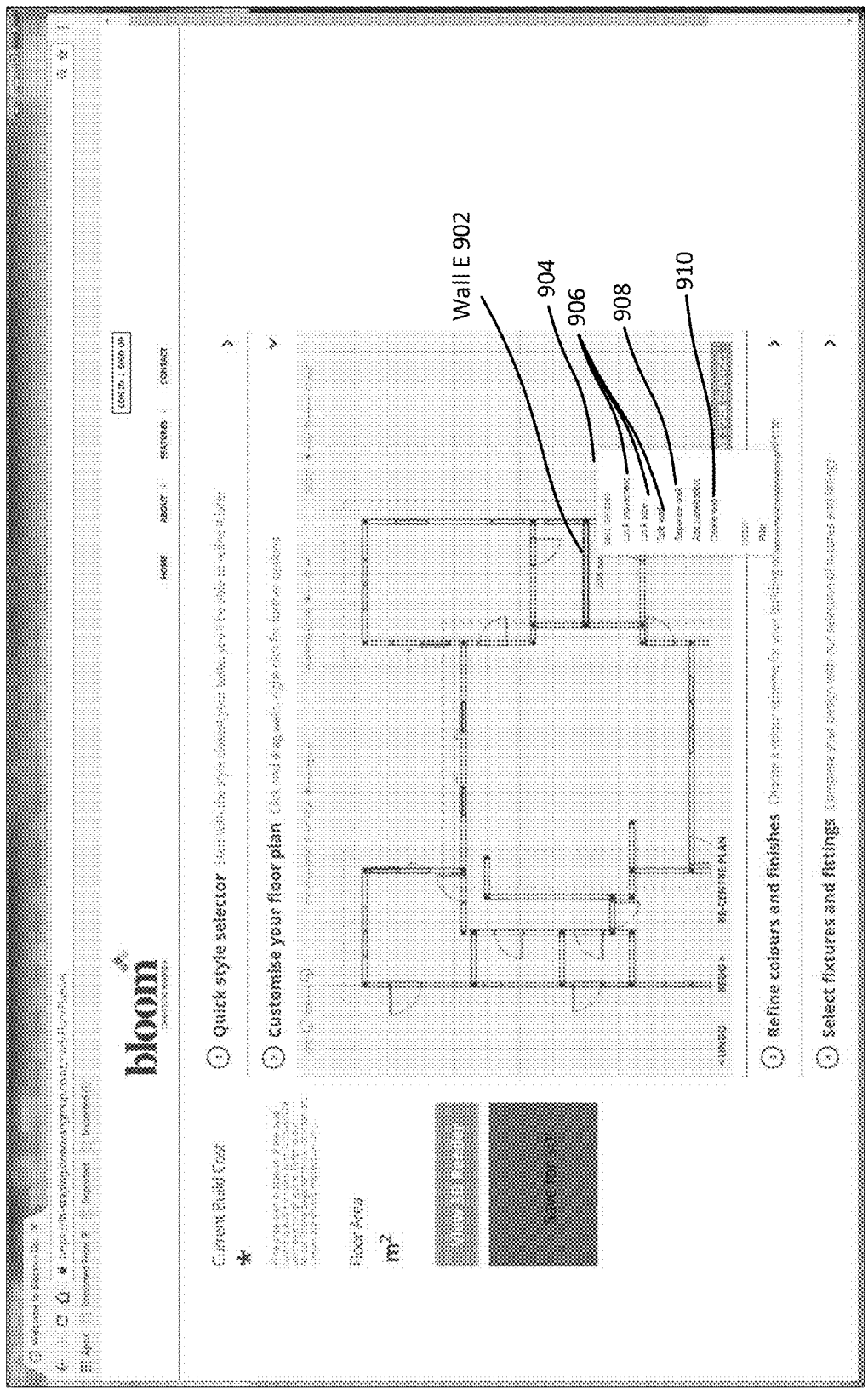
FIGS. 9A-9B illustrate exemplary user interfaces for adding a penetration to the floor plan of FIG. 3 in accordance with another embodiment.

In some embodiments the menu displayed or the content of the menu changes depending on the context of the wall. For example, as shown in FIG. 8A, selection of external Wall D 802 displays a "Wall Option" menu 804 including one or more action items 806. As shown in FIG. 9A selection of internal Wall E 902 displays a "Wall Option" menu 904 including one or more action items 906, which are different from the one or more action items 806.

Figure 8B:
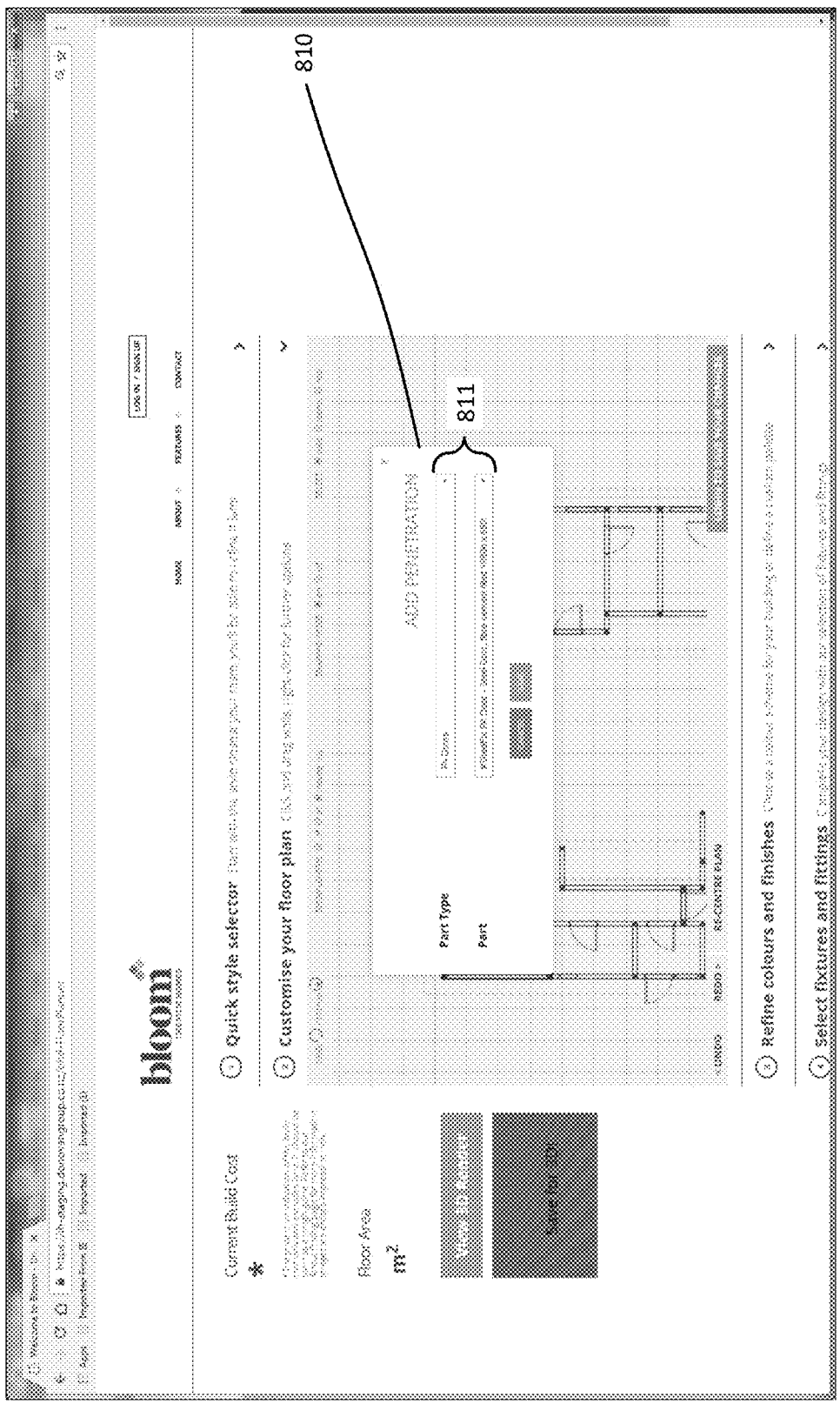
Figure 8C:
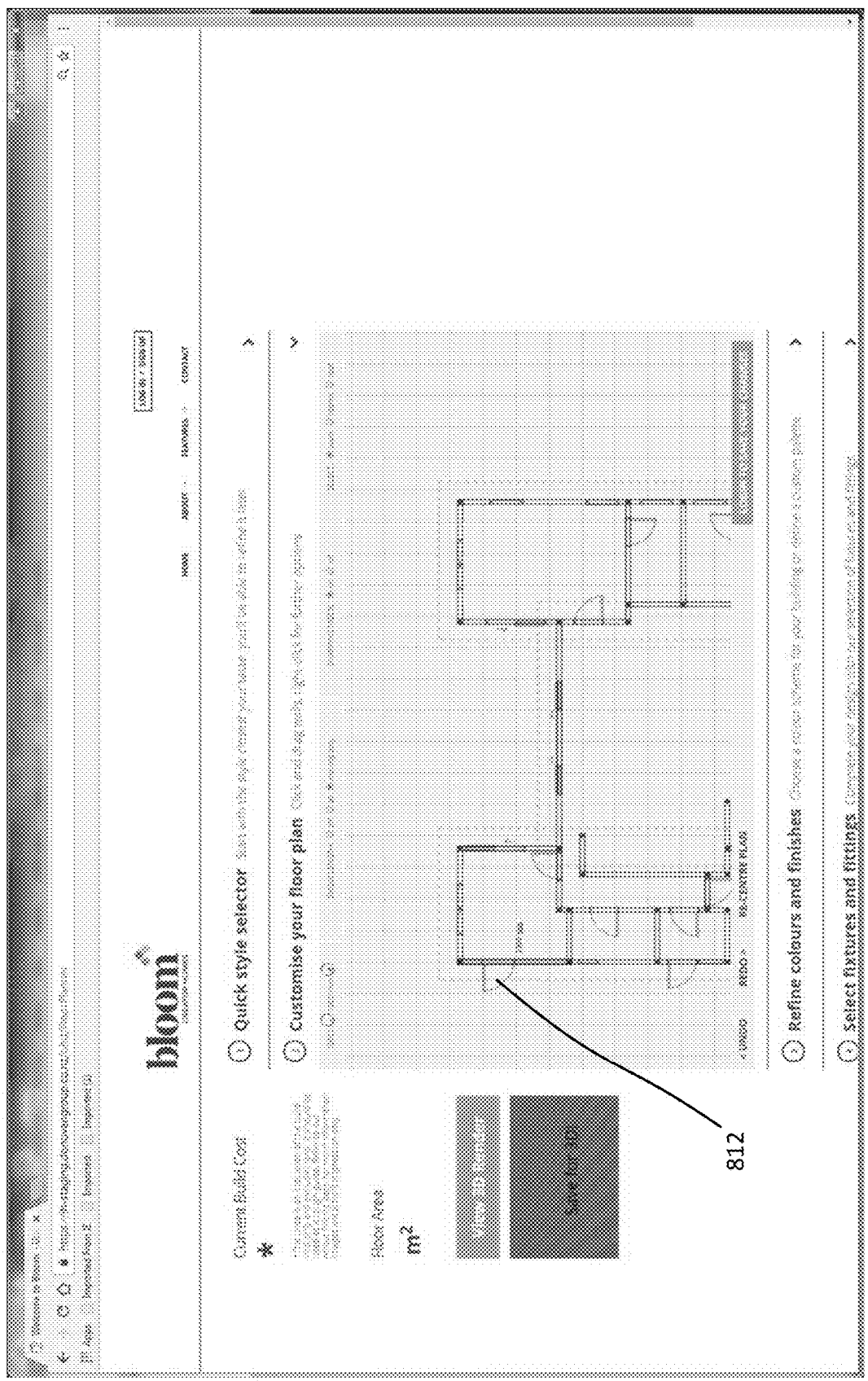

In some embodiments, in response to the selection of the "Add penetration" action item 808, an "Add Penetration" menu 810 is displayed, for example as shown in FIG. 8B. The "Add Penetration" menu 810 may in turn display one or more drop-down menus 811 containing the different types of penetrations available and their characteristics. Selection of a penetration 812 having the type and characteristics selected in menu 810 causes a determination as to whether adding such a penetration 812 is a compliant action at one or more locations along the wall. In response to a determination that adding the penetration is a compliant action at a location along the wall, the user interface displays the updated floor plan with the penetration 812 at that location, as shown in FIG. 8C. In some embodiments the determination of compliance is made in relation to one location, based on the location of the user input along the wall when the wall was selected. In other embodiments, the determination of compliance is made in relation to a range of locations. The range may be, for example, a range about the location of the user input along the selected wall, a range that spans the entire wall or another range. Where there are multiple compliant locations for the penetration, the user interface selects one, for example closest to the user input location or closest to one end of the wall or closest to a mid-point of the wall.

In some embodiments, "Wall Options" menu 804 or 904 includes a lock action, for example actions "Lock Movement" and/or "Lock Size" shown in FIGS. 8A and 9A. Selection of the lock action prevents certain changes to the feature. For example selecting Lock Movement on a wall prevents the user from moving the wall away from its current location. Selecting "Lock Size" prevents the user from changing the length of the wall, including by moving a connecting wall. In the case of a request to move a connecting wall that would result in a lengthening or shortening of a locked wall, in one embodiment the request is deemed non-compliant. In another embodiment the connection between the walls is automatically broken.

In some embodiments functionality to lock features in a base plan, for example a wall, is provided when the user interface is in one mode of operation, for example an administrator mode and not when the user interface is in another mode of operation, for example a user mode. The effect of locking or unlocking a wall is reflected in the other mode(s) of operation.

Figure 9B:
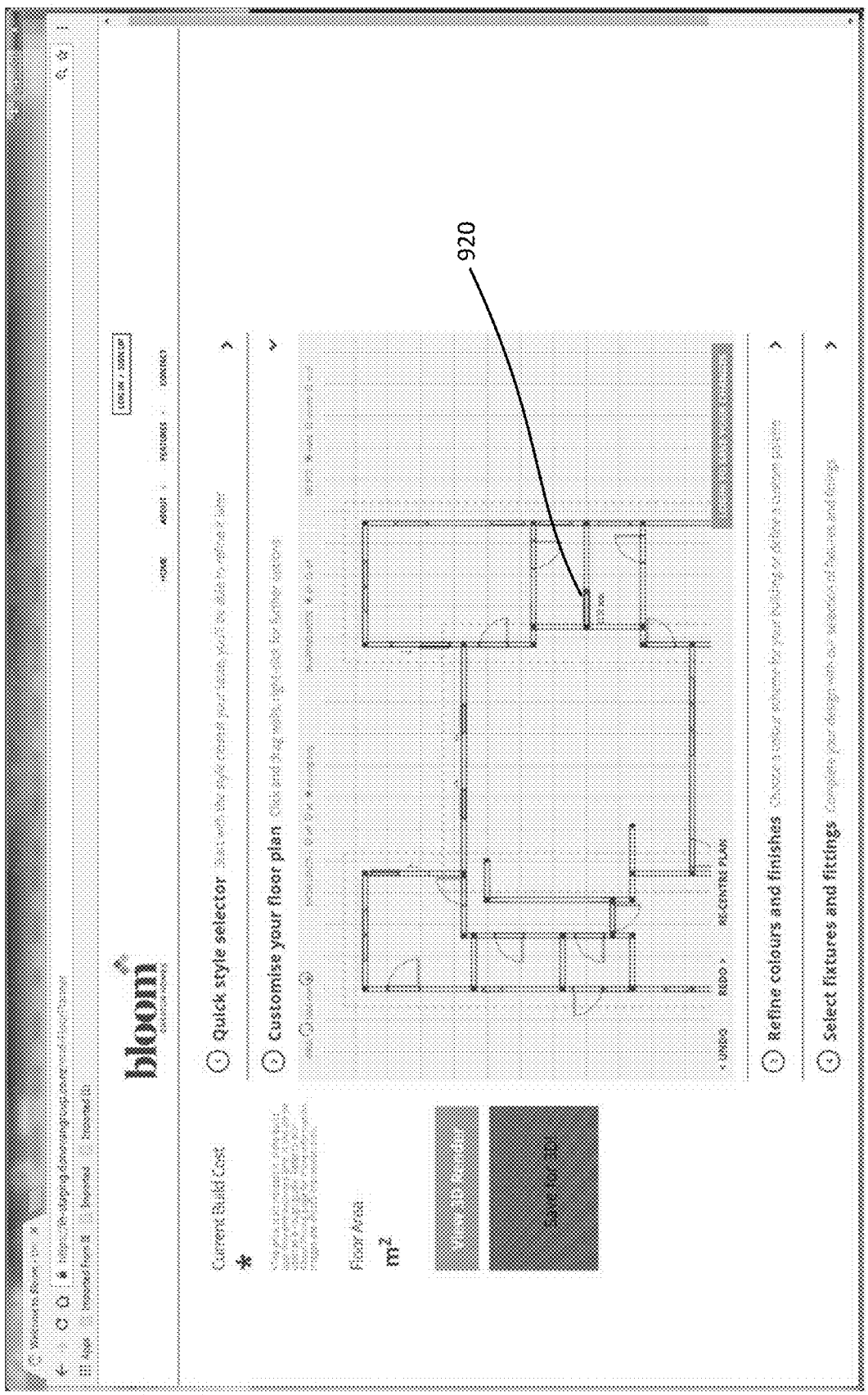

In another example shown in FIG. 9A-9B, the floor plan 300 is updated in response to a determination that an action performed on Wall E meets one or more compliance requirements. As shown in FIG. 9A, selection of internal Wall E 902 displays a "Wall Option" menu 904 having a different set of actions compared to the "Wall Option" menu 704 of FIG. 7A. In the example of FIG. 9A, the internal Wall E 902 is associated with the display of the additional actions "Split wall" 906, "Separate wall" 908 and "Delete wall" 910. In one example, selection of the "Split wall" 906 action item will cause a determination as to whether such an action is a compliant action. In response to a determination that this action is a compliant action, the user interface displays the updated floor plan with the split wall 920, as shown in FIG. 9B. The split wall 920 includes one wall to either side of the new node displayed in FIG. 9B. The length and position of the resulting two walls within the split wall 920 may then be separately adjusted (e.g. moved, resized, deleted, penetration added).

Adding a Building Component to the Floorplan

Figure 27A:
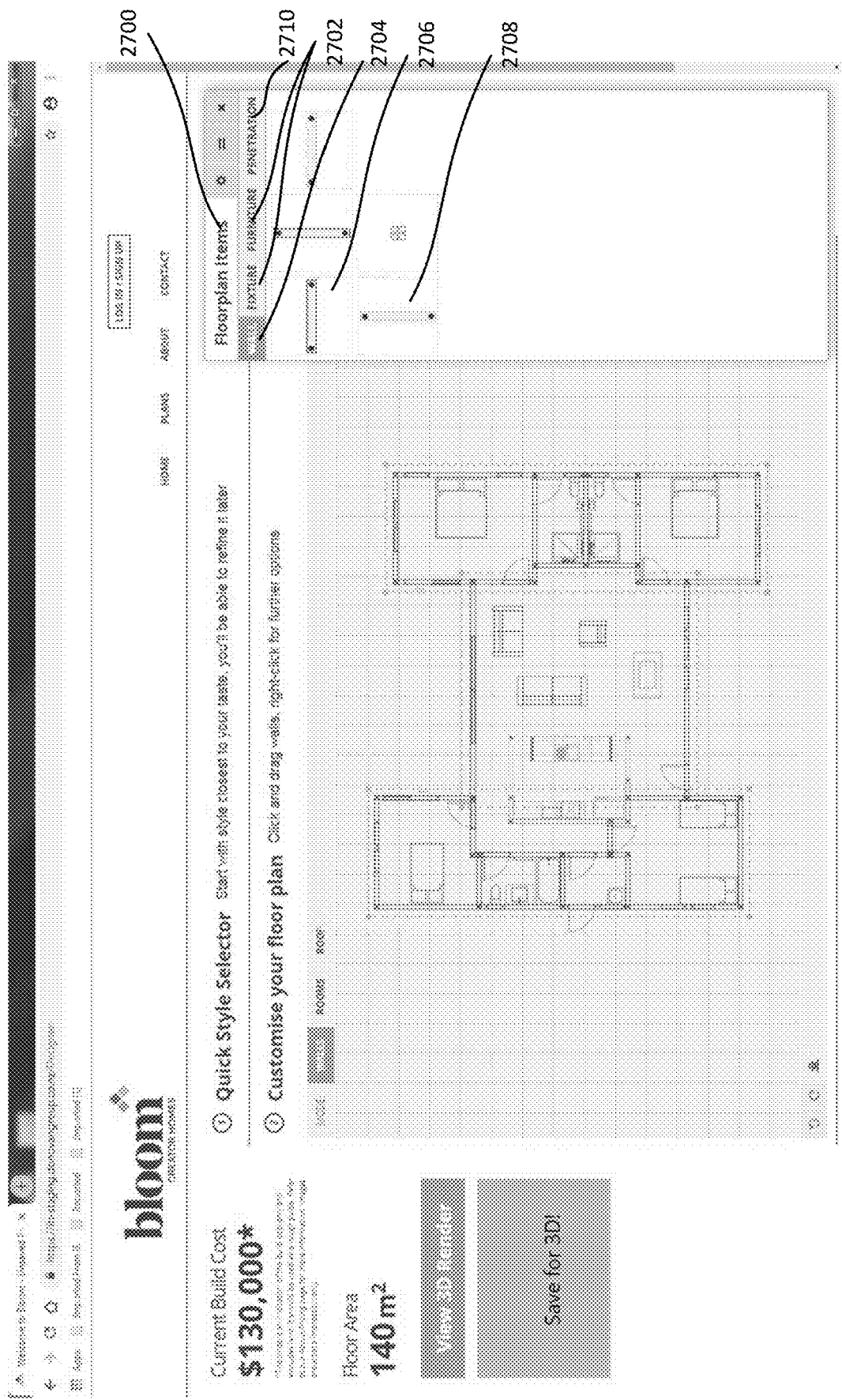
FIGS. 27A-27H illustrate a feature dock for adding one or more features to the floor plan of FIG. 26 in accordance with an embodiment.

In some embodiments, selection of an icon 2606 displays a feature dock 2700 including one or more building components that may be added to the floorplan 300 of the building 316. In some embodiments, the one or more building components available in the feature dock are based on contextual information, such as a selection of a category from the feature menu 308. The one or more building components that may be added to the floorplan 300 may also be displayed in one or more menus 2702. As shown by example in FIG. 27A, selection of the icon 2606 and the "Walls" category of the feature menu 308 displays a feature dock 2700 having one or more menus 2702 including a "Wall" menu, a "Fixture" menu, a "Furniture" menu, and a "Penetration" menu. In one example, selection of the "Wall" menu 2704 displays one or more wall structures that may be added to the floorplan 300 such as internal walls, external walls and vertical beams. The one or more wall structures that may be added to floorplan 300 may be represented by a visual indicator indicating the various characteristics of the wall structure. For example, visual indicator 2706 indicates a horizontal external wall indicated by a solid dark outline, while visual indicator 2708 indicates a vertical internal wall 2708 indicated by a light grey outline. A wall structure may be added to the floorplan 300 in response to a "drag-and-drop" action of the selected wall structure from the dock 2700 to a desired position on the floorplan 300 and in accordance with a determination that adding the wall structure is a complaint action.

Figure 27B:
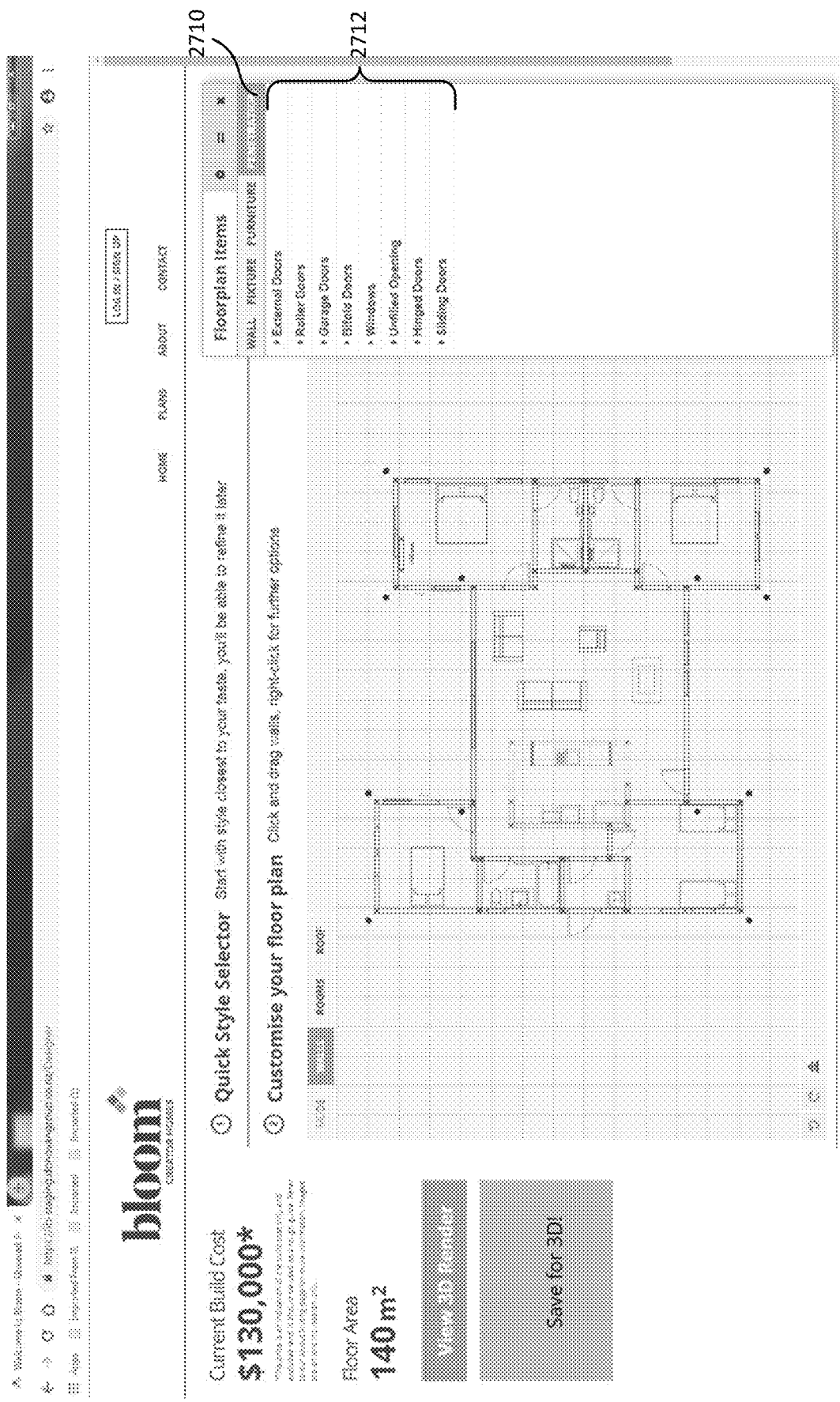
Figure 27C:
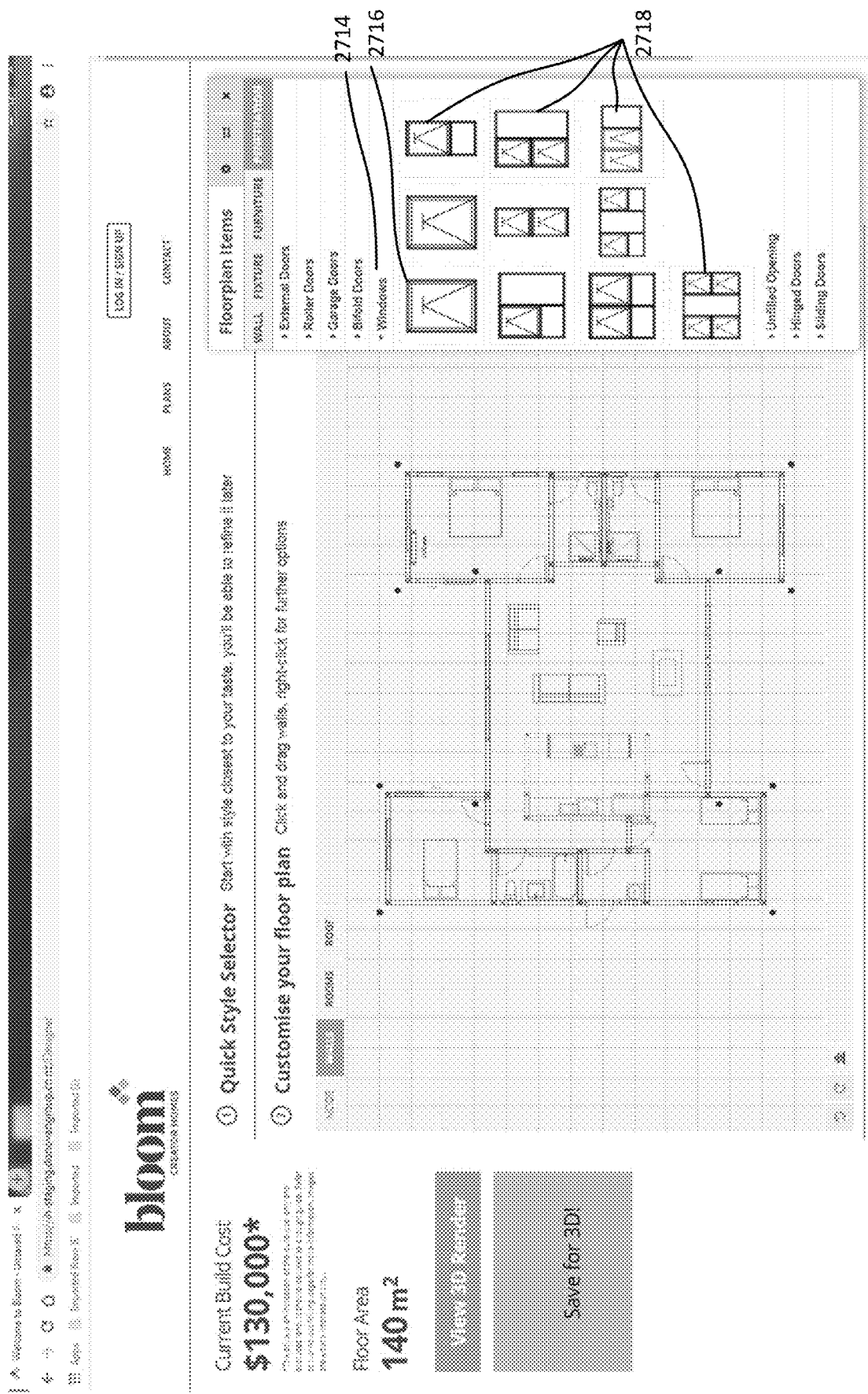
Figure 27D:
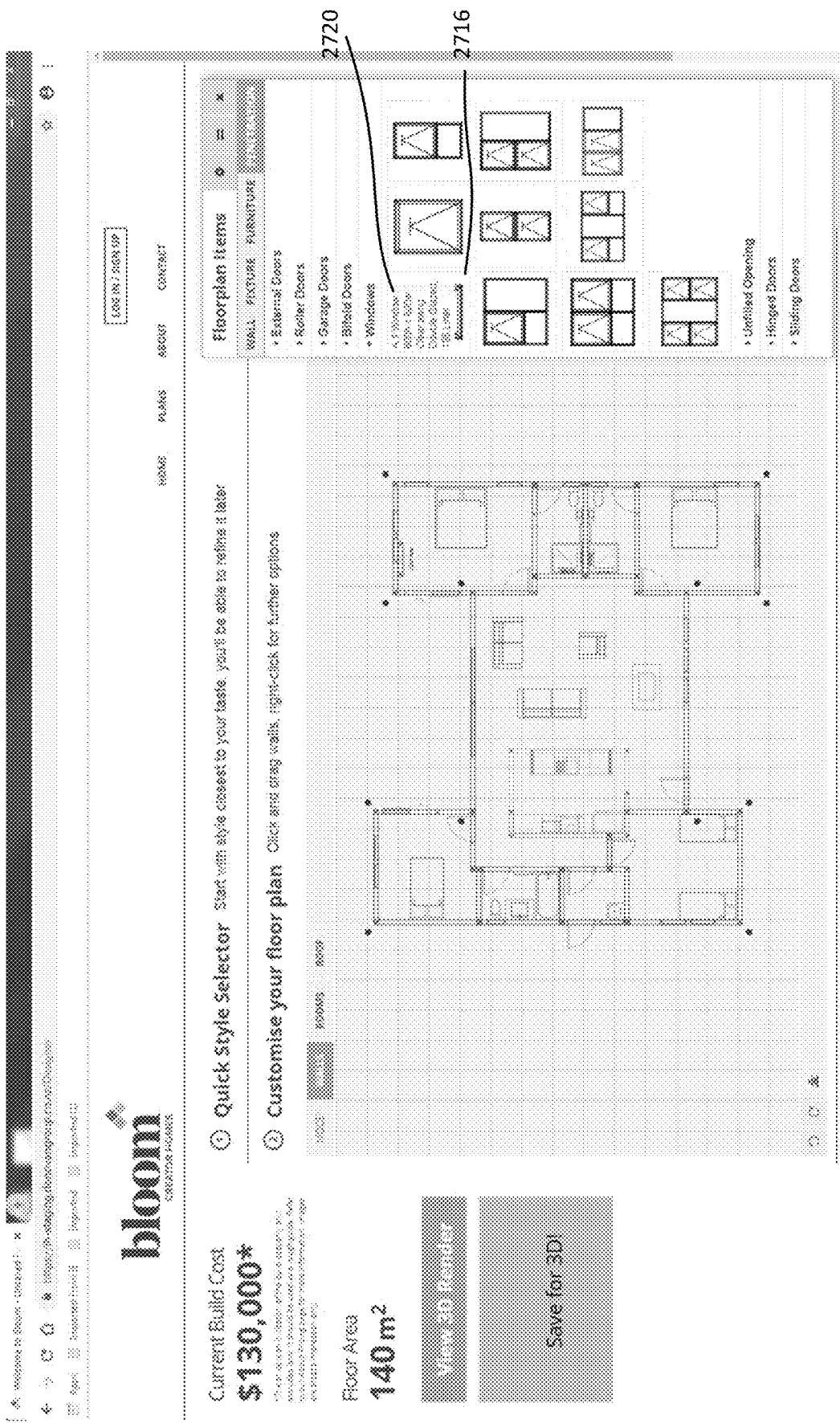

In another example shown in FIGS. 27B-27D, selection of the "Penetration" menu 2710 displays one or more sub-menus 2712 identifying one or more penetrations that may be added to the floorplan 300 such as "External Doors", "Roller Doors", "Garage Doors", "Bifold Doors", "Windows", "Unfilled Opening", "Hinged Doors" and "Sliding Doors". In one example, selection of the sub-menu "Windows" 2714 displays one or more visual indicators 2718 indicating the various types of windows that may be added to the floorplan 300. In some embodiments, when a cursor is located over, or within a minimum threshold distance to, a visual indicator, information relating to a respective feature is displayed. For example, information 2720 is displayed when a cursor is positioned over the visual indicator 2716 in FIG. 27D.

Figure 27E:
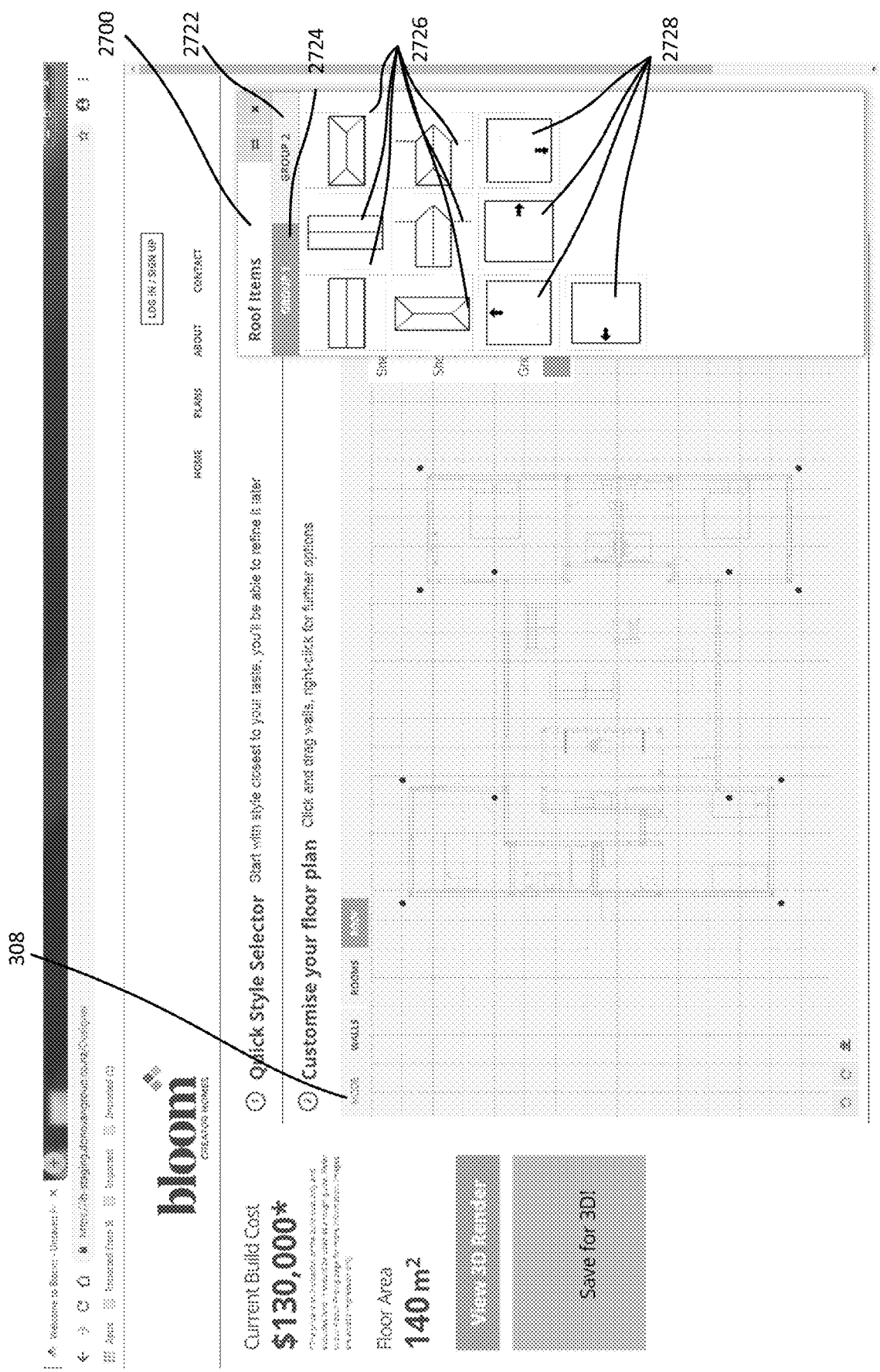

In another example shown in FIG. 27E, selection of the "Roof" category of the feature menu 308 updates dock 2700 to have one or more menus relating to the one or more roof structures that may be added to the floorplan 300. In some embodiments, the one or more roof structures may be grouped based on their characteristics. In one example, selection of the "Group 1" menu 2724 displays one or more roof planes indicated by visual indicators 2726 that may be added to the floorplan 300. One or more positional indicators 2728 indicating the direction of fall of a roof plane from the highest point to the lowest point may also be displayed in response to selection of the "Group 1" menu 2724.

Figure 27F:
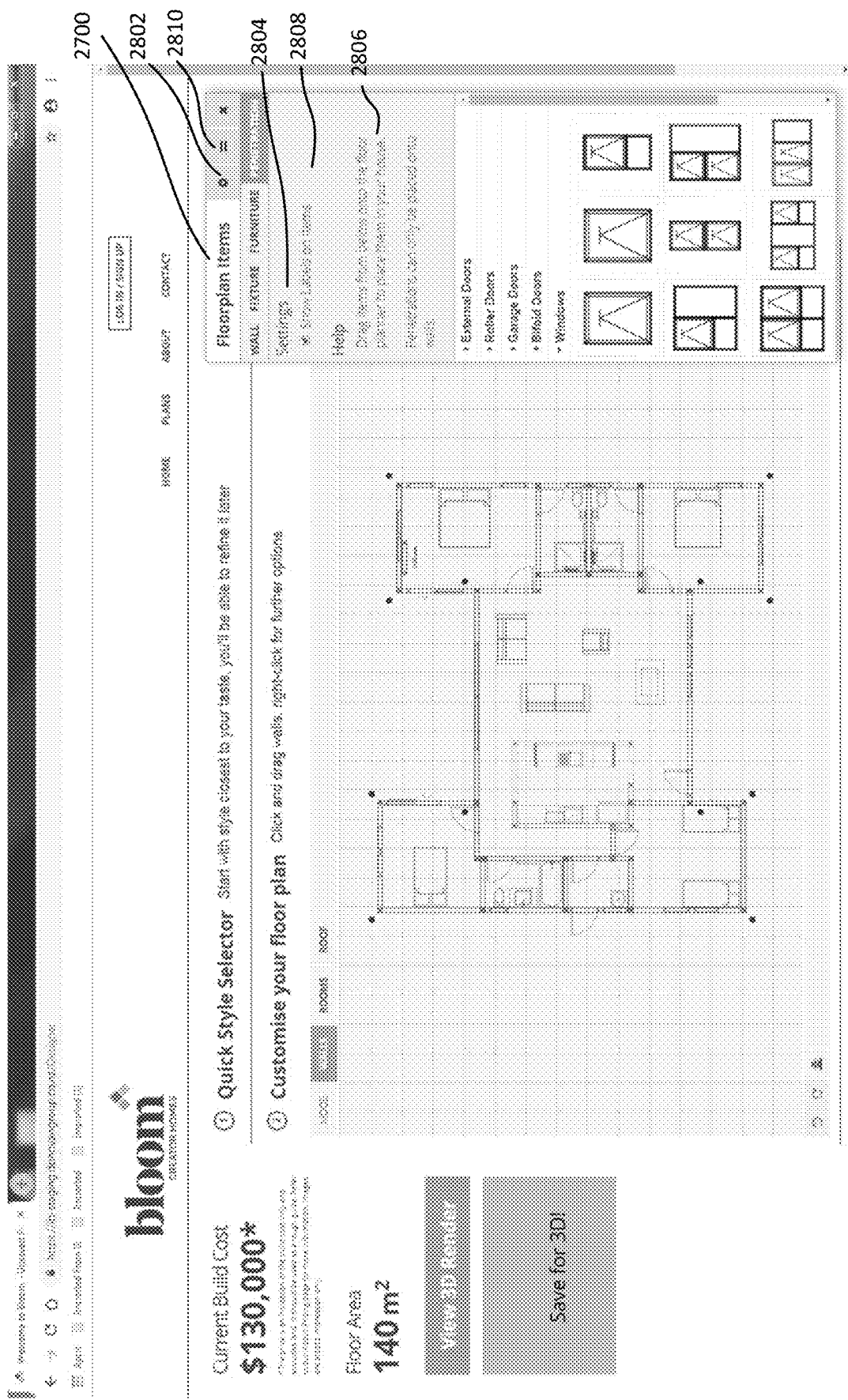
Figure 27G:
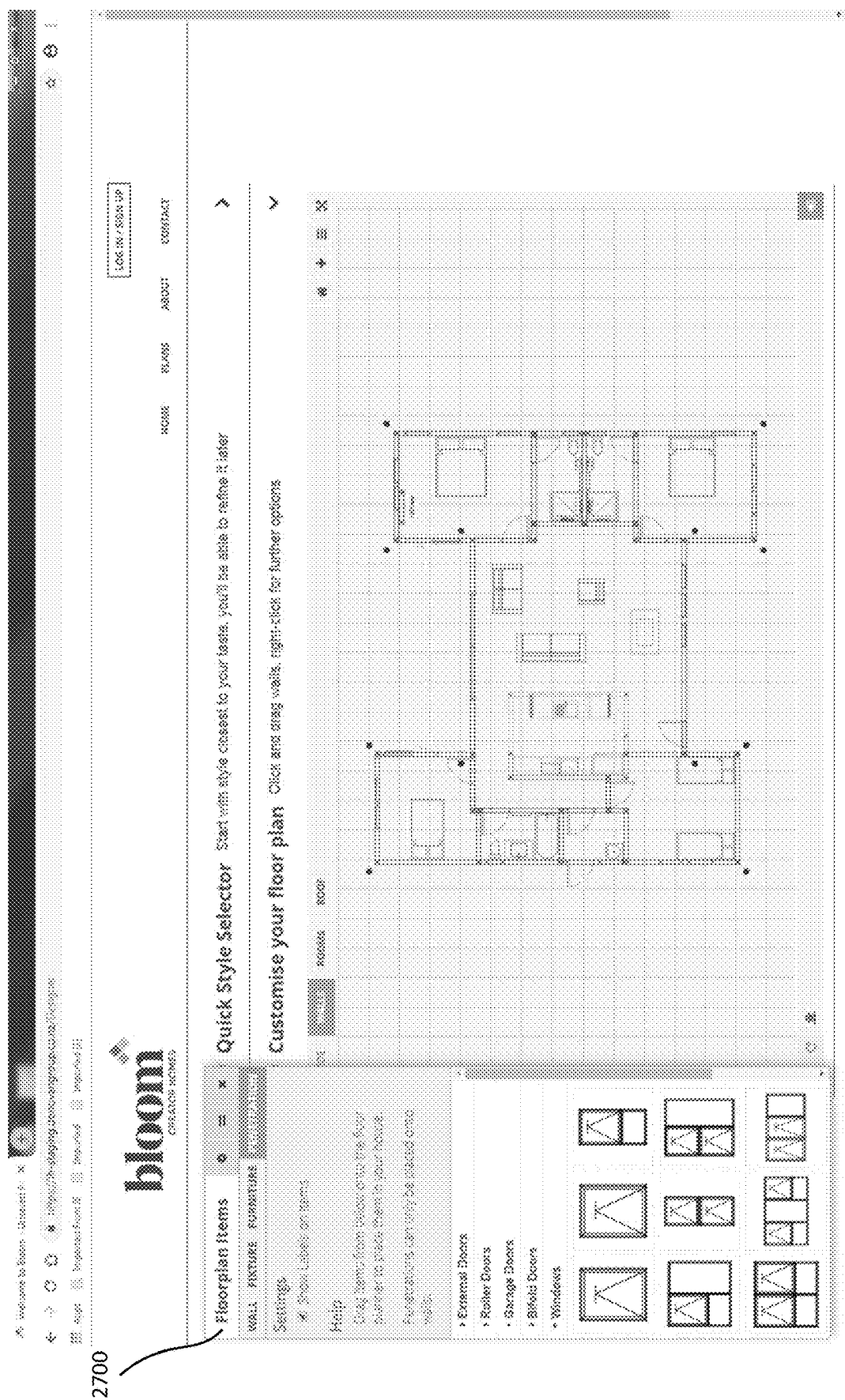
Figure 27H:
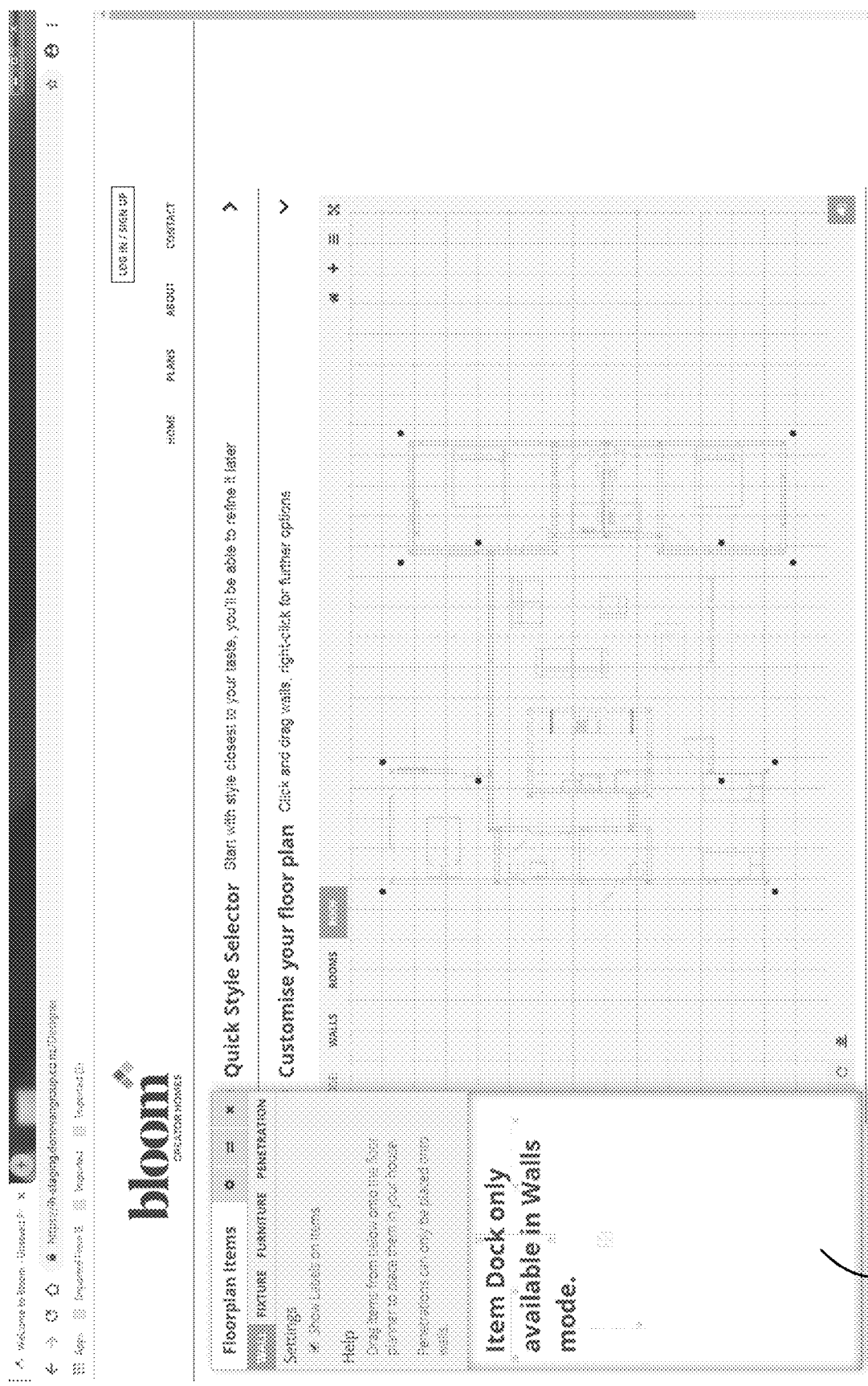

If selection of a category from the feature menu 308 is unsupported by the feature dock 2700, a notification 2812 may be displayed indicating that the feature dock 2700 is unavailable, as shown by example in FIG. 27H. The feature dock 2700 may be displayed either separately or in combination with the grid dock. 2602. In some embodiments the feature dock may be automatically re-sized in response to changes in the display settings of the floorplan 300, for example, in response to a "zoom in" of the floorplan 300.

In some embodiments, the feature dock 2700 may display one or more icons to adjust the settings of the feature dock 2700. In one example shown in FIG. 27F, selection of the "cog" icon 2802 displays a "Settings" menu 2804 and "Help" information 2806. The "Settings" menu 2804 may display one or more selection boxes to perform various actions with respect to the features displayed in the feature dock 2700. For example, selection of the selection box 2808 will display labels on items displayed in the feature dock 2700. The "Settings" menu 2804 and "Help" information 2806 may be displayed in conjunction with, or separately to, the one or more menus and visual indicators of the feature dock 2700. In another example, selection of the "bi-directional arrows" icon 2810 will move the feature dock 2700 from a first position shown in FIG. 27F to a second position opposite the first position as shown in FIG. 27G.

Performing a Non-Compliant Action

In one embodiment, when an action is determined to be a non-compliant action the floor plan 300 is prevented from being updated or modified by the user. For example, adjustment of the roof structure to a dimension that is smaller than the internal dimensions of the building will be prevented from occurring and the floor plan is not updated.

Figure 10:
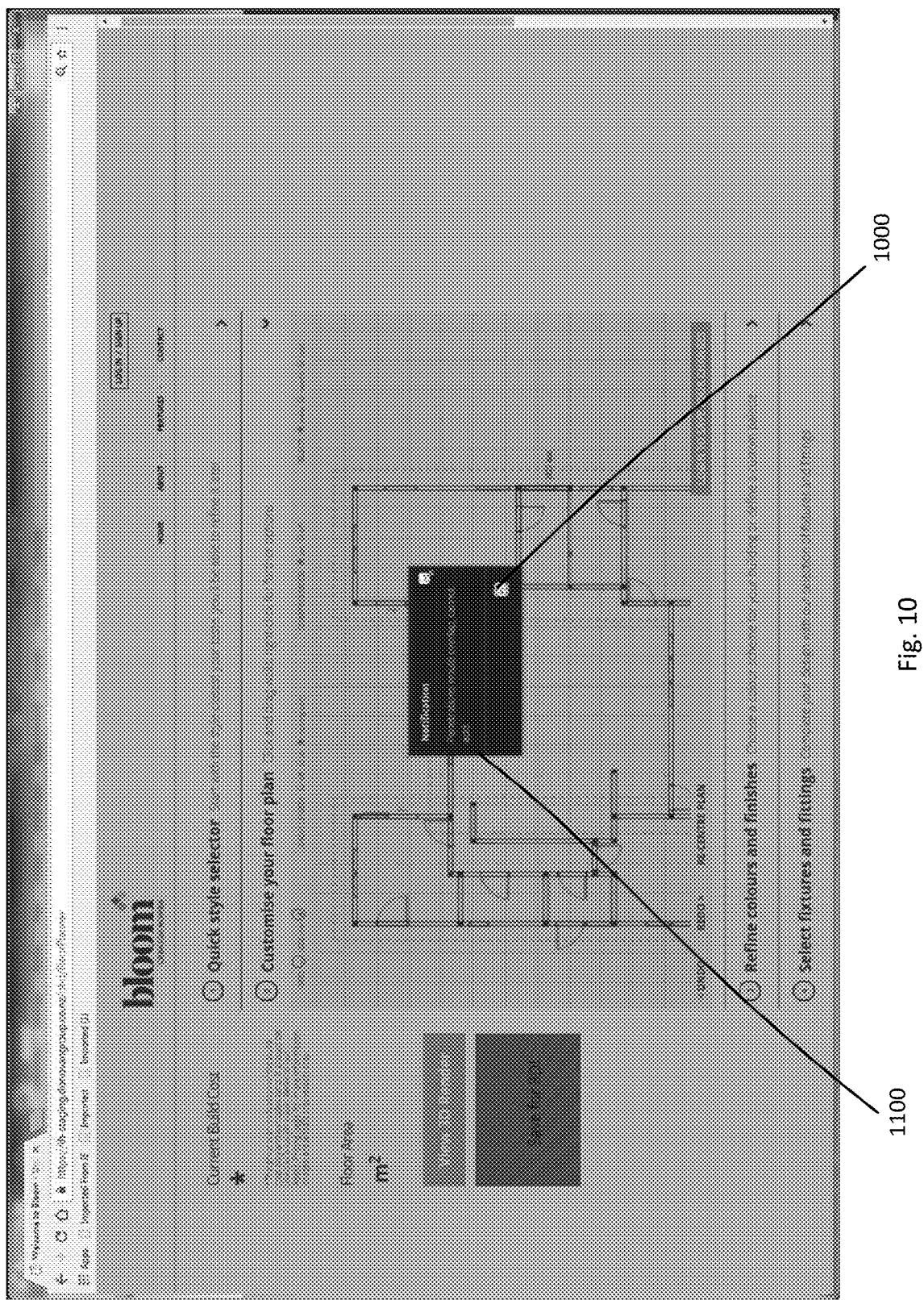
FIG. 10 illustrates an exemplary user interface for notifying a user that a non-compliant action has been performed with respect to the floor plan of FIG. 3 in accordance with an embodiment.

In some embodiments, in response to a determination that a non-compliant action has been performed, the floor plan 300 reverts to a previous compliant floor plan 300. To provide feedback to the user, a notification 1000 may be displayed by the user interface to the user, indicating the one or more actions that do not meet one or more compliance requirements. As shown in the example of FIG. 10, the displayed notification may include further information 1100 such as a reason as to why the action could not be performed.

In some embodiments the user interface 100 presents a suggested compliant floor plan 300 to the user, for example by determining whether any intermediate change between the previous compliant floor plan 300 and the requested change is compliant and if so displaying the compliant change determined to be closest to the requested change. A notification may additionally be displayed, similar to the notification shown in FIG. 10, to provide the user with feedback why the full extent of the change was not compliant.

Automatic Alignment

Figure 11:
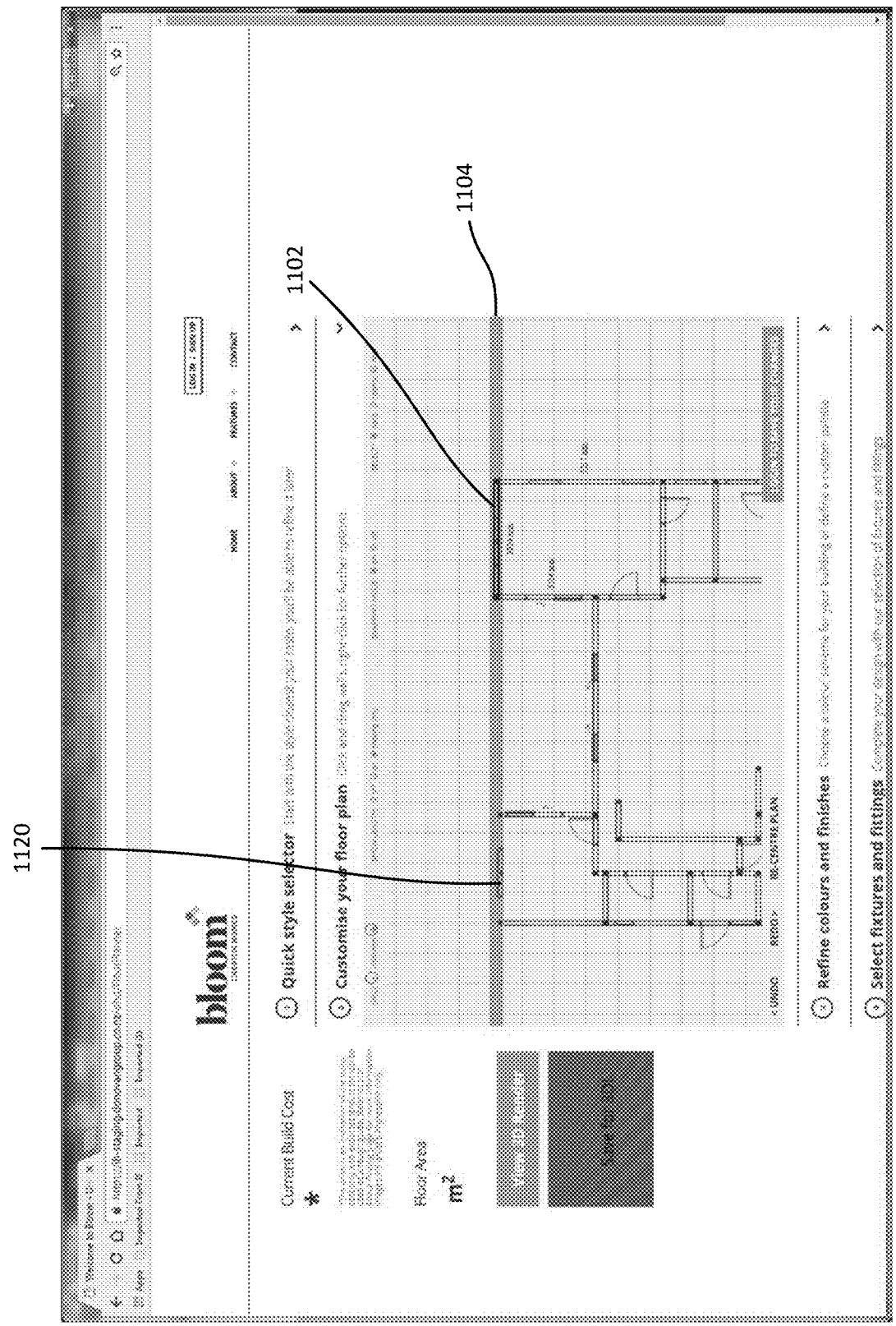
FIG. 11 illustrates an exemplary user interface for automatically adjusting aligned features shown in the floor plan of FIG. 3 in accordance with an embodiment.

In some embodiments, selection of a building component initiates detection and selection of one or more additional building components that are in alignment with the selected building component. Selection of the one or more building components and/or the alignment of these features may be represented in the floor plan 300 by one or more visual indicators. For example, alignment of building components Wall 1102 and Wall 1120 may be represented in the floor plan 300 by the horizontal line indicated by 1104 in FIG. 11. The selected building components may also be visually distinct from each other and/or the visual indicator indicating the alignment of these components.

In some embodiments, the selected building component and the one or more aligned building components may be modified separately or concurrently to each other. In one example shown in FIG. 11, adjustment of building component Wall 1102 will cause automatic selection and adjustment of aligned building component Wall 1120. The floor plan 300 will be updated in response to a determination that the adjustment of building component Wall 1102 and Wall 1120 are compliant actions. In the instance that the adjustment of the selected building component and the aligned building component is a non-compliant action, the building components 1102 and 1120 will return to their original compliant starting positions or will be displayed at a suggested compliant position in the floor plan 300.

Automatic Connection

In some embodiments, a first building component automatically connects to a second building component when the first building component is moved to a location within a threshold distance from the second building component and in response to a determination that this connection is a complaint action. One or more visual indicators associated with the first building component, the second building component or the grid may assist the user in identifying the relevant building components and grid squares during connection of the first building component to the second building component.

For example, visual indicators 1200-1208 may represent a terminating end 1212 of a first building component 1210 and the grid square G1 that the terminating end 1212 of the first building component 1210 is located in, as shown in FIG. 12A. It will be appreciated that in other embodiments the visual indicator 1200 may be displayed without indicators 1202 to 1208 or the visual indicators 1202 to 1208 may be displayed without the visual indicator 1200.

The visual indicator 1200 associated with the terminating end 1212 of the first building component 1210 may be visually distinct with respect to the grid square indicators 1202-1208 (if any). The grid point 1202 located closest to the terminating end 1212 of the first building component may also be visually distinct with respect to the remaining grid point indicators 1204-1208.

Figure 12B:
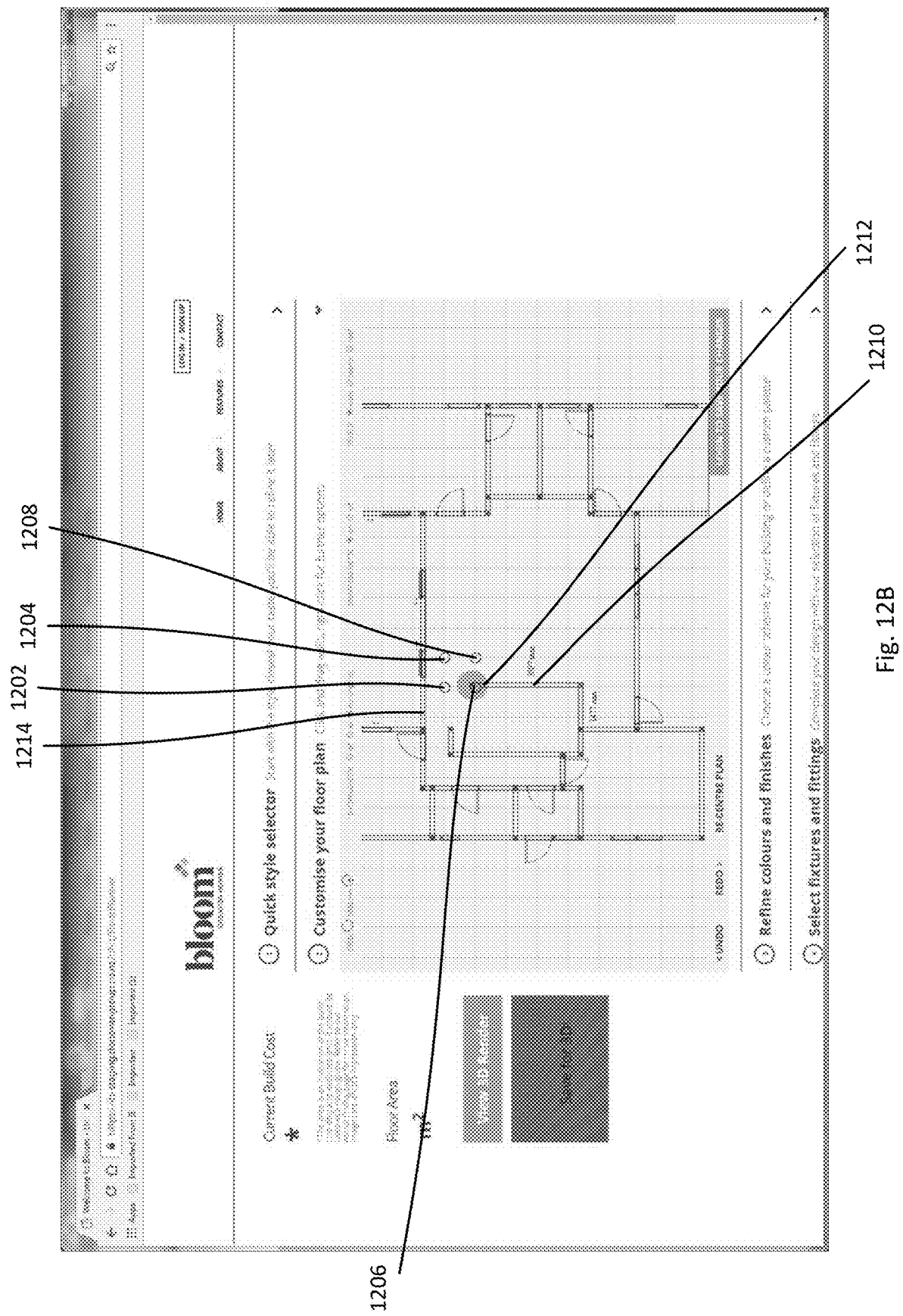
Figure 12C:
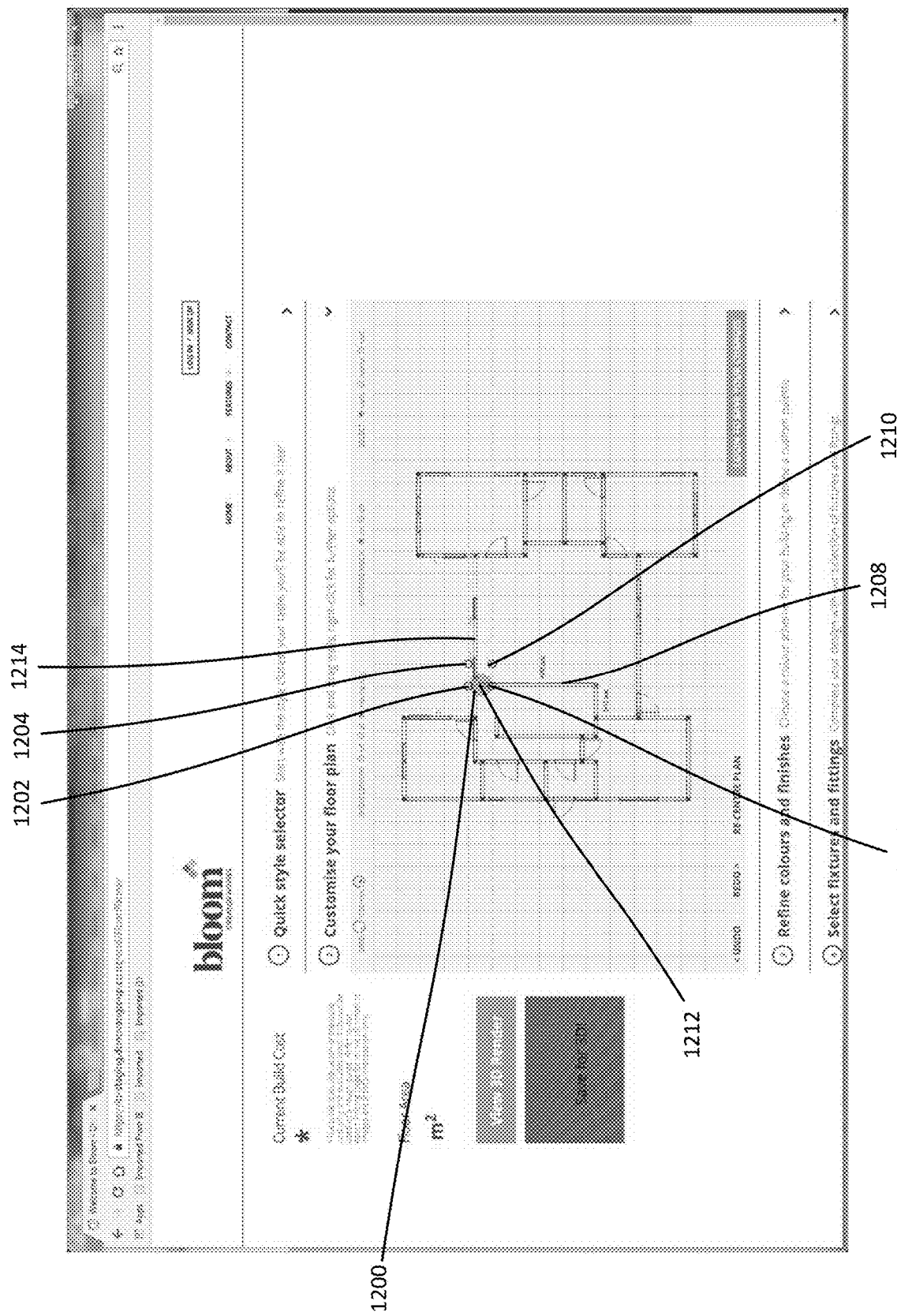
Figure 12D:
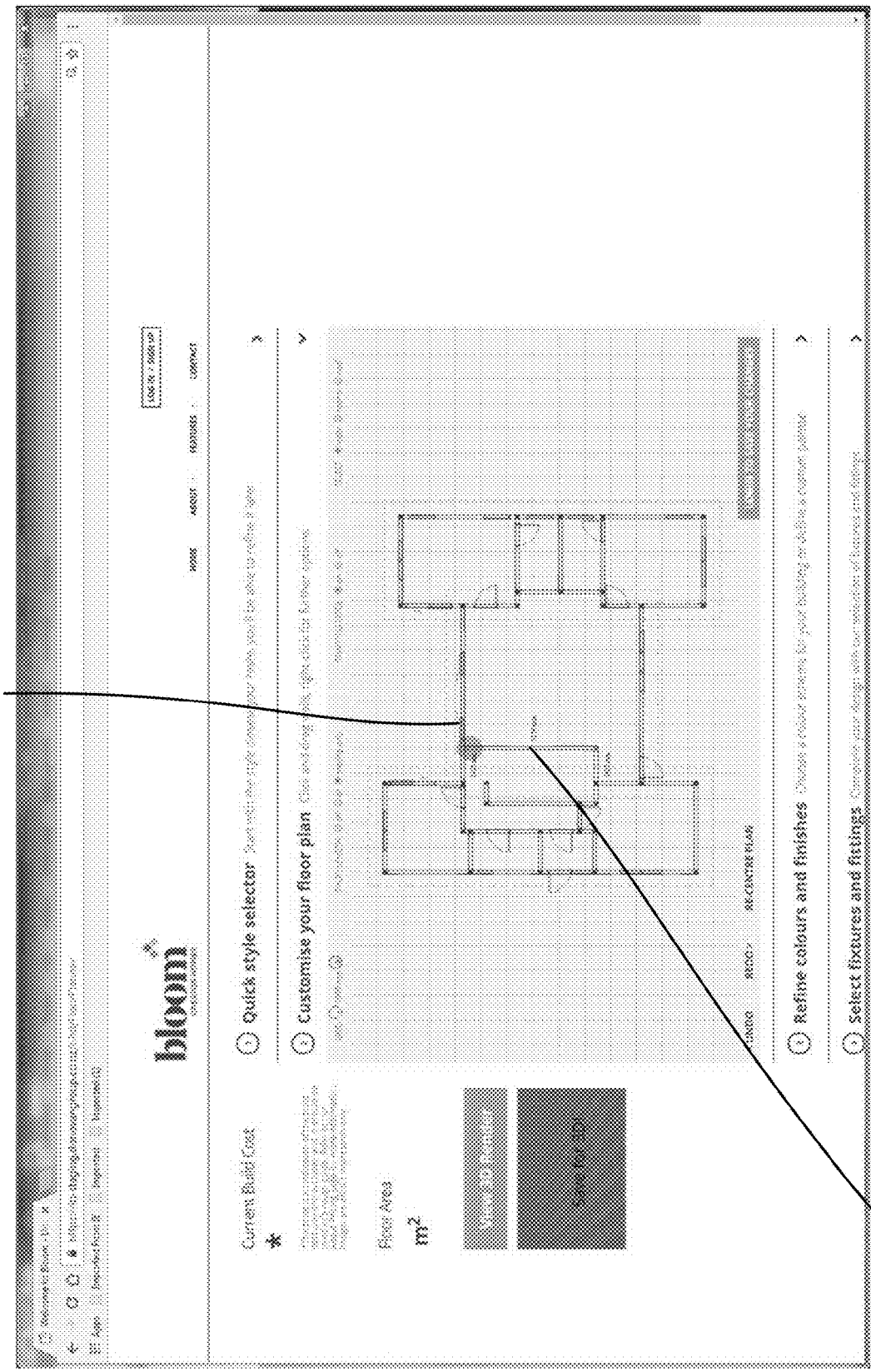

As shown in FIGS. 12A-12D, movement of the terminating end 1212 of the first building component 1210 towards a second building component 1214 will cause the grid square visual indicators 1202-1208 to update to reflect the grid square associated with the location of the terminating end 1212 of the first building component 1210. As shown in FIG. 12A, the terminating end 1212 of the first building component 1210 is located in grid square G1 that is represented by visual indicators 1202-1208. Movement of the terminating end 1212 of the first building component 1210 towards the second building component 1214 through grid squares G2 and G3 will cause the grid point visual indicators 1202-1208 to update as shown in FIGS. 12B and 12C.

When the user has selected on in the snap to grid menu 306, the visual indicator 1200 indicates to which point the adjustment will snap. For example, in FIG. 12B the user is manipulating the end of the wall 1210, for example by selecting the end and dragging it upwards. The extent of upwards movement is insufficient to cause the wall 1210 to snap to the grid point 1202 so that if the selection is stopped the wall will snap to grid point 1206 and not grid point 1202. To indicate this, the visual indicator 1200 only includes within its reach the grid point 1206 and not the grid point 1202. Similarly, the user has dragged to the right of grid point 1206, but by an insufficient amount to snap to grid point 1208, as indicated by point 1208 not being within the reach of visual indicator 1200. When the adjustment of the end of the wall is sufficient so that visual indicator 1200 first does not include within its reach grid point 1206, this corresponds to when the visual indicator first includes within its reach grid point 1202. This change may be either continuous or the movement of the visual indicator 1200 may include a discontinuity, for example to "jump" across the grid points.

In some embodiments visual indicator 1200 has a fixed size, which moves as the user provides adjustment input. Conveniently the visual indicator 1200 is centred on the current location of the adjustment input and has a dimension substantially equal to the distance between grid points. If grid points are not provided, then the size may be set at a predetermined amount.

As shown in FIG. 12C, when the terminating end 1212 of the first building component 1210 is located within a threshold distance corresponding to the radius of visual indicator 1200 from the second building component 1214, a determination is made as to whether this proposed connection of the first and second building components is a compliant action. The second building component may also be highlighted, for example, shown in a different colour to the first building component once the terminating end 1212 of the first building component 1210 is located within the threshold distance. If this proposed connection is determined to be a compliant action, the first building component 1210 is automatically connected to the second building component 1214 (see FIG. 12D). If the proposed connection is determined to be a non-compliant action, the first building component 1210 is moved to its original starting position as shown in FIG. 12A or to another suggested compliant position.

An example of a determination of compliant action for a connection of a wall to another wall includes determining that there is not a penetration at the location of the connection. Another example is a determination that any penetration is a minimum threshold distance from the connection point and/or connecting wall.

In the examples depicted in the Figures, the floor plan is 2-dimensional. It will be appreciated that a 3-dimensional or a combination of 2-dimensional and 3-dimensional views may be displayed.

Selecting the Style of the Building

Figure 13:
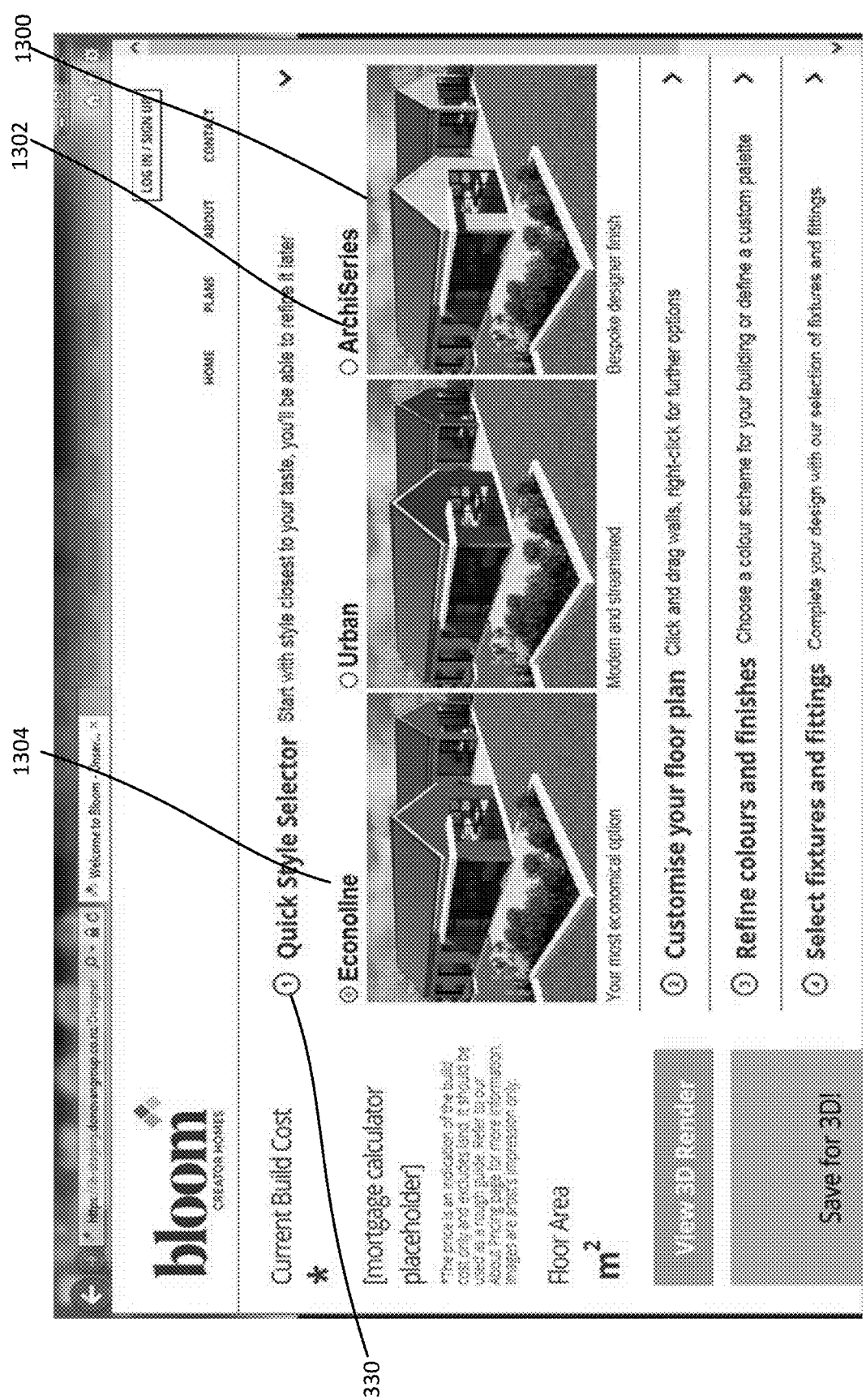
FIG. 13 illustrates an exemplary user interface for displaying menu options for performing categories of actions to a base plan associated with the search result selected in FIG. 2.

Invoking of a building style function, for example by selecting the menu option "Quick Style Selector" 330 in FIG. 3, causes the user interface 100 to display one or more building styles 1300 of building 316. In the example shown in FIG. 13, three possible building styles are displayed according to the quality of the materials and finishes provided. For example, the "ArchiSeries" building style option 1302 includes high quality and bespoke materials and finishes compared to the more economical "Econoline" building style option 1304.

Figure 28A:
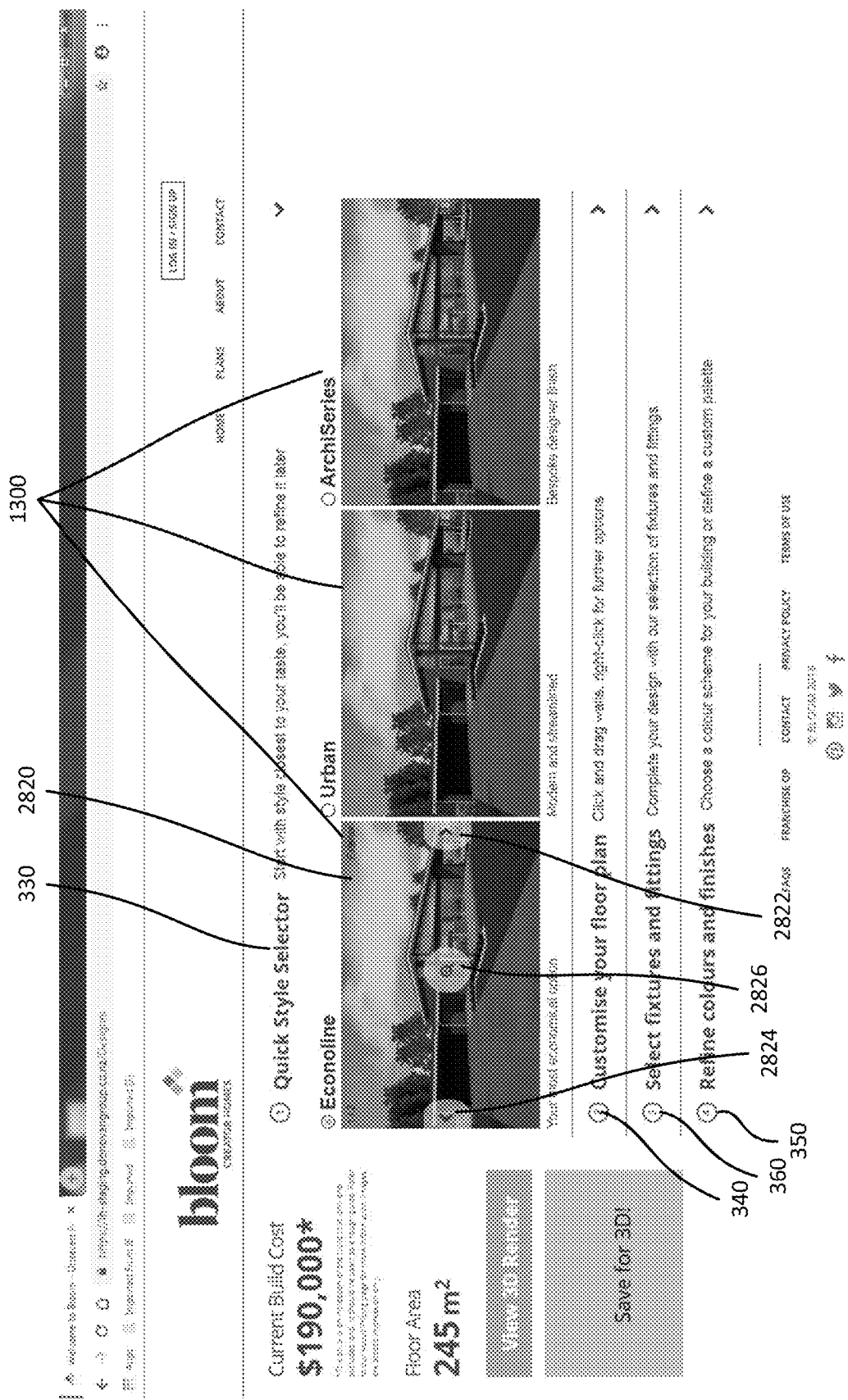
FIGS. 28A-28B illustrates an exemplary user interface for displaying menu options for performing categories of actions to a base plan associated with the search result selected in FIG. 25.
Figure 28B:
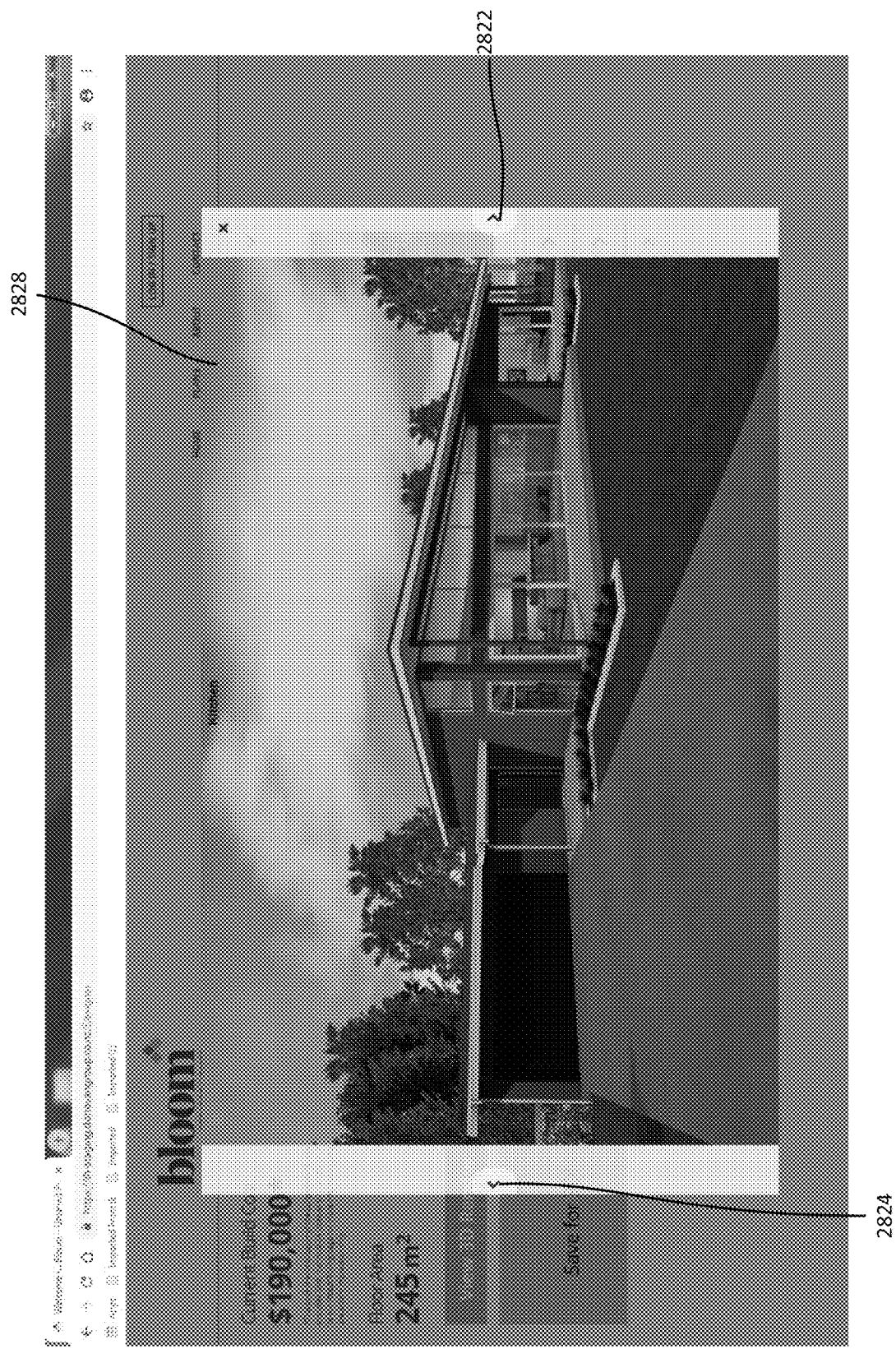

In some embodiments, each building style 1300 is associated with a series of thumbnail images of the building 316. As shown by example in FIG. 28A, arrows 2822, 2824 and "zoom in" icon 2826 may be displayed in response to a cursor being located over, or within a minimum threshold distance to, a first image 2820 of the series of thumbnail images of the building 316. Display of the series of images of the building 316 may be forwarded or reversed based on selection of arrows 2822, 2824 via one or more user inputs. Selection of the "zoom in" icon 2826 also displays a larger image 2828 of building 316. As shown in FIG. 28B, arrows 2822, 2824 may also be displayed in association with the larger image 2828 of the building 316 to permit a user to move forwards or backwards through the series of images of the building 316.

In one embodiment, each building style is associated with a floor plan, colour scheme and finishes, and fixtures and fittings as indicated by menu options 340-360. Selection of a specific building style will cause the actionable items under each of these menu options 340-360 to be updated to correspond to the selected building style. For example, selection of building style "Econoline" will update the user interface 100 to display a floor plan that is consistent with the selected building style, for example, as shown in FIG. 3.

Refining the Colour and Finishing Schemes of the Building

Invoking of a building colour scheme function, for example by selecting the menu option "Refine colours and finishes" 350 in FIG. 3, causes the user interface 100 to display one or more colour and finishing schemes associated with one or more building components of the building.

Figure 22A:
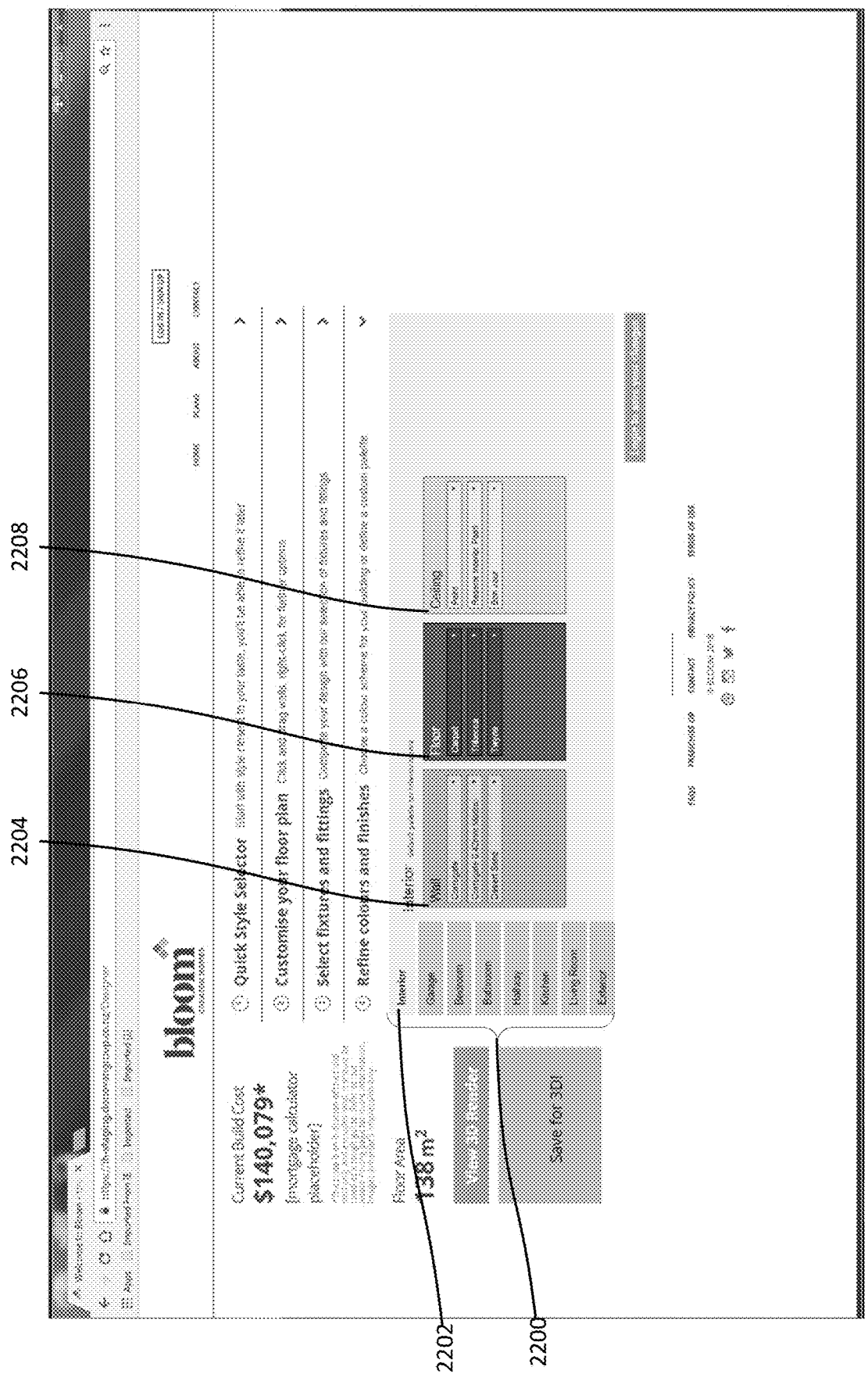
FIGS. 22A-22D illustrate exemplary user interfaces for adjusting the finishes and colours of one or more building components displayed in the floor plan of FIG. 3 in accordance with an embodiment.
Figure 22B:
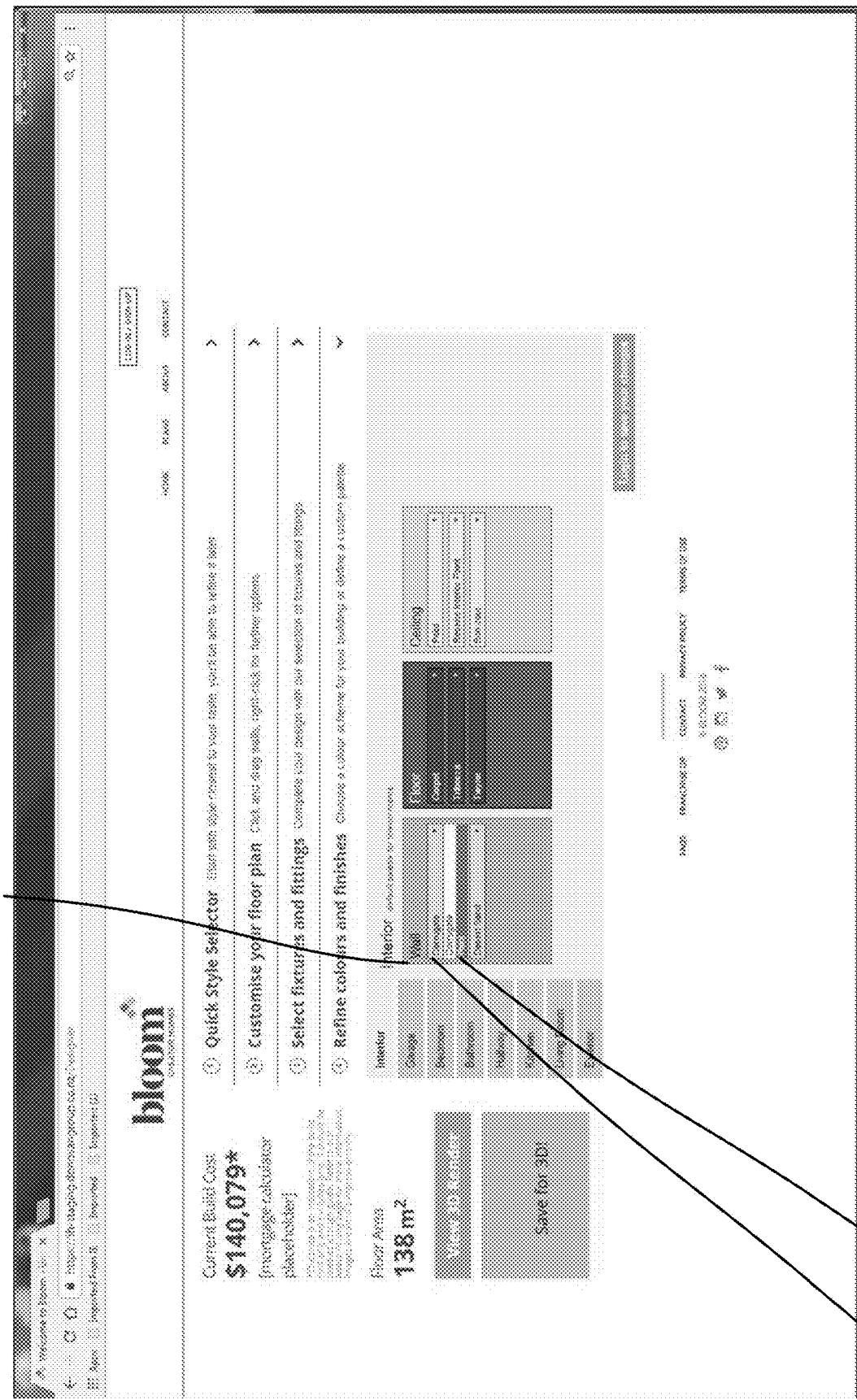
Figure 22C:
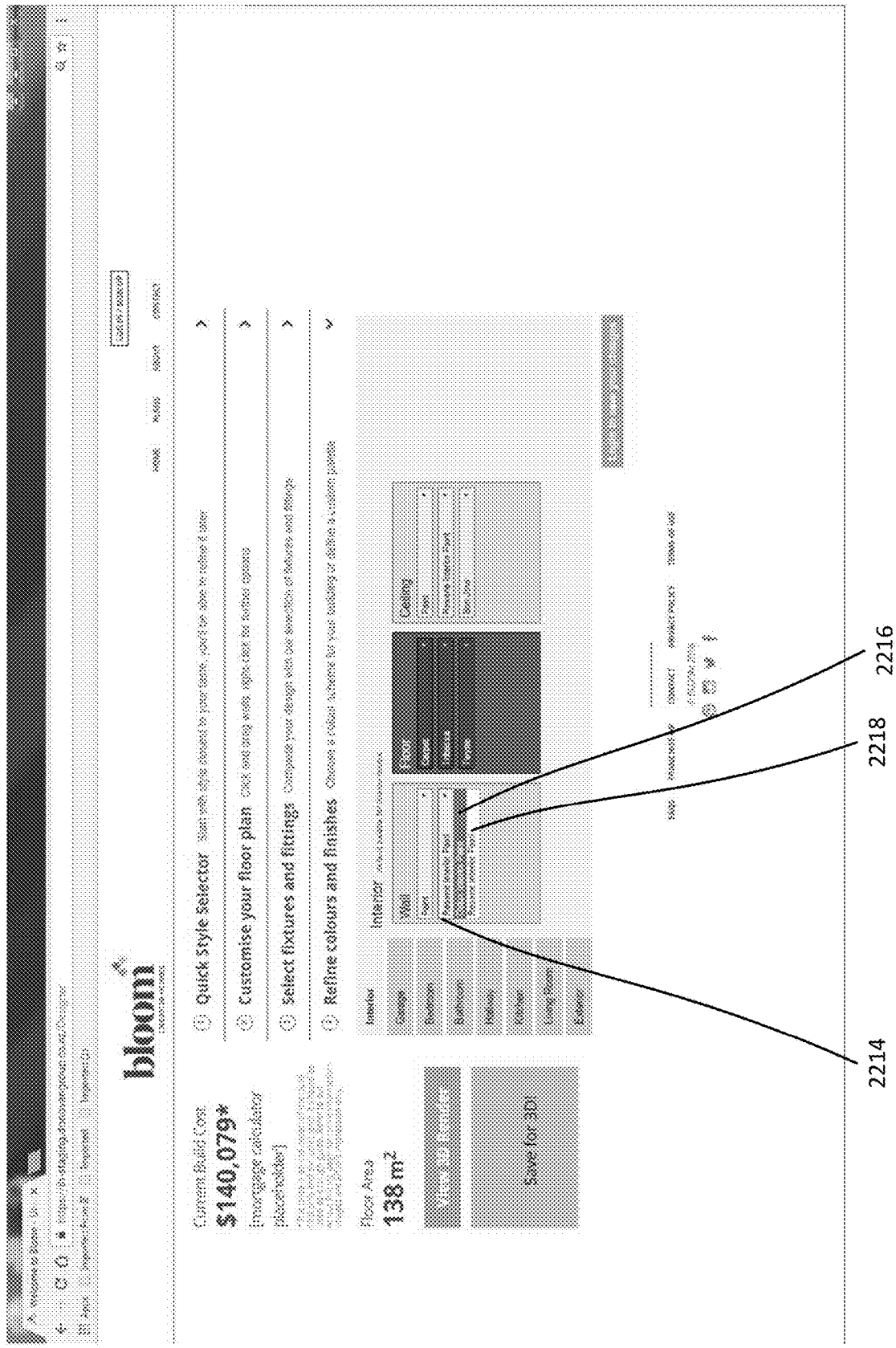
Figure 22D:
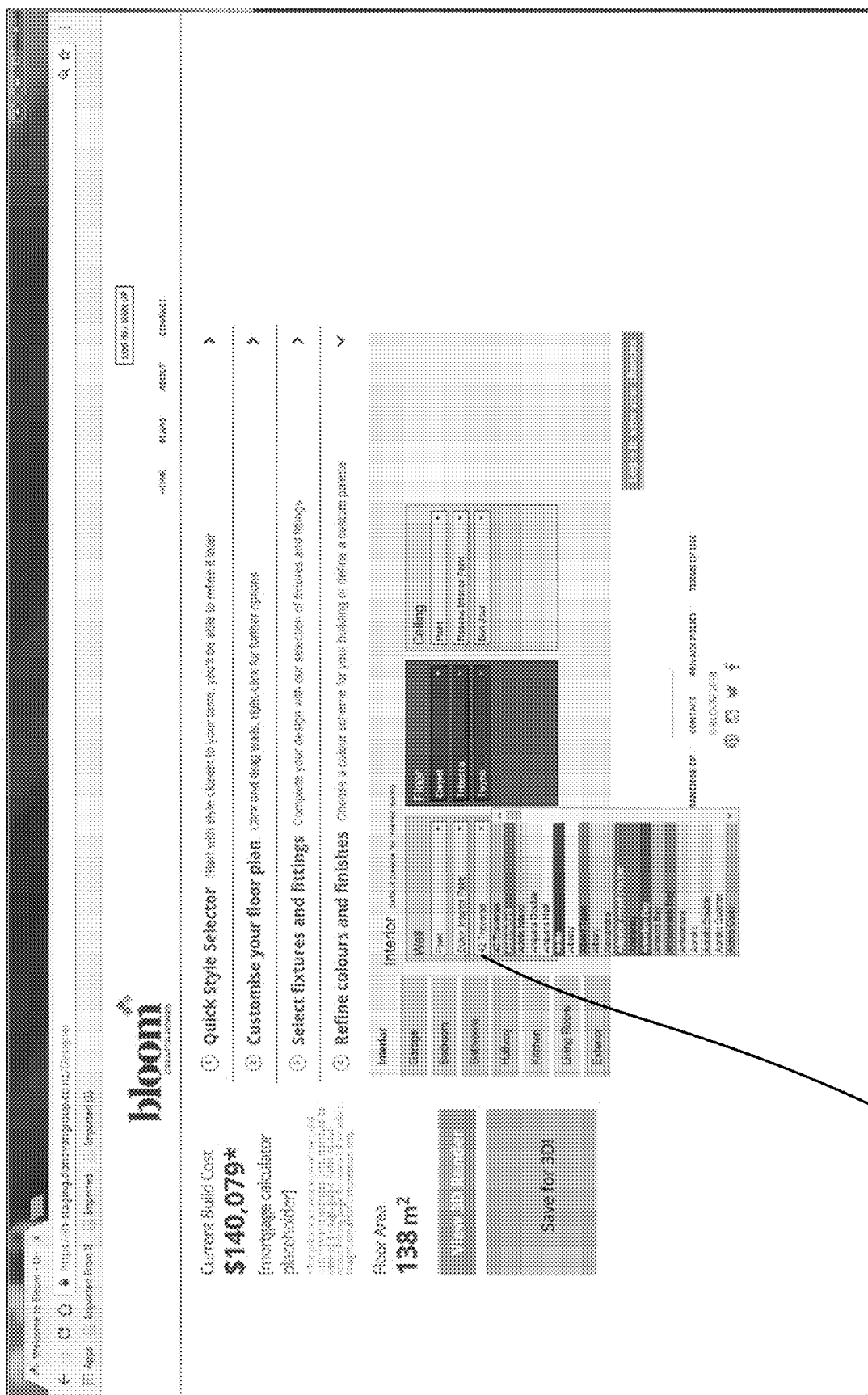

In the example shown in FIGS. 22A-22D, the user interface 100 displays a "Room Option" menu 2200 displaying one or more rooms of the building. Selection of the "Interior" option 2202 will display the building components "Wall" 2204, "Floor" 2206 and "Ceiling" 2208 and one or more drop-down menus indicating the finish, type of finish, and colours available. These drop-down menus may be arranged in a hierarchical order where selection of one option will influence the display of the remaining options available. For example, "Wall" 2204 displays one or more hierarchical drop-down menus containing the different finishes, types of finishes and colours available. In response to the selection of the finish "Paint" 2210 in the "Finish Options" menu 2212 the "Finish Type Options" menu 2214 will be updated to show the types of paint available "Dulux Interior Paint" 2216 or "Resene Interior Paint" 2218 as shown in FIGS. 22B-22C. In response to a further selection of the type of paint being "Dulux Interior Paint" 2216, the associated colours are displayed in "Colour Options" menu 2220 shown in FIG. 22D.

In another embodiment, a building component or room shown in the floor plan may also be assigned a specific colour scheme, which may be different to the colour schemes assigned to the remaining building components or rooms of the floor plan. For example, an internal wall of the building may be assigned a different colour scheme than an external wall of the building.

Refining the Fixtures and Fittings of the Building

Invoking of a building fixtures and finishes function, for example by selecting the menu option "Select fixtures and fittings" 360 in FIG. 3, causes the user interface 100 to display one or more fixtures and fittings associated with one or more building components of the building. In the example shown in FIGS. 23A-23D, the user interface 100 displays a "Room Option" menu 2300 displaying one or more rooms of the building. Selection of the "Bedroom" option 2302 will display the fixtures available "Shower" 2304, "Bathtub" 2306 and "Vanity" 2308 and an indicator of their quality "Good" 2310. Selection of the fixture "Shower" 2304 displays a "Quality Options" menu 2312 including one or more different qualities available for the fixture, such as "Good" 2314, "Better" 2316 and "Best" 2318, and their characteristics. An indicator may also be displayed indicating the quality selected, in this case "Best" 2318 in FIG. 23B. The quality of the selected fixture may be updated, for example, by the selection of the "Choose" button 2320 shown in FIG. 23B.

Figure 23A:
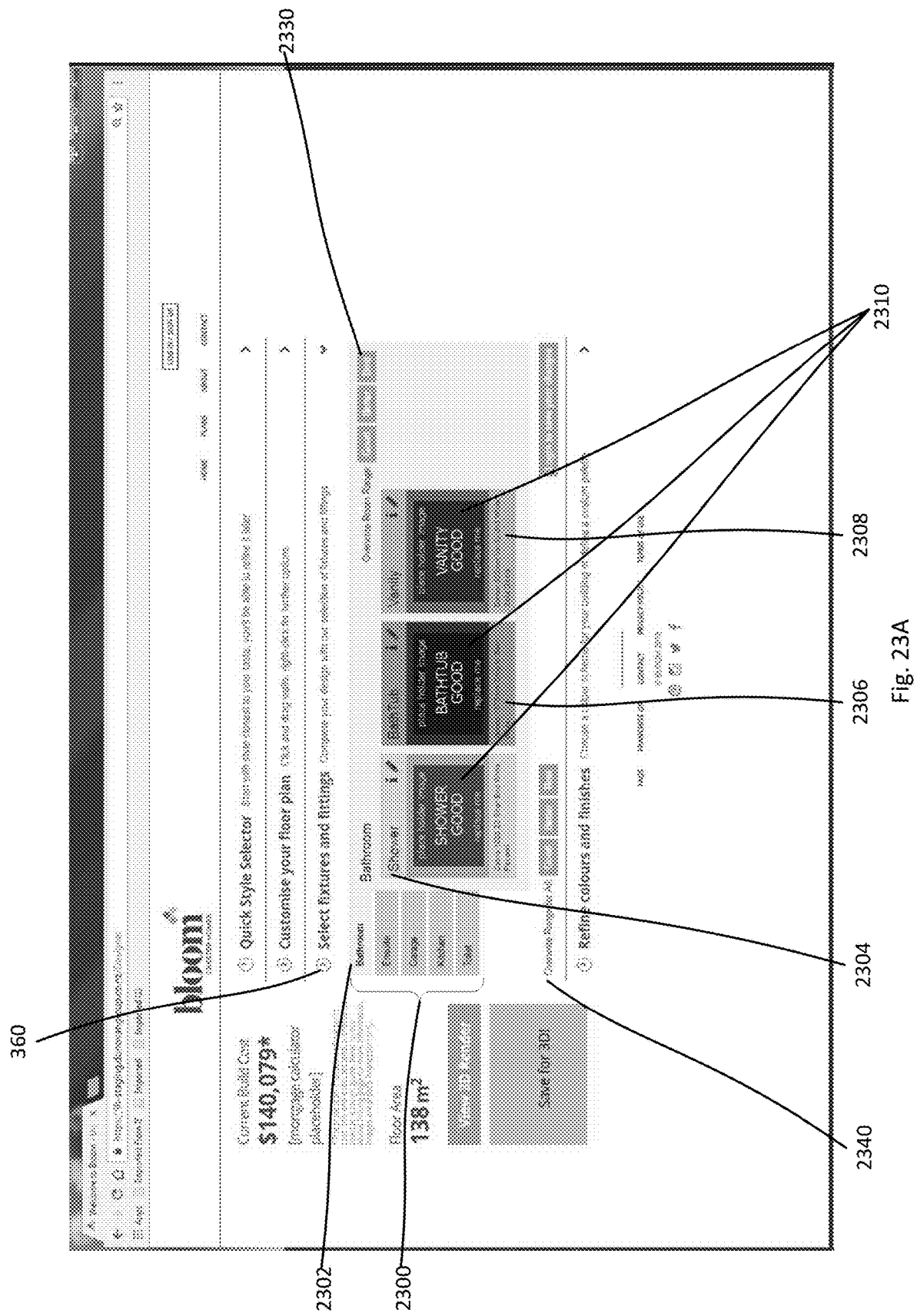
FIGS. 23A-23D illustrate exemplary user interfaces for adjusting the fixtures and fittings of one or more building components displayed in the floor plan of FIG. 3 in accordance with an embodiment.
Figure 23B:
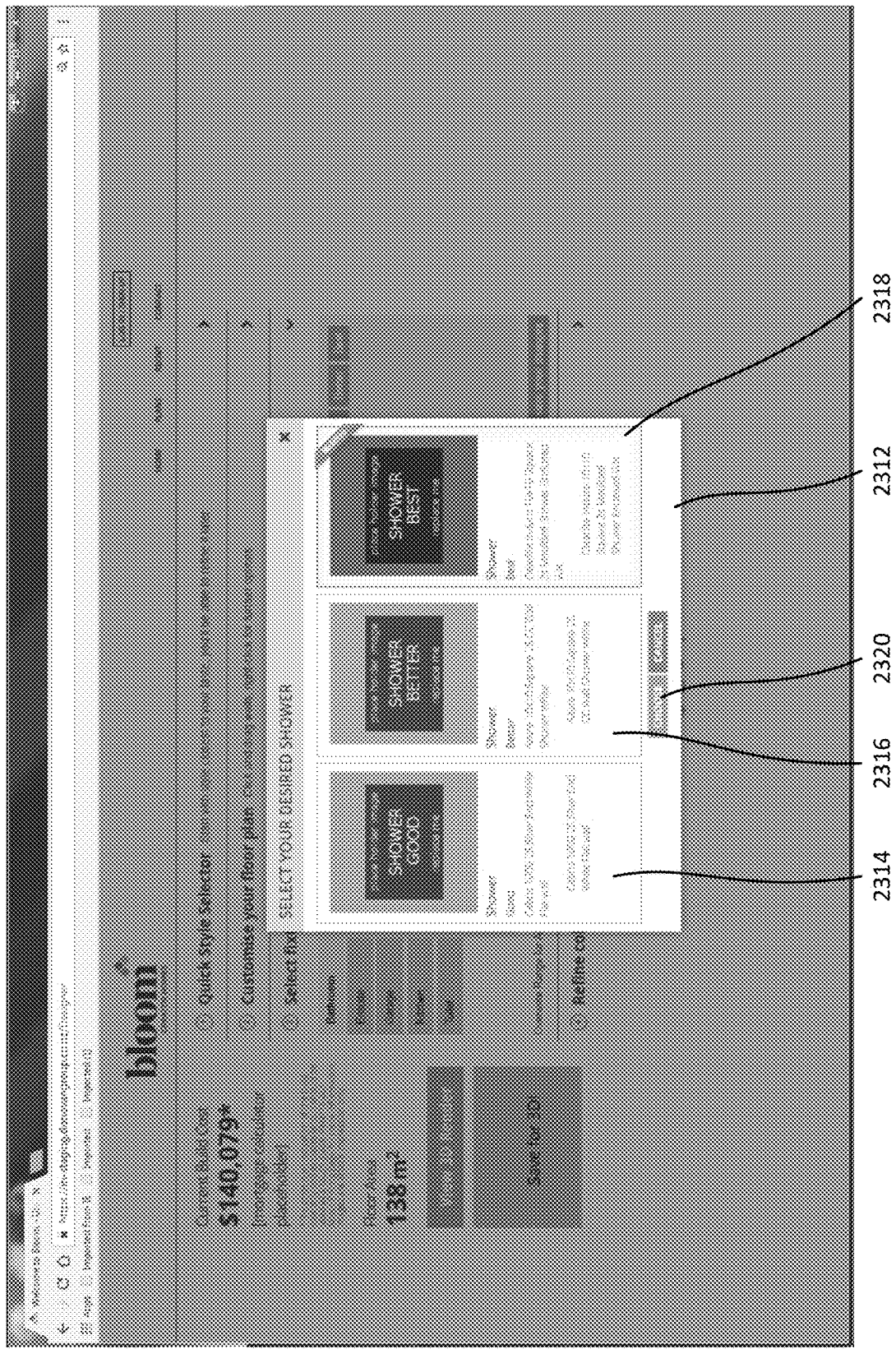
Figure 23C:
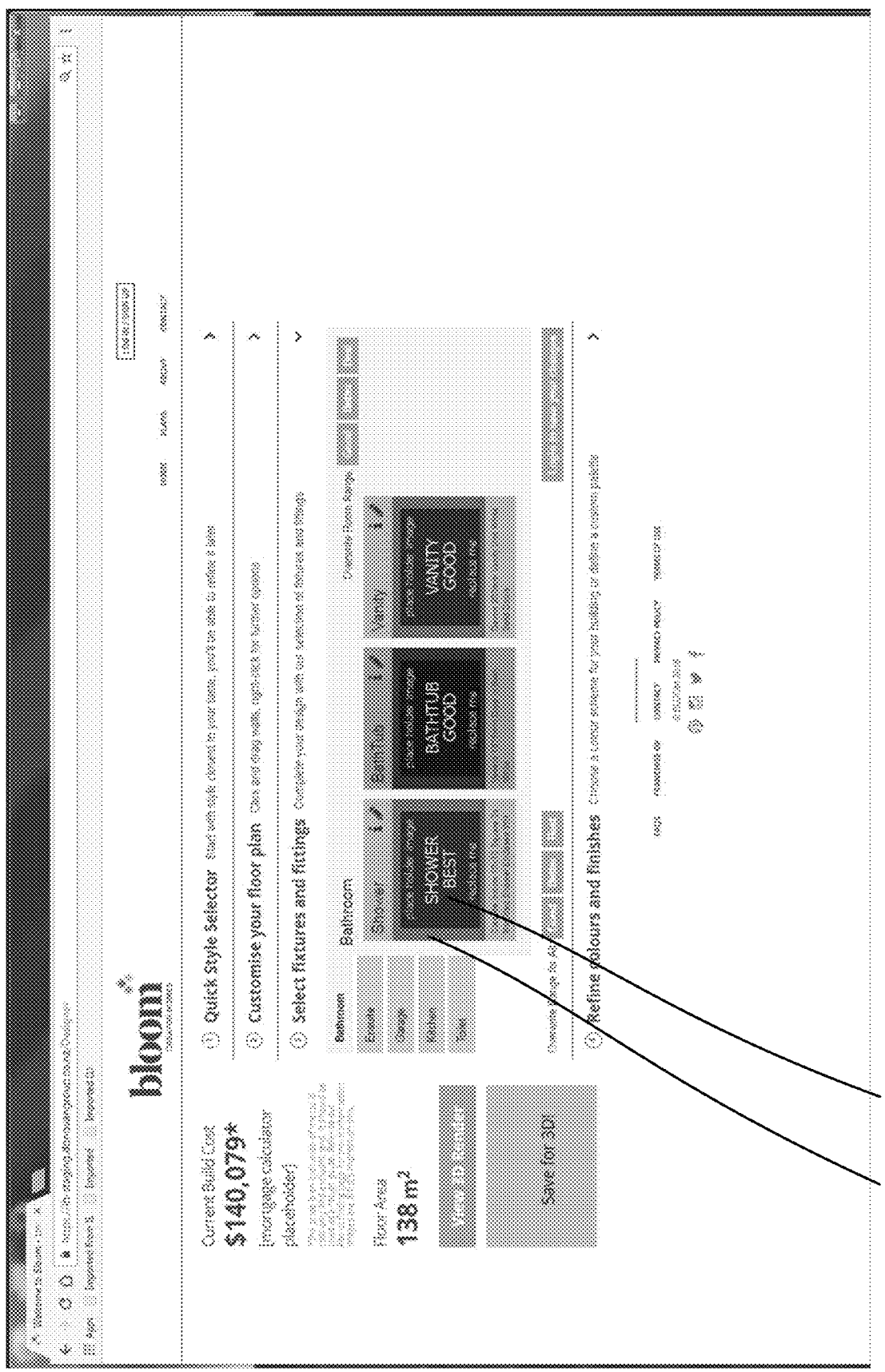
Figure 23D:
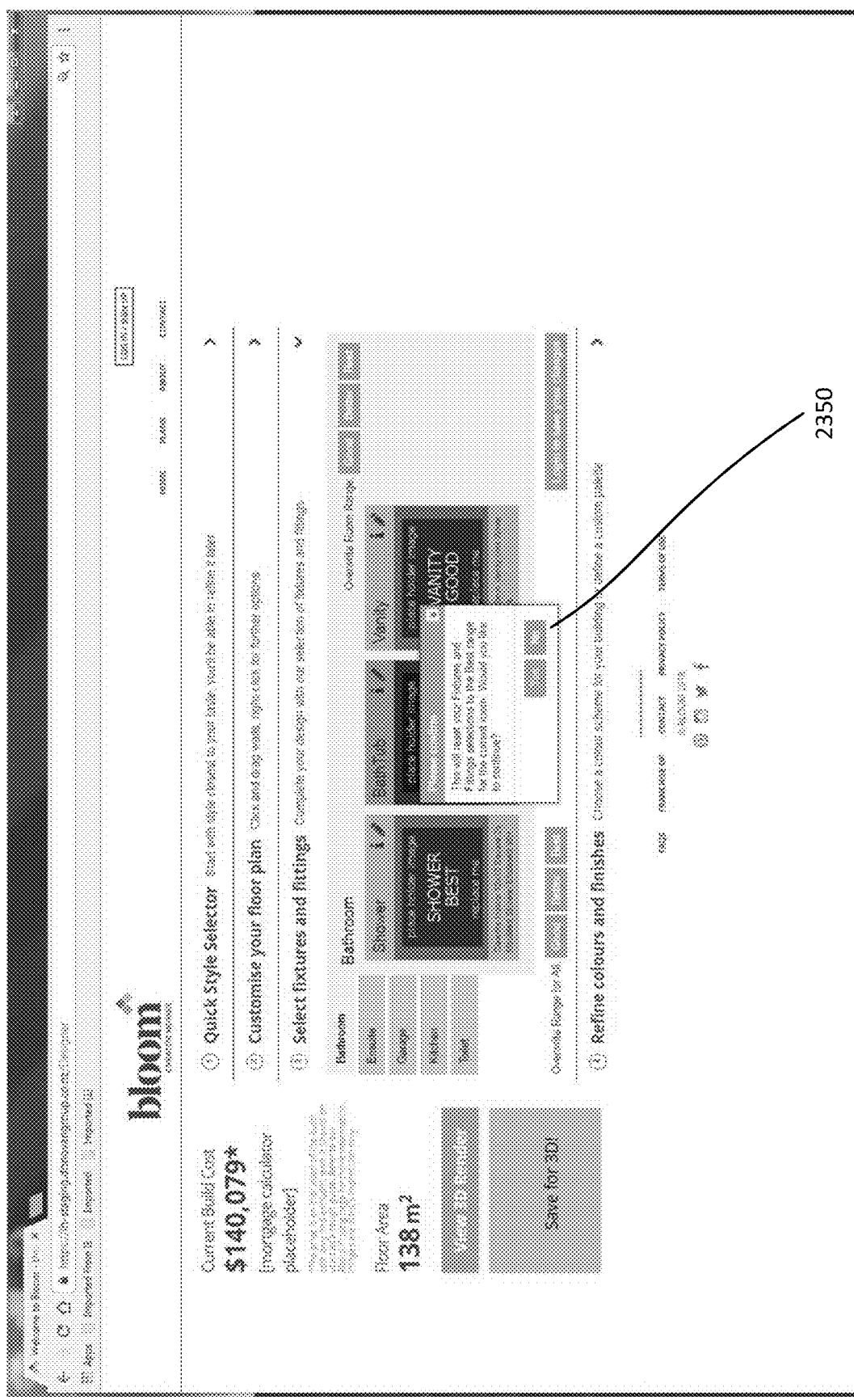

In another example, the quality of all the fixtures available for a room may be updated simultaneously in response to selection of a quality displayed in the "Overwrite Room Range Option" menu 2330 shown in FIG. 23A. In another example, the quality of all the fixtures available for all the rooms displayed in "Room Option" menu 2300 may be updated by selecting a quality displayed in "Overwrite Range for All Option" menu 2340 shown in FIG. 23A. In response to selection of a quality from one or more of the "Overwrite Range for All Option" menu 2340 or the "Overwrite Room Range Option" menu 2330, a dialogue 2350 may be displayed confirming the requested change, as shown by example in FIG. 23D.

In another embodiment, a building component or room shown in the floor plan may also be assigned specific fixtures and fittings, which may be different to the fixtures and fittings assigned to the remaining building components or rooms of the floor plan. For example, a bathroom may be assigned to be a tiled area rather than a carpeted area.

Various embodiments and features of the invention are implemented using one or more computer processing systems. In particular and for example, the various determinations described herein are made by a computer processing system configured to perform the determinations and the various display steps caused to be displayed by one or more computer processors of the computer processing system on a suitable display screen. The configuration of the computer processing system may be in accordance with computer readable instructions stored in non-transitory memory.

FIGS. 14 to 20 show flow diagrams of example process flows that may be completed by the computer processing system. The information from the preceding figures may be displayed dependent on one or more of the process flows shown in FIGS. 14 to 20. It will be appreciated that process flows 14 to 20 are examples and that the order of certain steps may be changed, certain steps may be omitted or substituted and additional steps added in other examples.

Figure 14:
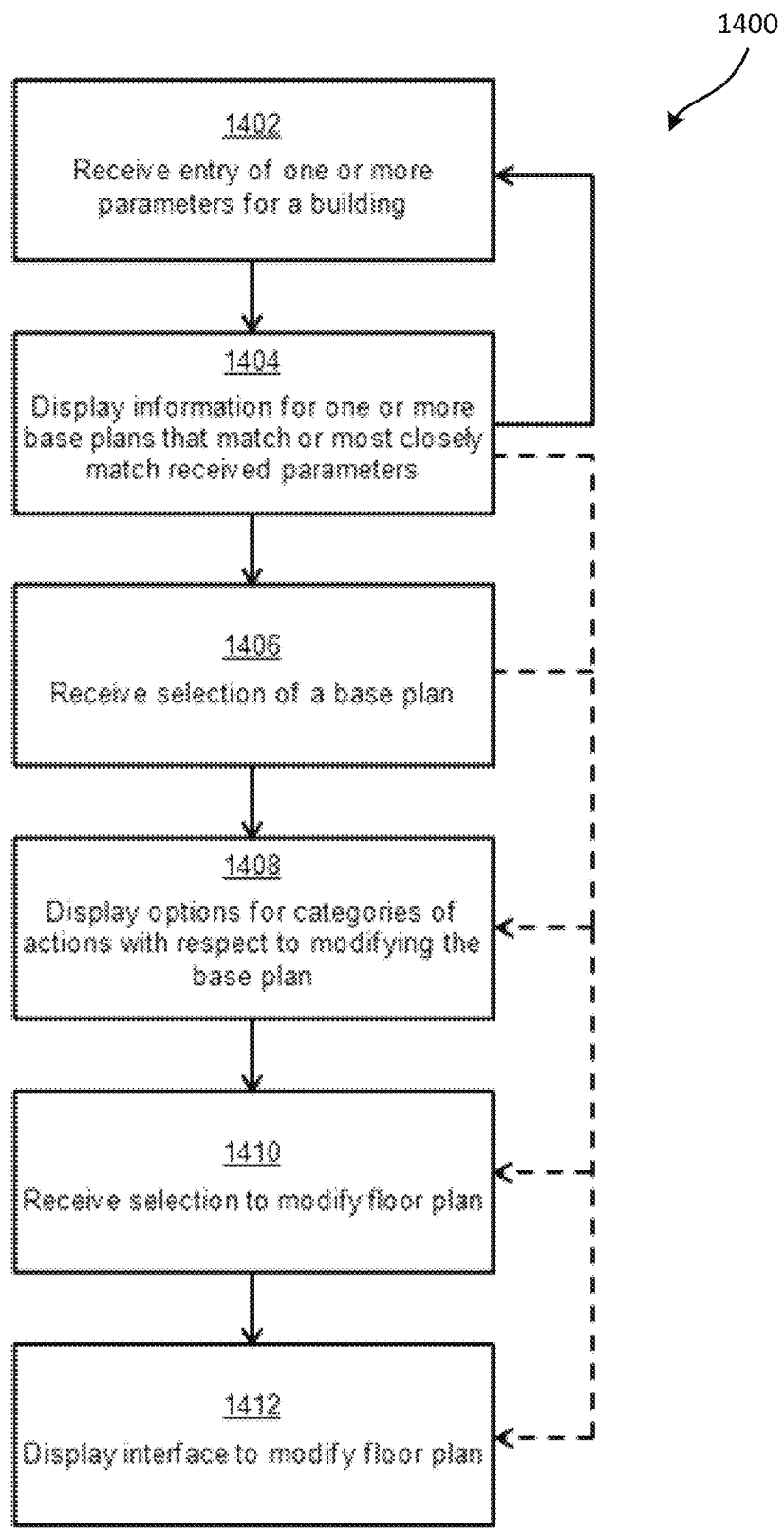
FIG. 14 illustrates a flow diagram of a process for selecting a base plan in accordance with an embodiment.

FIG. 14 illustrates a flow diagram of an exemplary process 1400 for selecting a base plan in accordance with some embodiments.

At block 1402, one or more entered building parameters are received and may include, for example, the number of bedrooms, the number of bathrooms, the size of the building (e.g. footprint size in square metres or square feet) and the roof style (e.g. gabled, hip, flat, lean to). In some examples the parameters include a region.

At block 1404, information for one or more base plans that match or closely match the received building parameters are displayed in the user interface 100. The information for the one or more base plans may include a floorplan indicating the layout of the building components, for example walls, doors, windows, rooms, fixtures, furniture, or the roof. The display of information for one or more base plans may also be updated in response to receiving one or more further building parameters.

At block 1406, selection of a base plan that is displayed in the user interface 100 is received. In response to receiving this selection, the user interface 100 displays options for categories of actions that may be performed with respect to modifying a base plan, as shown at block 1408. Example categories of actions include selecting the style of the building, customising the floor plan of the building, refining the interior and exterior colour scheme of the building and refining the fixtures and fittings of the building.

At block 1410, the user interface 100 receives a selection to modify a floor plan from the displayed categories of actions. In response to receiving this selection, the user interface displays a floor plan for modification, as illustrated at block 1412.

In other embodiments, one or more of steps 1406 to 1410 may be omitted, as indicated by dashed lines in FIG. 14. Additionally, in other embodiments the order of the processes that are completed may be varied.

Figure 15:
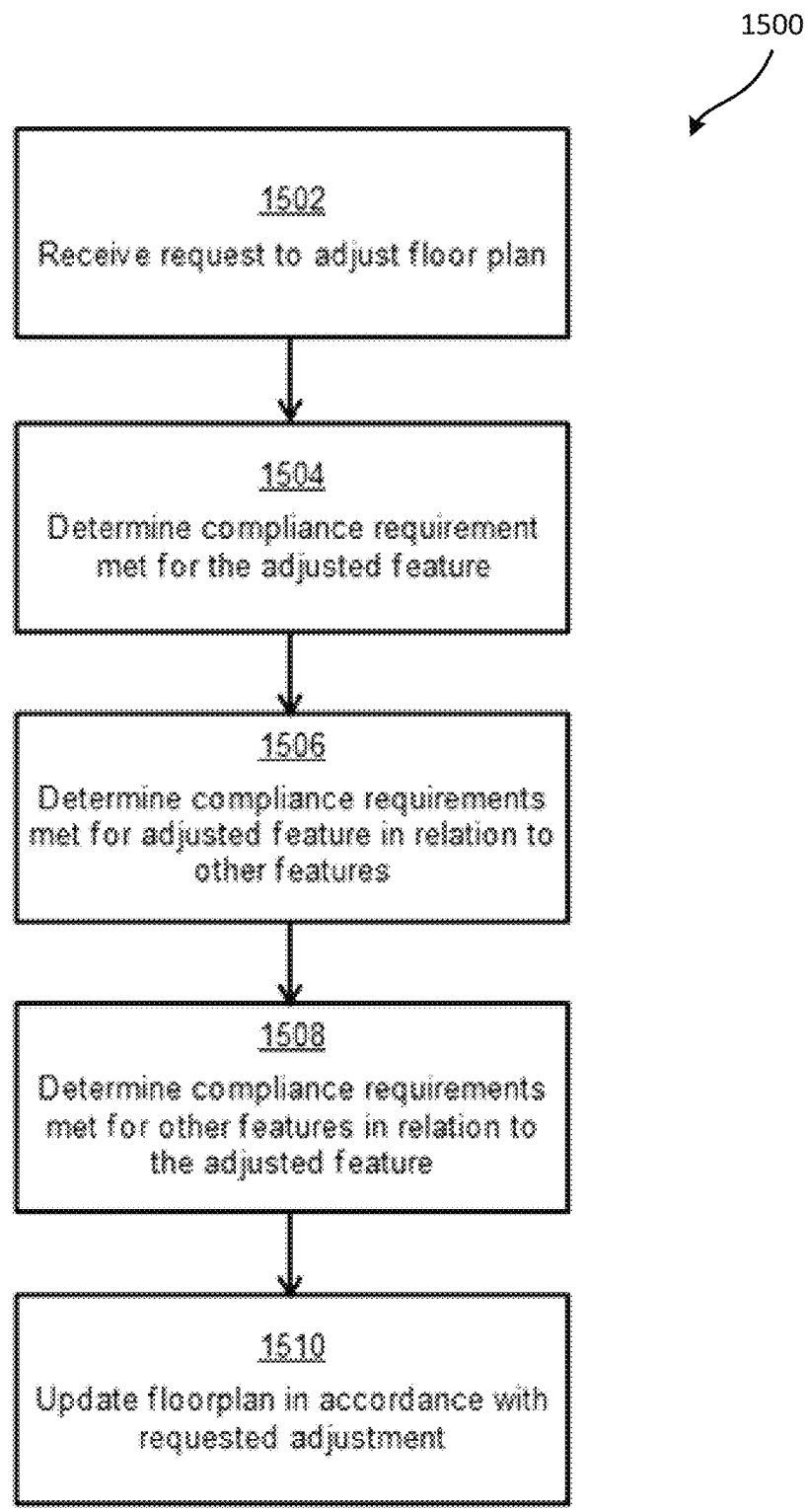
FIG. 15 illustrates a flow diagram of a process for determining whether an adjustment to a floor plan meets compliance requirements in accordance with an embodiment.

FIG. 15 illustrates a flow diagram of an exemplary process 1500 for determining whether an adjustment to a floor plan meets compliance requirements in accordance with some embodiments.

At block 1502, a request to adjust the floor plan of a building is received. At block 1504, a determination is made as to whether the received adjustment of the floor plan meets compliance requirements.

At block 1506, a determination is made as to whether the adjustment of the floor plan meets compliance requirements with respect to other features of the floor plan. At block 1508, a determination is made as to whether other features of the floor plan meet compliance requirements with respect to the adjustment of the floor plan.

If the adjustment of the floor plan is determined to not contravene blocks 1504-1508, the floorplan 100 displayed in the user interface is updated as indicated at block 1510.

Figure 16:
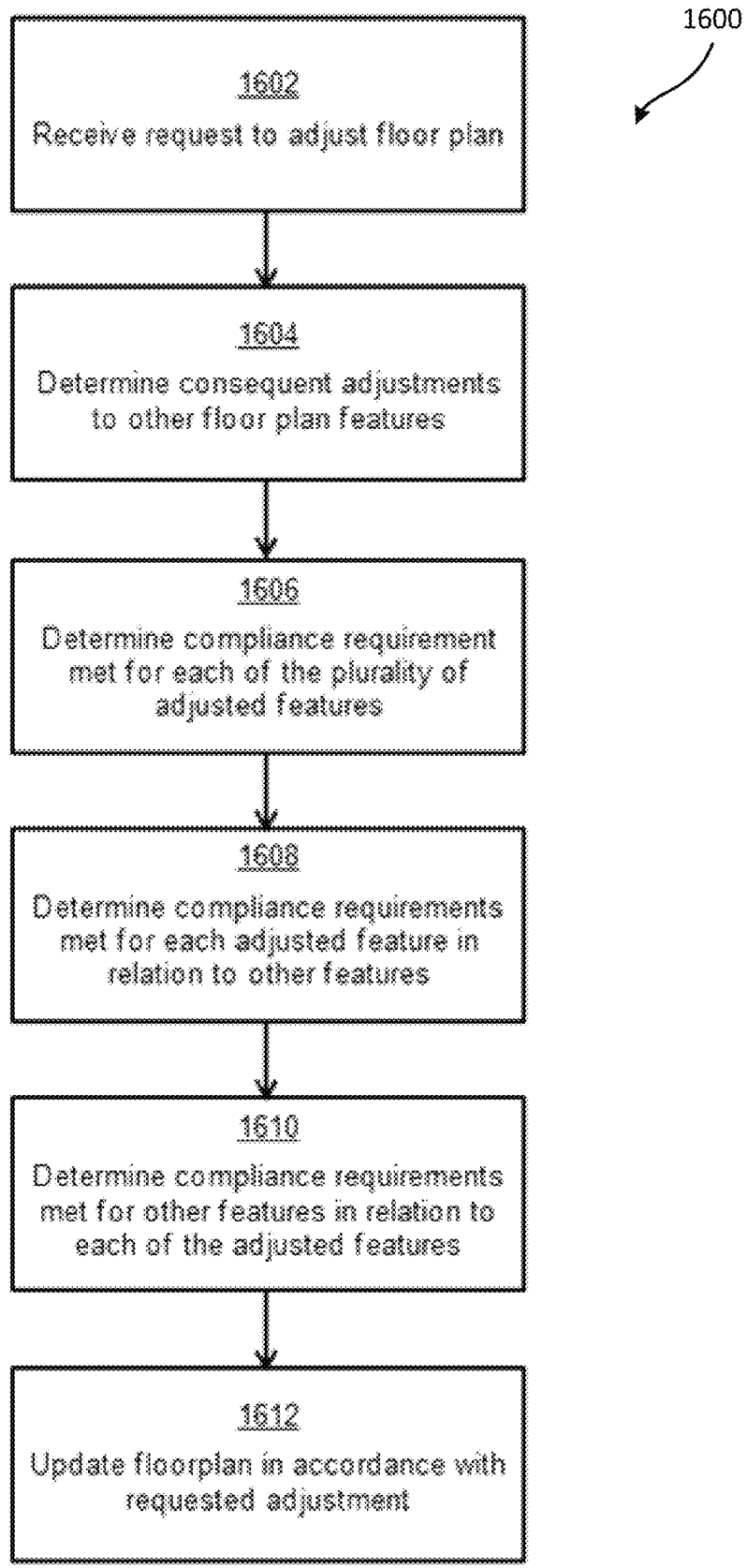
FIG. 16 illustrates a flow diagram of a process for determining whether one or more adjustments to a floor plan meet compliance requirements in accordance an embodiment.

FIG. 16 illustrates a flow diagram of an exemplary process 1600 for determining whether one or more adjustments to a floor plan meet compliance requirements in accordance with some embodiments.

At block 1602, a request to adjust the floor plan of a building is received. As a result of this adjustment request, a determination is made as to whether any consequential adjustments are also required to other floor plan features, as illustrated at block 1604.

At block 1606, a determination is made as to whether the received adjustment of the floor plan and any required consequential adjustments meet compliance requirements.

At block 1608, a determination is made as to whether each received adjustment of the floor plan and any required consequential adjustments meet compliance requirements in relation to other features of the floor plan.

At block 1610, a determination is made as to whether each received adjustment of the floor plan and any required consequential adjustments meet compliance requirements in relation to each other.

If each received adjustment of the floor plan and any required consequential adjustment are determined to not contravene blocks 1606-1610, the floorplan 100 displayed in the user interface is updated at block 1612.

Figure 17:
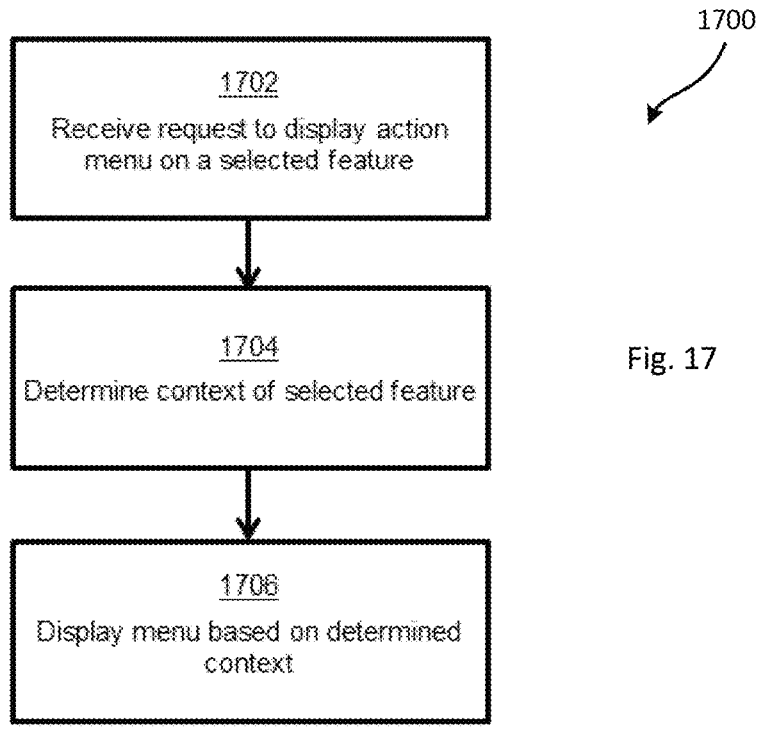
FIG. 17 illustrates a flow diagram of a process for displaying a menu associated with a selected feature in accordance with an embodiment.

FIG. 17 illustrates a flow diagram of an exemplary process 1700 for displaying a menu associated with a selected feature in accordance with some embodiments.

At block 1702, a request to display an action menu associated with a selected feature is received. At block 1704, a determination of the context of the selected feature is made. In one example, this context may be whether a selected feature is an internal wall or an external wall. In response to this determined context, a menu is displayed for the selected feature as illustrated at block 1706.

Figure 18:
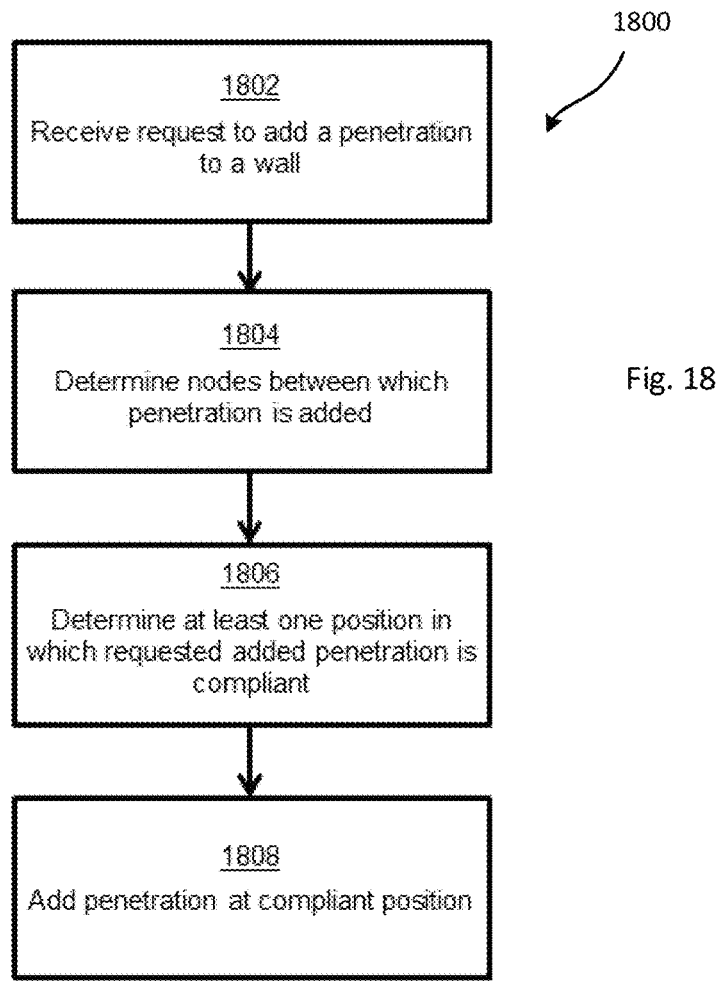
FIG. 18 illustrates a flow diagram of a process for adding a compliant penetration to the floor plan in accordance with an embodiment.

FIG. 18 illustrates a flow diagram of an exemplary process 1800 for adding a compliant penetration to the floor plan in accordance with some embodiments. At block 1802 a request to add a penetration to a wall, for example an internal or external wall is received. In response to receiving this request, the grid nodes indicating the location where the penetration is intended to be added are determined, as illustrated at block 1804. At block 1806, a determination is made as to whether the intended penetration is positioned in a compliant position between the determined grid nodes. The penetration will be added to the wall in response to a determination that the intended penetration is positioned in a compliant position, as illustrated at block 1808.

Figure 19:
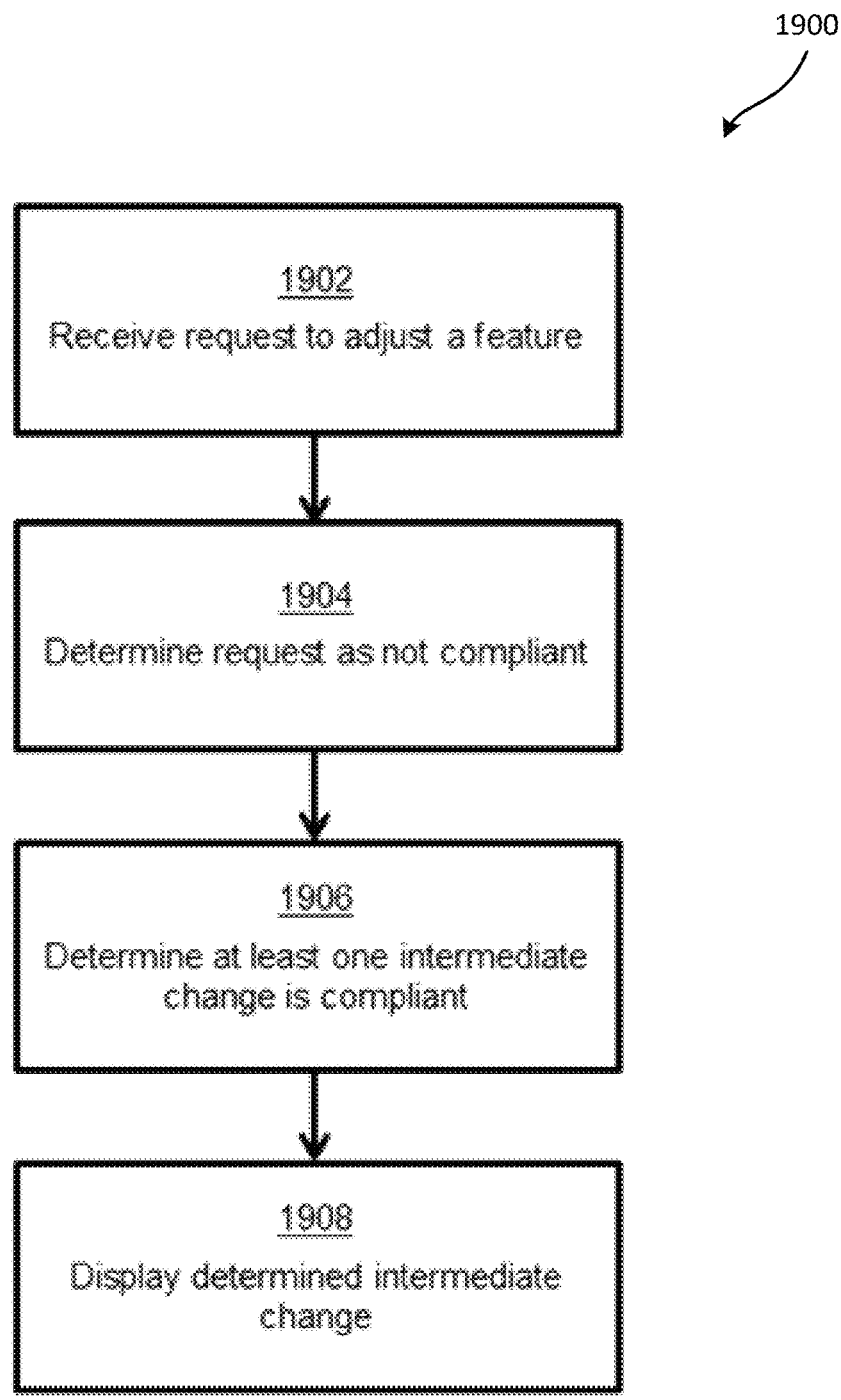
FIG. 19 illustrates a flow diagram of a process for performing a suggested compliant adjustment of the floorplan in accordance with an embodiment.

FIG. 19 illustrates a flow diagram of an exemplary process 1900 for performing a suggested compliant adjustment of the floorplan in accordance with some embodiments.

At block 1902, a request to adjust a selected feature is received. In response to a determination that this received request is not compliant, a determination of at least one compliant intermediate change is performed, as illustrated at block 1904. This intermediate change may be located between the previous compliant floor plan and the received requested adjustment of the feature that satisfies compliance requirements. In response to a determination that this intermediate change is compliant, the intermediate change is displayed in the user interface as illustrated at blocks 1906-1908.

Figure 20:
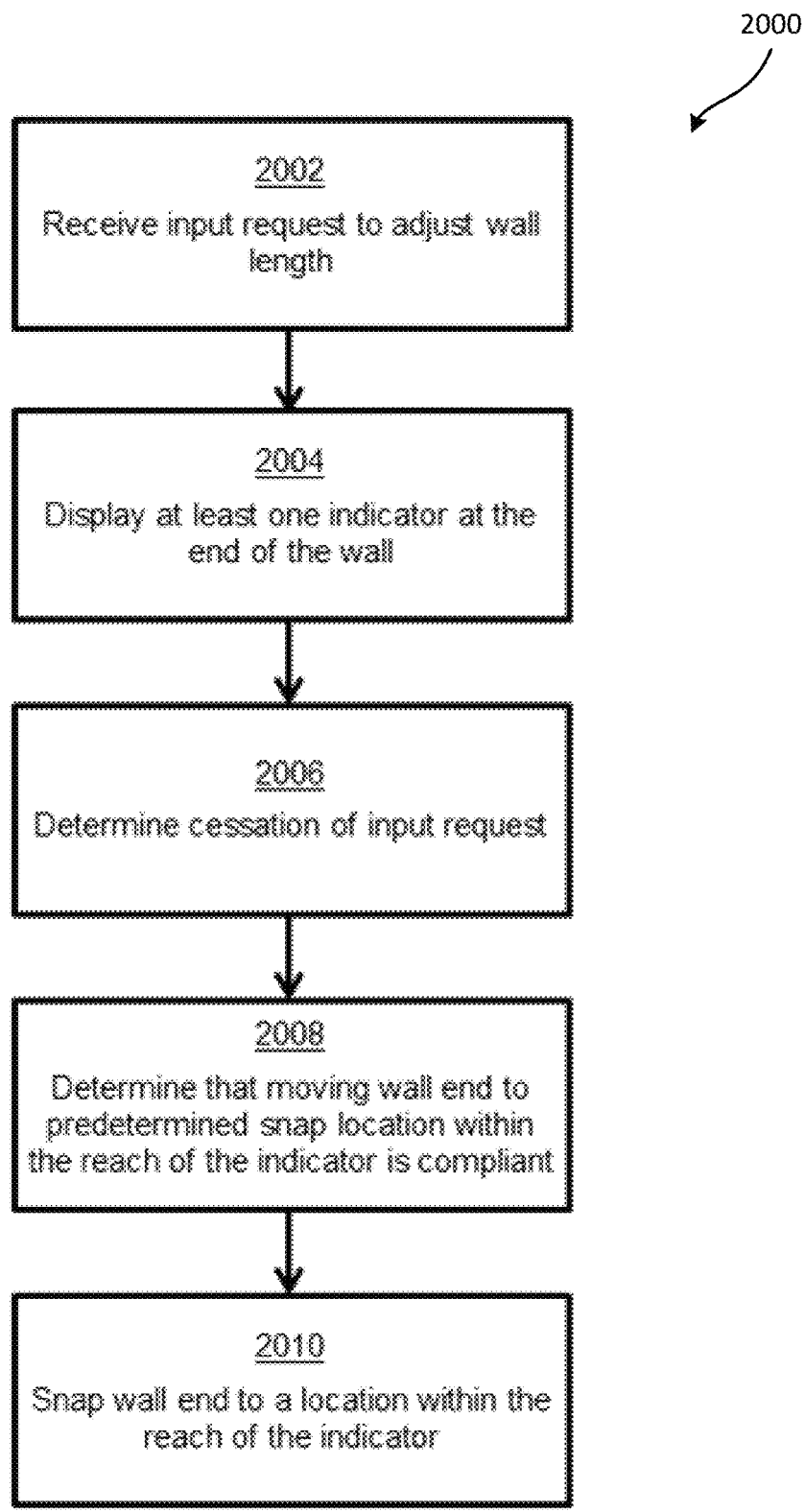
FIG. 20 illustrates a flow diagram of a process for performing automatic connection of a first building component to a second building component in accordance with an embodiment.

FIG. 20 illustrates a flow diagram of an exemplary process 2000 for performing automatic connection of a first building component to a second building component, for example a wall.

At block 2002, an input request to adjust the wall length is received. In response to receiving this input request, at least one visual indicator is displayed at the end of the wall, as illustrated at block 2004. In response to cessation of the input request, a determination is performed as to whether the visual indicator associated with adjusted wall end is within reach to a predetermined snap location and that this movement is a compliant action, as illustrated at blocks 2006-2008. In response to a determination that this movement is compliant, the wall end is snapped to the predetermined snap location located within the reach of the visual indication, as illustrated at block 2010.

Figure 29:
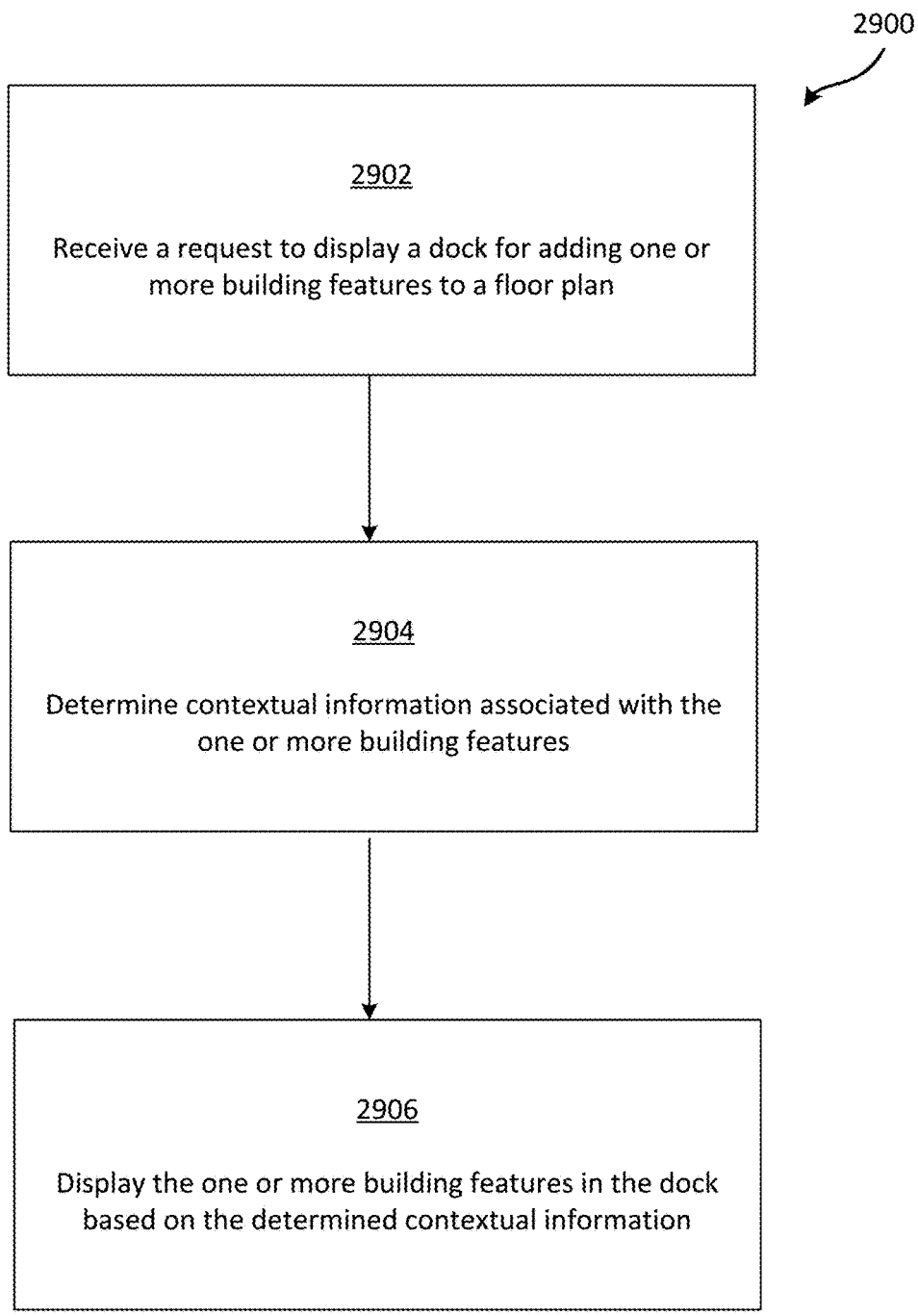
FIG. 29 illustrates a flow diagram of an exemplary process 2900 for displaying a dock for adding a building feature to a floorplan in accordance with an embodiment.

FIG. 29 illustrates a flow diagram of an exemplary process 2900 for displaying a dock for adding a building feature to a floorplan in accordance with some embodiments.

At block 2902, a request to display the dock for adding a building feature to a floorplan is received. At block 2904, contextual information of the building feature is determined. In one example, this context may be selection of a category from the feature menu 308 such as the "walls" option, "rooms" option or "roof" option. In response to this determined context, one or more building features are displayed in the dock as illustrated in block 2906.

Figure 21:
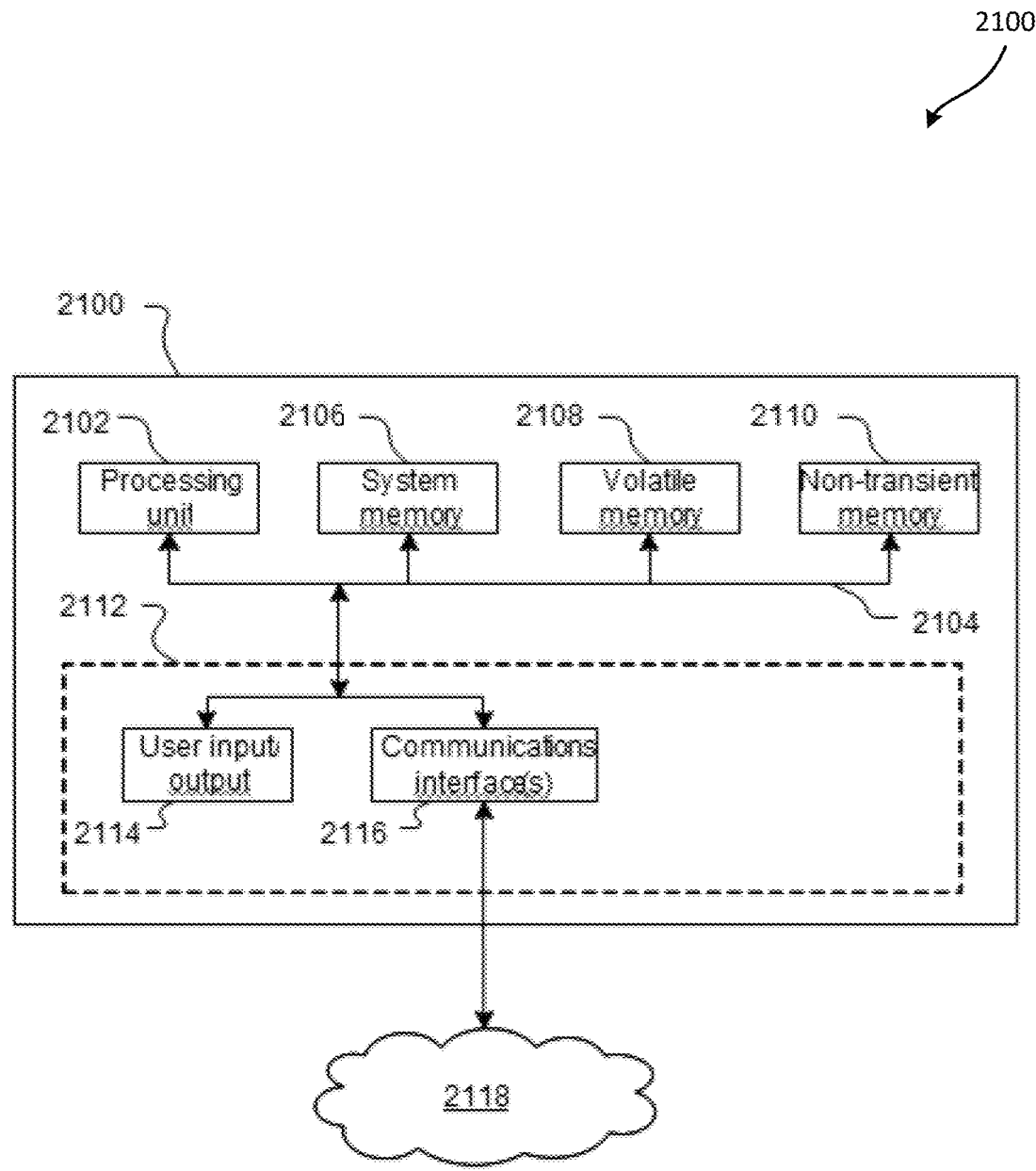
FIG. 21 illustrates a block diagram of a computer processing system in accordance with an embodiment.

FIG. 21 is a block diagram of a computer processing system 2100 for implementing embodiments and/or features of the invention. System 2100 as illustrated in FIG. 21 is a general purpose computer processing system. It will be appreciated that FIG. 21 does not illustrate all functional or physical components of a computer processing system. For example, no power supply or power supply interface has been depicted, however system 2100 will either carry a power supply or be configured for connection to a power supply (or both). It will also be appreciated that the particular type of computer processing system will determine the appropriate hardware and architecture, and alternative computer processing systems suitable for implementing aspects of the invention may have additional, alternative, or fewer components than those depicted.

The computer processing system 2100 includes at least one processing unit 2102. The processing unit 2102 may be a single computer processing device (e.g. a central processing unit, graphics processing unit, or other computational device), or may include a plurality of computer processing devices. In some instances all processing will be performed by processing unit 2102, however in other instances processing may also, or alternatively, be performed by remote processing devices accessible and useable (either in a shared or dedicated manner) by the system 2100.

Through a communications bus 2104 the processing unit 2102 is in data communication with a one or more machine readable storage (memory) devices which store instructions and/or data for controlling operation of the processing system 2100. In this instance system 2100 includes a system memory 2106 (e.g. a BIOS), volatile memory 2108 (e.g. random access memory such as one or more DRAM modules), and non-volatile memory 2110 (e.g. one or more hard disk or solid state drives).

System 2100 also includes one or more interfaces, indicated generally by 2112, via which system 2100 interfaces with various devices and/or networks. Generally speaking, other devices may be integral with system 2100, or may be separate. Where a device is separate from system 2100, connection between the device and system 2100 may be via wired or wireless hardware and communication protocols, and may be a direct or an indirect (e.g. networked) connection.

Wired connection with other devices/networks may be by any appropriate standard or proprietary hardware and connectivity protocols. For example, system 2100 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 2000 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which system 2100 connects—whether by wired or wireless means—allow data to be input into/received by system 2100 for processing by the processing unit 2102, and data to be output by system 2100. Example devices are described below, however it will be appreciated that not all computer processing systems will include all mentioned devices, and that additional and alternative devices to those mentioned may well be used.

For example, system 2100 may include or connect to one or more input devices by which information/data is input into (received by) system 2100. Such input devices may include keyboards, mice, trackpads, microphones, accelerometers, proximity sensors, GPS devices and the like. System 2100 may also include or connect to one or more output devices controlled by system 2100 to output information. Such output devices may include devices such as a CRT displays, LCD displays, LED displays, plasma displays, touch screen displays, speakers, vibration modules, LEDs/other lights, and such like. System 2100 may also include or connect to devices which may act as both input and output devices, for example memory devices (hard drives, solid state drives, disk drives, compact flash cards, SD cards and the like) which system 2100 can read data from and/or write data to, and touch screen displays which can both display (output) data and receive touch signals (input).

System 2100 may be any suitable computer processing system such as, by way of non-limiting example, a desktop computer, a laptop computer, a netbook computer, tablet computer, a smart phone, a Personal Digital Assistant (PDA), a cellular telephone, a web appliance. Typically, system 2100 will include at least user input and output devices 2114 (for example a display, which may be a touch screen display, a keyboard, a point and click device) and a communications interface 2116 for communication with a network 2118.

System 2100 may also connect to communications networks (e.g. the Internet, a local area network, a wide area network, a personal hotspot etc) to communicate data to and receive data from networked devices, which may themselves be other computer processing systems. In some embodiments system 2100 acts as a server, for example a web server, to perform processes in accordance with the embodiments described herein and provides instructions for display of information on a client device via the communication interface 2116. A user may then operate a client device, remote from the system 2100.

System 2100 stores or has access to instructions and data which, when processed by the processing unit 2102, configure system 2100 to receive, process, and output data. Such instructions and data will typically include an operating system such as Microsoft Windows®, Apple OSX, Apple IOS, Android, Unix, or Linux.

System 2100 also stores or has access to instructions and data (i.e. software) which, when processed by the processing unit 2102, configure system 2100 to perform various computer-implemented processes/methods in accordance with embodiments of the invention (as described above). It will be appreciated that in some cases part or all of a given computer-implemented method will be performed by system 2100 itself, while in other cases processing may be performed by other devices in data communication with system 2100.

Instructions and data are stored on a non-transient machine readable medium accessible to system 2100. For example, instructions and data may be stored on non-transient memory 2110. Instructions may be transmitted to/received by system 2100 via a data signal in a transmission channel enabled (for example) by a wired or wireless network connection.

It will be understood that the invention disclosed and defined in this specification extends to all alternative combinations of two or more of the individual features mentioned or evident from the text or drawings. All of these different combinations constitute various alternative aspects of the invention.

The invention claimed is:
1. A method, comprising:
at an electronic device with a display:
receiving a request to display a menu comprising one or more modification actions to be performed on one or more building components of a base plan associated with a building, wherein the one or more modification actions to be performed on the base plan are displayed as visual indicators;
determining contextual information associated with the one or more building components;
displaying, on the display, the menu comprising one or more actions to be performed on the one or more building components, wherein the one or more modification actions displayed are based on the determined contextual information;
subsequent to displaying the menu, receiving a request to modify the one or more building components of the base plan associated with the building;
in response to receiving the request to modify the one or more building components, determining whether the request to modify the one or more building components satisfy one or more compliance requirements;
in accordance with a determination that the request to modify the one or more building components satisfy one or more compliance requirements:
displaying, on the display, an updated base plan incorporating the request to modify the one or more building components;
in accordance with a determination that the request to modify the one or more building components is non-compliant, not updating of the base plan in accordance with the requested modification; and
in accordance with a determination that movement of a selection indicator within a minimum threshold distance to a visual indicator indicating a modification action to be performed on the one or more building components, displaying information relating to the modification action.

2. The method of claim 1, wherein the step of determining whether the request to modify the one or more building components satisfy one or more compliance requirements further comprises:
determining whether the request to modify the one or more building components satisfy one or more compliance requirements in relation to other building components of the base plan.

3. The method of claim 1, wherein the step of determining whether the request to modify the one or more building components satisfies one or more compliance requirements further comprises:
determining whether the request to modify the one or more building components satisfy one or more compliance requirements of other building components of the base plan.

4. The method of claim 1, wherein:
in accordance with a determination that the request to modify the one or more building components is non-compliant:
determining whether at least one intermediate modification between a previous compliant base plan and the requested modification of the one or more building components satisfy one or more compliance requirements;
in accordance with a determination that the at least one intermediate modification satisfies one or more compliance requirements:
displaying, on the display, an updated base plan incorporating the at least one intermediate modification to the one or more building components;
in accordance with a determination that the at least one intermediate modification is non-compliant, not updating of the base plan in accordance with the at least one intermediate modification.

5. The method of claim 1, wherein the step of receiving the request to modify the one or more building components further comprises:
determining whether consequent modifications are required to other building components associated with the one or more building components requested to be modified;
in accordance with a determination that the request to modify the one or more building components and the consequent modifications satisfy one or more compliance requirements:
displaying, on the display, an updated base plan incorporating the request to modify the one or more building components and the consequent modifications;
in accordance with a determination that the request to modify the one or more building components or the consequent modifications are non-compliant not updating of the base plan in accordance with the requested and consequent modifications.

6. The method of claim 5, wherein the step of determining whether the request to modify the one or more building components and the consequent modifications satisfies one or more compliance requirements, further comprises:
determining whether the request to modify the one or more building components and the consequent modifications satisfy one or more compliance requirements in relation to other building components.

7. The method of claim 5, wherein the step of determining whether the request to modify the one or more building components and the consequent modifications satisfies one or more compliance requirements, further comprises:
determining whether the request to modify the one or more building components and the consequent modifications satisfy one or more compliance requirements of other building components of the base plan.

8. The method of claim 5, wherein:
in accordance with a determination that the request to modify the one or more building components or the consequent modifications are non-compliant:
determining whether at least one intermediate modification to the one or more building components and the consequent modifications satisfies one or more compliance requirements, wherein the at least one intermediate modification is determined between:
(i) a previously compliant base plan and the requested modification to the one or more building components; and
(ii) a previously complaint base plan and the consequent modifications;
in accordance with a determination that the at least one intermediate modification satisfies one or more compliance requirements:
displaying, on the display, an updated base plan incorporating the at least one intermediate modification to one or more building components and consequent modifications;
in accordance with a determination that the at least one intermediate modification is a non-compliant action, forgoing updating of the base plan in accordance with the at least one intermediate modification.

9. The method of claim 1, wherein the menu is displayed as a dock on the user interface.

10. A method for adding a penetration to a wall of a building comprising:
   receiving a request to add a penetration to a wall of the building;
   determining at least two grid nodes of the base plan, wherein the requested penetration is located between the at least two grid nodes;
   determining at least one position located between the at least two grid nodes that satisfies one or more compliance requirements;
   in accordance with a determination that the at least one position located between the at least two grid nodes of the base plan satisfies one or more compliance requirements:
   displaying, on the display, an updated base plan incorporating the request to add the penetration;
   in accordance with a determination that the at least one position located between the at least two grid nodes is non-compliant, forgoing updating of the base plan in accordance with the request to add a penetration.

11. A method for modifying a length of a wall of a building comprising:
   receiving a request to modify the length of the wall of the building;
   displaying, on the display, at least one visual indicator at one end of the length of the wall, wherein the visual indicator indicates a minimum threshold distance to a building component different to the wall;
   determining cessation of the request to modify the length of the wall of the building;
   in response to determining cessation of the request to modify the length of the wall of the building, determining whether movement of the end of the wall to a location within the minimum threshold distance to the building component, indicated by the visual indicator, satisfies one or more compliance requirements;
   in accordance with a determination that the movement of the end of the wall to a location within the minimum threshold distance to the building component satisfies one or more compliance requirements:
      connecting the end of the wall to the building component; and
      displaying, on the display, an updated base plan incorporating the connection of the end of the wall to the building component;
   in accordance with a determination that the movement of the end of the wall to a location within the minimum threshold distance to the building component is non-compliant, forgoing updating of the base plan in accordance with modifying the length of the wall.

* * * * *